July 23, 1963

B. F. BURCH, JR 3,098,566

DOCUMENT SORTING SYSTEM

Filed Oct. 31, 1961

INVENTOR.
BYRON F. BURCH Jr.
BY
*A. M. Fernandez*
ATTORNEY

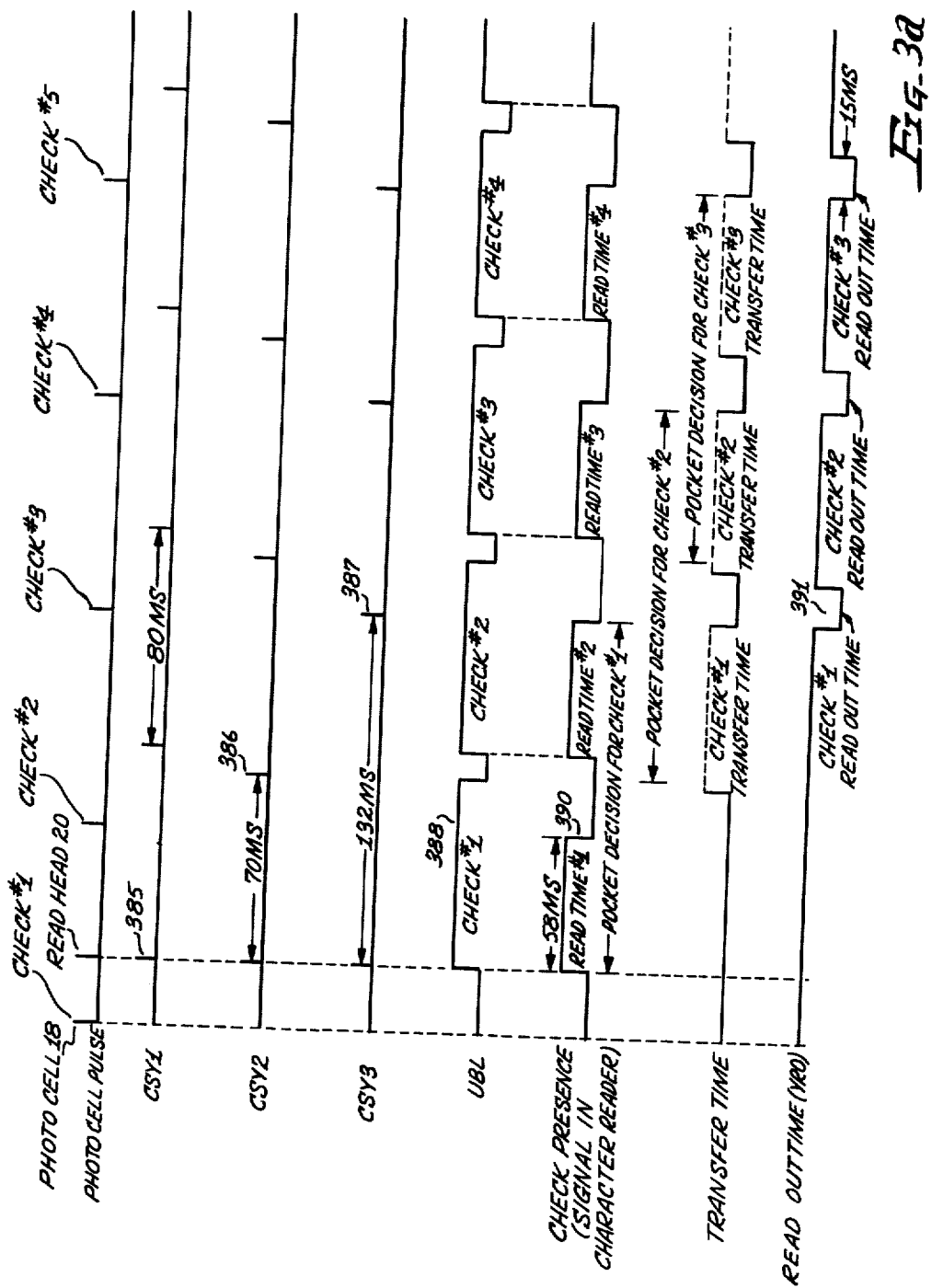

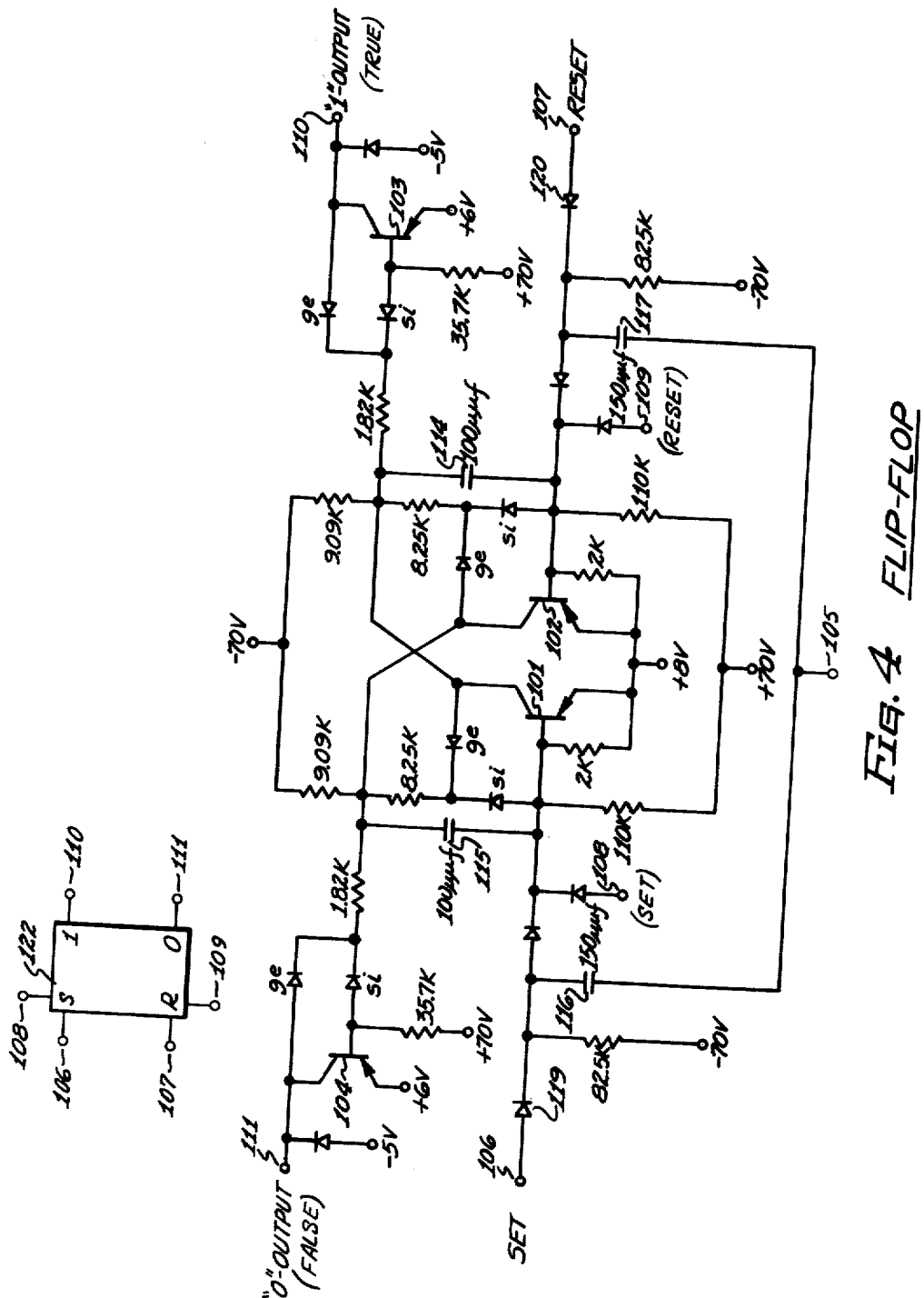

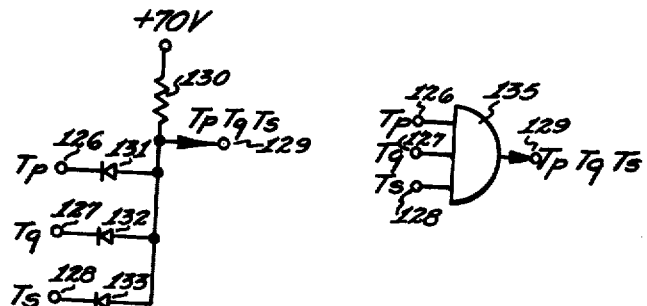
Fig. 5  AND-GATE
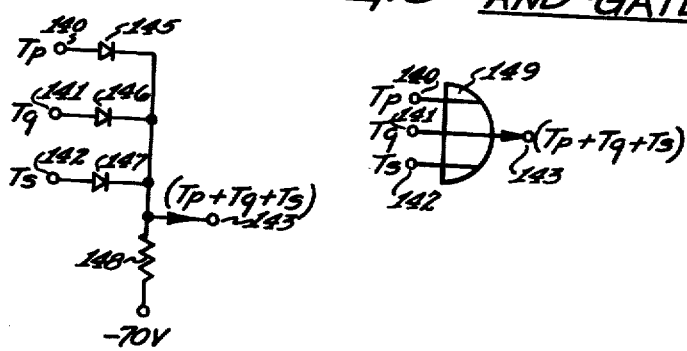
Fig. 6  OR-GATE
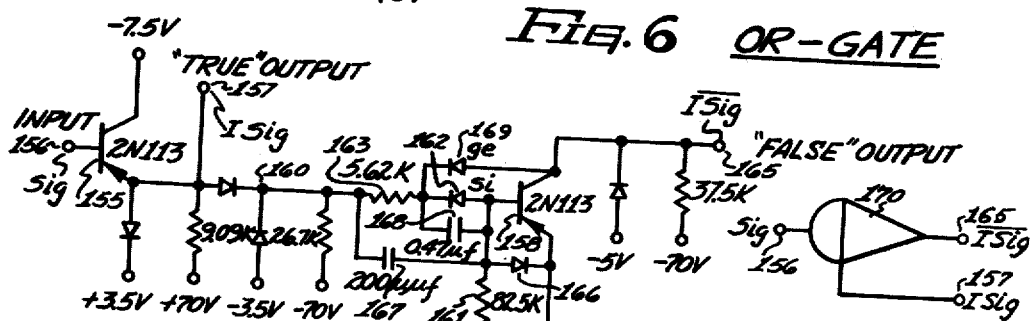
Fig. 7  INVERTER
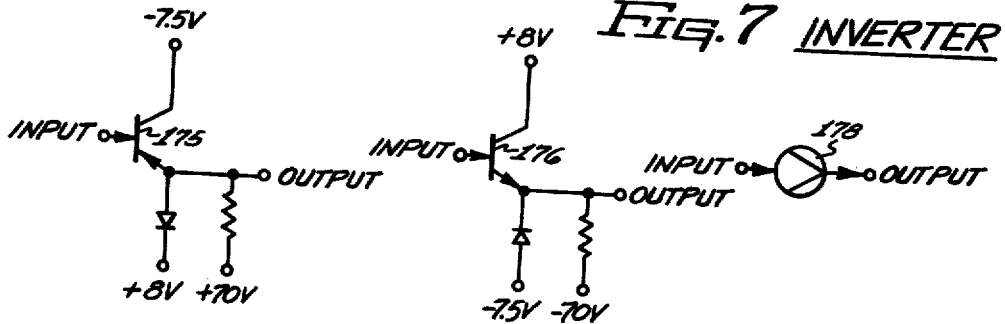
Fig. 8  EMITTER FOLLOWERS

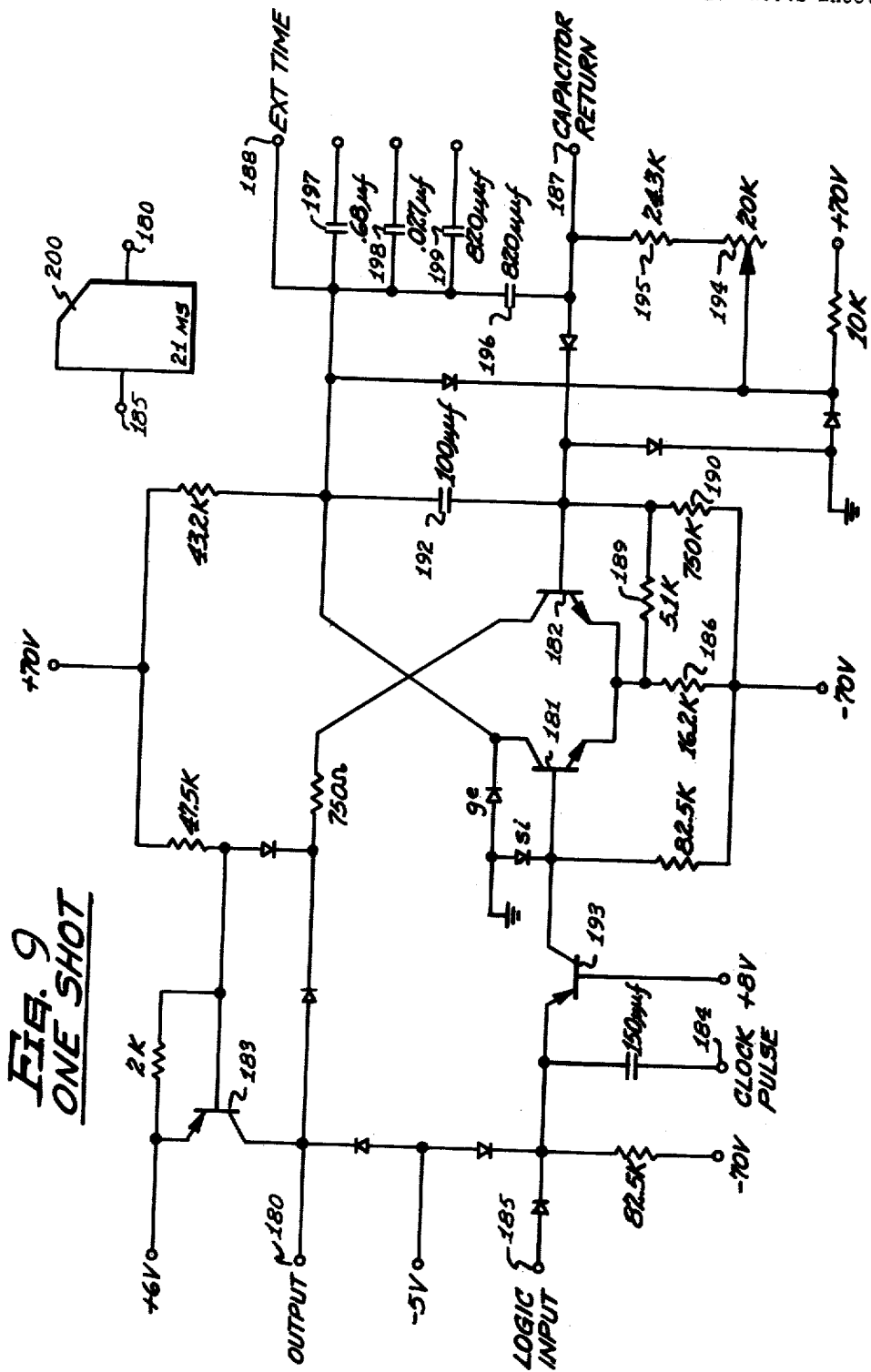
Fig. 9 ONE SHOT

Q1 (TRANSIT) COUNTER (1■)

Q2 (AMOUNT) COUNTER (■■)

Q3 (ON-US) COUNTER (II■)

Q4 (HYPHEN) COUNTER (---)

DIGIT COUNTER

July 23, 1963

B. F. BURCH, JR 3,098,566

DOCUMENT SORTING SYSTEM

Filed Oct. 31, 1961

NAME OF DRAWER
ADDRESS
CITY STATE

NO 1101

56-7890 / 1234

September 1961

PAY TO THE ORDER OF X.Y.Z. Company  $ 1,959.00

One thousand nine Hundred Fifty-Nine and no/100 —DOLLARS

NAME OF DRAWEE BANK
CITY STATE

S. L. Snature 29, 28, 27, 26, 25, 24, 23, 22, 21

⑈1101⑈ ⑆1234⋯7890⑆ ⑆1238⋯4657⑆ 346 ⑆00000195900⑆

1/4"

AUX. ON-US FIELD | TRANSIT NO. FIELD | ON-US FIELD | AMOUNT FIELD

FIELD 7 | FIELD 6 | FIELD 5 | FIELD 4 | FIELD 3 | FIELD 2 | FIELD 1

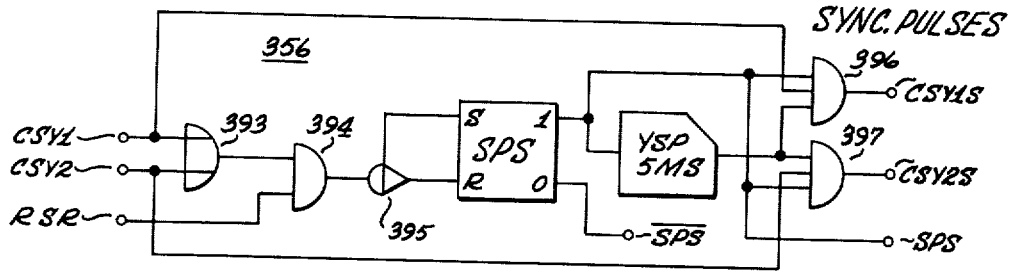
Fig. 23
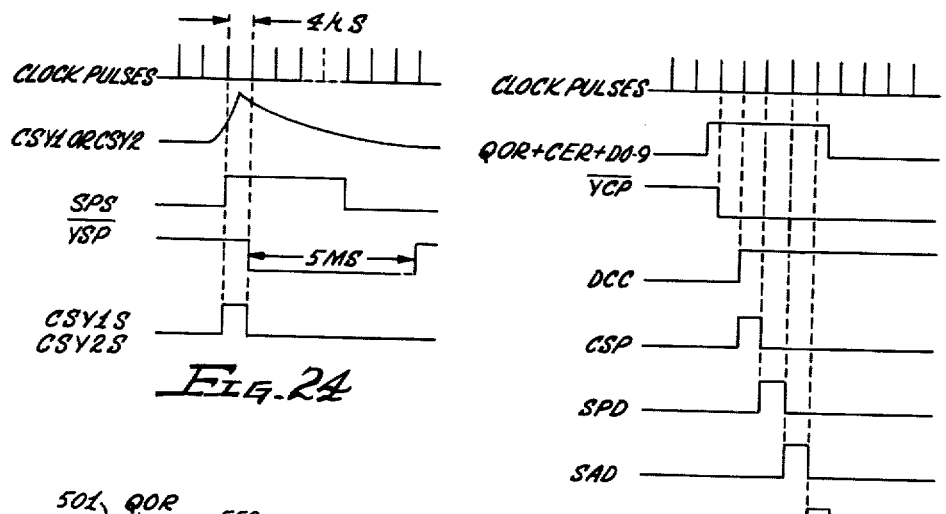
Fig. 24
Fig. 26
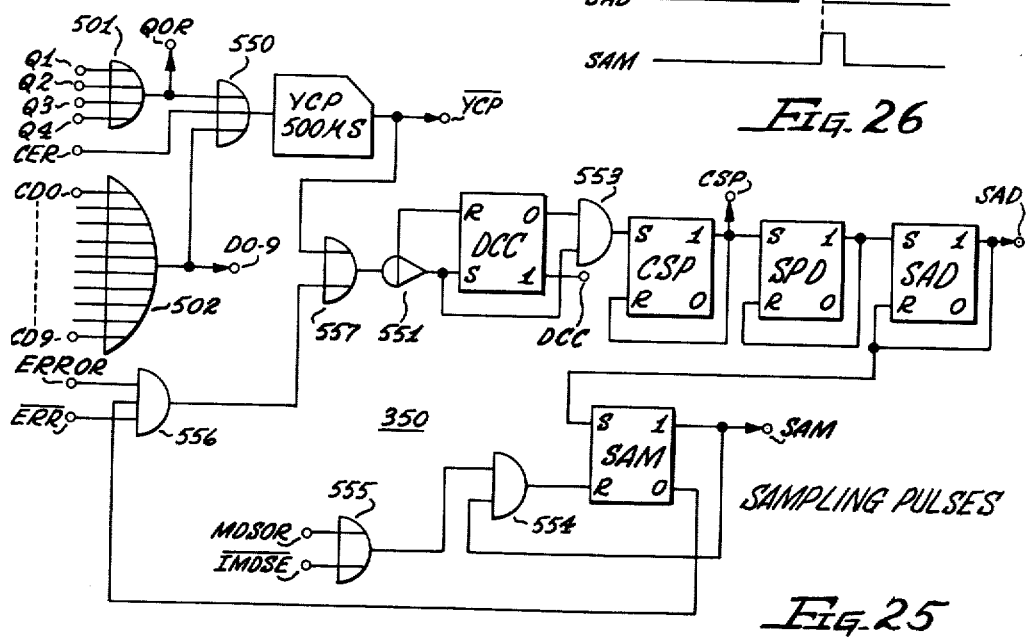
Fig. 25

July 23, 1963      B. F. BURCH, JR      3,098,566
DOCUMENT SORTING SYSTEM
Filed Oct. 31, 1961      17 Sheets-Sheet 16
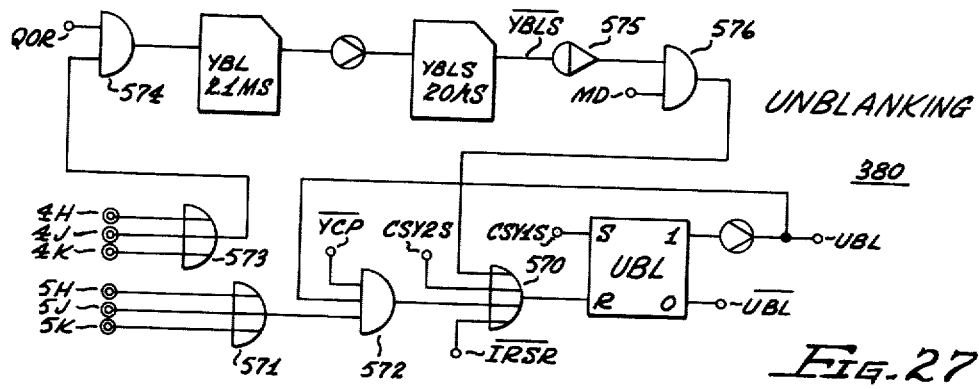
Fig. 27
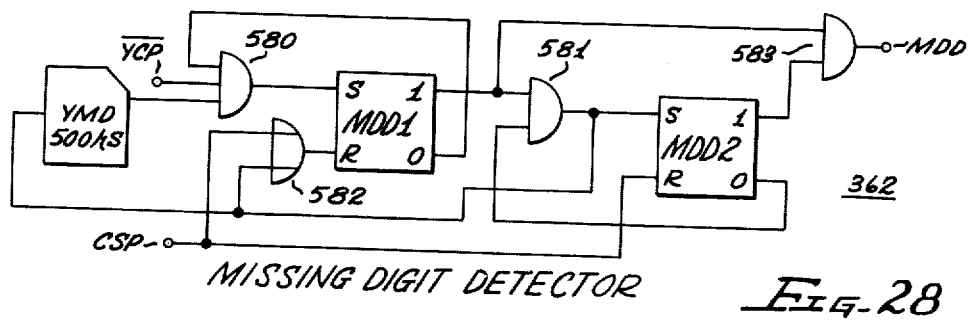
MISSING DIGIT DETECTOR      Fig. 28
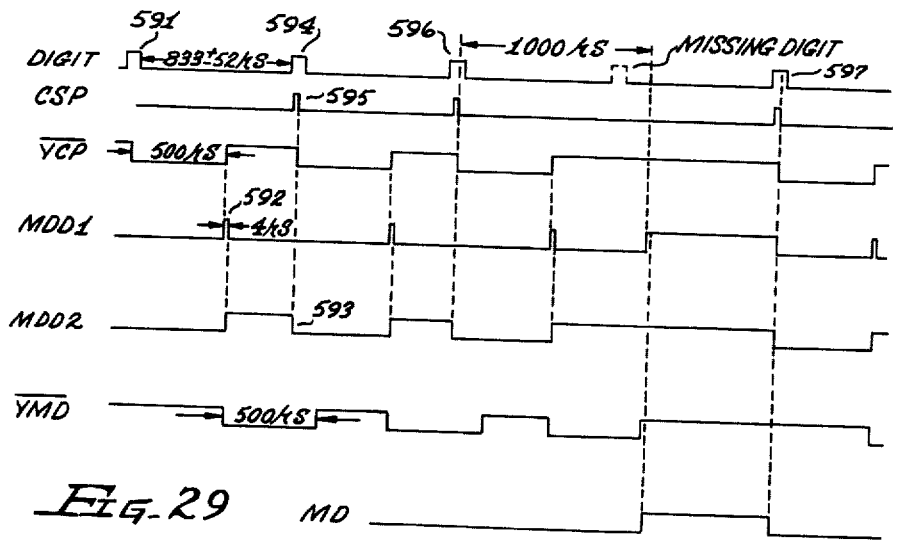
Fig. 29

United States Patent Office 3,098,566
Patented July 23, 1963

---

3,098,566
DOCUMENT SORTING SYSTEM
Byron F. Burch, Jr., Phoenix, Ariz., assignor to General Electric Company, a corporation of New York
Filed Oct. 31, 1961, Ser. No. 149,120
15 Claims. (Cl. 209—111.5)

This invention relates to improvements in a document sorting system, and more particularly to improvements in a sorting system adapted to sort documents in response to indicia appearing thereon in different formats.

While the invention may be employed for various applications, it may be employed, for example, to sort bank documents magnetically encoded, such as checks and deposit slips, in accord with the specifications and guides set forth in a Bank Management Publication 147 published by the Bank Management Commission of the American Bankers Association, New York, New York, April 1959, for Automation of Bank Operating Procedures using the Common Machine Language comprising magnetic ink characters as adapted by the American Bankers Association with the concurrence of the major manufacturers of electronic equipment.

The electronic equipments manufactured in the past for sorting magnetically encoded documents were specifically designed for handling documents bearing information in specified formats. Each format conformed to a standard adopted by the American Bankers Association but, as explained more fully in the aforementioned Bank Managers Publication 147, particularly in part III at pages 21 to 36, considerable latitude was provided each bank in arranging the "on-us" and "auxiliary on-us" field formats for its own internal application requirements. Thus, within the standardized ABA format, considerable flexibility is allowed each bank with the result that each bank mustt have manufactured for it special document sorting equipment which may not be able to handle intermixed formats, such as during off-line sorting of transit documents, if field identification is intimately related to the arrangement of cue symbols in the different transit documents. A special document sorting system is described in a United States patent application Serial No. 839,836, filed September 14, 1959, by Norman R. Crain et al., and assigned to the assignee of this application.

In a United States patent application Serial No. 149,062, filed concurrently herewith on October 31, 1961, by Robert E. Leo, and assigned to the assignee of this application, a general purpose document sorting system is described which, although of general application, is described with reference to the application of sorting bank documents bearing magnetic characters comprising the digits 0 to 9 separated into fields of up to ten digits by four distinct cue symbols. The fields arranged in a line across the face of a given document are recognized by counting separately the distinct cue symbols and identifying a particular field by the unique cue-count configuration which must be reached as the fields preceding the particular field are sequentially read.

A plugboard is provided to selectively couple cue-count decoding AND-gates to field selecting AND-gates in order to define a specified field for sorting purposes with maximum flexibility. In the special document sorting system described in the aforesaid application Serial No. 839,836, a particular field is located by counting the number of cue symbols printed upon given documents as they are read and sorted. If the documents are transit documents having different arrangements of field defining cue symbols preceding the particular field, sorting of the documents cannot be accomplished off-line; only on-line sorting of intermixed transit documents under the control of a programmed computer or central data processor is possible. In the general purpose document sorting system described in the aforesaid application filed concurrently herewith, separate cue counters and a plugboard for selecting particular cue-count decoding and field selecting configurations are provided in order that any field may be selected for sorting intermixed transit documents.

In a particular application of the aforesaid general purpose document sorting system described hereinafter, up to twelve separate fields, each consisting of any number of digits up to ten, may be sorted in accordance with the plugboard arrangement and actuation of field selecting switches. The normal field sorting operation requires successive sorting operations on the digits of the field selected for sorting from the least to the most significant digit. It is often desirable to cull a particular class of documents for special treatment during a single sorting operation or pass. To accomplish that, it is necessary to identify all documents having a group of digits equal to, or unequal to, a predetermined number, the group of digits being selected in an illustrative embodiment from as many as ten digit positions, either from a single field or as many as ten different fields. Documents identified in that manner could be culled for special treatment while the remaining documents are sorted in a normal manner.

To reduce sorting operations, as documents are normally sorted from the least significant digit to the most significant digit in a given field, documents bearing an insignificant zero or no digit (suppressed zero) to the left of the most significant zero are deposited in a special pocket instead of a pocket for zeroes, referred to hereafter as the ZERO pocket. For economy, that special pocket, referred to hereafter as the Special Sort pocket, may be utilized during a multiple-digit-select operation for accumulating those documents culled from a stack of documents for special treatment. When the Special Sort pocket is so utilized, it is desirable to sort in the ZERO pocket all documents bearing insignificant or suppressed zeroes in digit positions selected for normal sorting lest two classes of documents be intermixed in the Special Sort pocket.

A document sorting system of the class described is preferably designed to be employed "on-line" with a computer or central data processor as well as "off-line" by itself. During on-line operation an electronic switch is set or actuated as the process of reading a given document is begun and reset after the process of reading the document has been completed. The time lapse between documents sequentially read for processing and sorting is generally sufficient for the computer or central data processor to perform its function before it must begin accepting data from the next document. However, the time lapse between documents is generally not sufficient for other functions, such as housekeeping functions. Since all of the data on a given document may not be required for processing, it is advantageous to reset the electronic switch after the data required has been read, thereby releasing the computer early from the duty of accepting data and making more time available for other functions to be performed by the computer.

Accordingly, one of the principal objects of the invention is to provide a document sorting system which allows a particular class of documents distinguishable by a group of two or more digits to be culled during a single sorting operation.

Another object is to provide a document sorting system which may sort in a normal manner all documents not of a particular class being culled during a single sorting operation.

Another object is to provide a flexible system for specifying the digit positions within one or a plurality of fields to be examined in order to identify documents of a particular class to be culled for special handling during a single sorting operation.

Another object is to unconditionally release a computer early from the duty of accepting data from a given document when a document sorter of the class described is employed for an on-line data processing and sorting operation.

Still another object is to release a computer early from the duty of accepting data from a given document, but only on the condition that other data is not printed within a predetermined space following a specified character as the document is scanned at an approximately constant rate from right to left.

These and other objects of the invention are achieved in a document sorting system of the class described having a plurality of cue counters, one for each of four distinct cue symbols employed to separate fields of digits printed on documents, and a digit counter which is reset by each cue symbol read so that it effectively counts only digits within a given field. To identify a predetermined class of documents for special treatment during off-line sorting, a plurality of digits in certain positions entirely within one field or arbitrarily selected fields are selected for sequential comparison with a predetermined group of digits. For maximum flexibility, the selection is accomplished through a plugboard by electrical connectors between hubs associated with cue and digit decoding AND-gates and hubs associated with digit comparing AND-gates. As each digit defined is read, a comparing AND-gate associated with it through the plugboard is enabled to transmit a particular signal, but only if the digit read is identical to a corresponding digit of the predetermined group of digits. If all of the digits read from positions defined for a multiple-digit-select operation are equal to corresponding digits of the predetermined group of digits, a flip-flop remains in one of its two stable states, thereby causing the documents to be deposited in the Special Sort pocket of the document sorter. If any digit fails to compare, the flip-flop is set in the other stable state, thereby allowing the document to be sorted in a normal manner, i.e., in accord with the digit read from an independently defined position on the document. The flip-flop is returned to its original stable state when the operation of reading the next document is initiated. Switching means is provided to reverse the logical operation of the flip-flop such that "equal" documents are sorted in a normal manner and "unequal" documents are deposited in the Special Sort pocket.

The document sorting system of the type described includes a network for depositing documents sorted in a normal manner in the Special Sort pocket when the digit position selected for normal sorting contains an insignificant zero or a blank space (suppressed zero). Therefore, when a multiple-digit-select operation is being performed, the documents having insignificant or suppressed zeroes in the digit position selected for normal sorting are automatically deposited in the ZERO pocket in response to a signal from a control switch actuated to effect a multiple-digit-select operation.

During on-line sorting, an unblanking flip-flop is set to signal to the computer that a document is being read. It is automatically reset after a fixed period long enough to allow the longest document to be read. In order to reset the unblanking flip-flop early, and thereby allow more time for data processing in the computer, the cue-count decoding AND-gate for the next cue symbol read after the last field required to be read into the computer is selectively coupled through the plug-board to the reset-control terminal of the unblanking flip-flop, thereby causing it to be unconditionally reset early. If it is desired to reset the unblanking flip-flop early on the condition that no other data is present to the left of a specified cue symbol, the cue-count decoding AND-gate for that particular cue symbol is selectively coupled to the reset control terminal of the unblanking flip-flop through the plugboard and a network for determining the absence of a character within the next predetermined space to the left of that cue symbol, reading the document from right to left. The unblanking flip-flop is then reset if the absence of a character in that predetermined space is determined; if not, it is reset automatically at the end of the normal period allowed for reading the entire document.

Other advantages of the invention will become apparent from the following description with reference to the drawings in which:

FIG. 3a is a timing diagram for the document sorting system of FIG. 1 which is shown in more detail in FIGS. 2 and 3;

FIG. 4 illustrates a circuit diagram of a flip-flop and a symbol employed to represent a flip-flop;

FIG. 5 illustrates a circuit diagram of an AND-gate and illustrates a symbol employed to represent an AND-gate;

FIG. 6 illustrates a circuit diagram of an OR-gate and illustrates a symbol used to represent an OR-gate;

FIG. 7 illustrates a circuit diagram of an inverter and illustrates a symbol employed to represent an inverter;

FIG. 8 illustrates circuit diagrams of two types of emitter followers and illustrates a symbol employed to represent an emitter follower;

FIG. 9 illustrates a circuit diagram of a monostable multivibrator and illustrates a symbol employed to represent a monostable multivibrator;

FIG. 18 illustrates a specimen document;

FIG. 19 illustrates one of many possible alternative formats for a document;

FIG. 20 illustrates another alternative format for a document;

FIG. 21 illustrates still another alternative format for a document;

FIG. 23 illustrates a logic diagram for the section of FIG. 3 employed to generate synchronized signals;

FIG. 24 is a timing diagram for the section of FIG. 23;

FIG. 25 is a logic diagram of the section of FIG. 3 for generating sampling pulses;

FIG. 26 is a timing diagram for the section of FIG. 25;

FIG. 27 is a logic diagram of the section of FIG. 3 for generating an unblanking signal;

FIG. 28 is a logic diagram of the section of FIG. 3 for detecting a missing digit;

FIG. 29 is a timing diagram for the section of FIG. 28;

GENERAL DESCRIPTION

Before describing the present invention in detail, its utilization in a system and the sorter to be controlled will first be described with reference to FIG. 1. The combination of a sorter 1 and character reader 2 provide for: the automatic reading of data borne by documents, such as bank checks; the delivery of this data to a sorter control unit 3; and the sorting of these documents into pockets under control of signals received from the sorter control unit. The sorter stores a stack of documents to be read by the character reader and to be subsequently sorted; delivers the documents, one at a time, to apparatus for automatically sensing the data thereon, this data being imprinted in magnetic ink; and then sorts these documents into pockets, as directed by signals received from the sorter control unit. The character reader responds to signals from the automatic sensing apparatus to deliver an encoded representation of the data on the documents to the sorter control unit.

A system which may utilize the embodiment of this invention is described in a United States patent application Serial No. 8,391, filed February 12, 1960, by Dr. R. R. Johnson, now Patent No. 3,077,984, for a Data Processing System. A character reader useful in the embodiment of this invention is described in United States Patent 2,924,812 and United States patent application Serial No. 783,350, filed December 29, 1958, by P. E. Merritt and C. M. Steele, for Spurious Signal Suppression in Automatic Symbol Reader. Improvements in the character reader are described in the following United States patent applications: Serial No. 810,281, filed May 1, 1959, by R. E. Milford, for Waveform Recognition System; Serial No. 38,288, filed June 23, 1960, by G. M. Miller, for Detection of Long Waveshapes in Automatic Symbol Reader; and Serial No. 38,353, filed June 23, 1960, by R. J. Schreiner for False Error Prevention Circuit. All of the aforementioned patent applications are assigned to the assignee of the present application.

Figure 1:
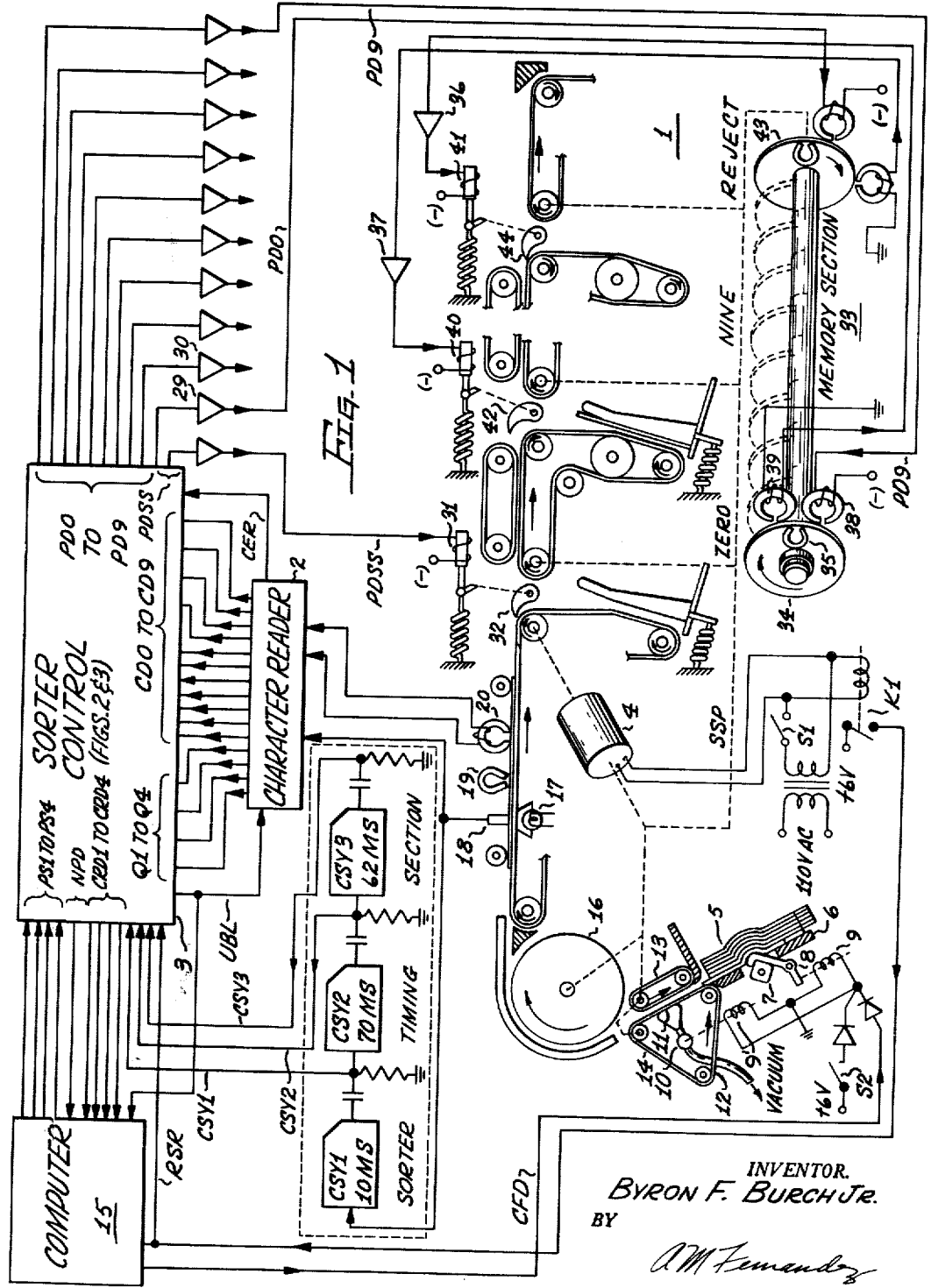
FIG. 1 is a schematic diagram of a document sorting system with greater detail as to the mechanical structure thereof.

The sorter illustrated schematically in FIG. 1 is driven by a motor 4 which is energized upon closure of a switch S1 to provide mechanical power through linkages illustrated schematically for the various belt-driving pulleys, drums, and magnetic-memory discs of the sorter. When the switch S1 is closed, a relay K1 is energized to deliver a +6-volt signal denoted as the RSR signal to the sorter control unit to indicate that the sorter power is on and that the sorter is running. Although closure of the switch S1 prepares the sorter to feed documents for automatic reading and sorting, the sorter must receive an additional signal before the documents are actually processed. The RSR signal may also be employed to indicate to a computer 15 that the sorter is ready to process documents when operating on-line.

A stack 5 of the documents to be read is held against a base plate 6 by a spring-loaded pressure plate (not shown). A continuously rotating cam 7 is provided to urge the bottom document of the stack into the transport mechanism of the sorter while it rests against the cam. However, in the absence of a CFD signal from the computer during on-line operation or a +6-volt signal from a switch S2 during off-line operation, a lever 8 maintains the bottom documents of the stack spaced from cam 7. Upon receipt of the CFD or +6-volt signal, solenoids 9 and 9' are energized, thereby causing the lever 8 to pivot into a depression provided in the cam 7 to allow the bottom document of the stack to come in contact with it. Eenergization of the solenoid 9' actuates a valve 10, which provides vacuum at an orifice 11. Cam 7 forces the bottom document into the region between the oppositely-moving belts 12 and 13. When apertures 14 in the belt 12 are opposite the orifice 11, the document between the belts 12 and 13 is attracted to the belt 12 and caused to move with it. The belt 13 moves in a direction opposite the direction of motion of the bottom document, thereby insuring that only one document is fed by the document transport mechanism. Therefore, when a CFD or +6-volt signal is present, the document 5 is moved by the belt 12 to the periphery of a drum 16 which transports the document to the automatic sensing apparatus.

The automatic sensing apparatus comprises a lamp 17, a photocell 18, a magnet 19 and a transducer 20. The lamp 17 directs a beam of light on the photocell 18 which delivers a significant output signal when the reference (leading) edge of a document interrupts the beam of light. The magnet 19 magnetizes the line of information on the document which is to be sensed, this line of information being imprinted on the document with magnetizable material. The transducer 20 responds to the magnetic field of the magnetized information on the document and delivers corresponding signals to the character reader 2. The document is then transported to the right in FIG. 1 by the transport mechanism and enters a sorter pocket in accordance with signals received from the sorter control unit 3. The signals received from the sorter control unit are provided by the computer during on-line operations after the computer has processed the information borne on the document.

The bank check of FIG. 18 illustrates a document bearing data imprinted in magnetizable material from which the automatic sensing apparatus extracts information. The reference edge of the document is the right-hand edge which first interrupts the light beam between lamp 17 and photocell 18 as the document is scanned from right to left. A portion of the check near the bottom edge is allotted to the printing of magnetic symbols. This portion is termed the band and comprises a plurality of symbols printed in ink containing magnetizable particles. Information which may appear in the band includes the dollar amount of the check represented in FIG. 18 by the ten numerals 0000195900 in the extreme right portion of the band; the transaction code number 346 immediately to the left of the dollar amount; the account number, represented by the eight numerals 1238-4657 immediately to the left of the transaction code number; the transit number, represented by the eight numerals 1234-7890 to the left of the account number; and an auxiliary group of digits in the extreme left portion of the band for use by the drawee bank.

It should be understood that the present invention may be employed to sort and otherwise process documents of any nature for other purposes, such as sales slips for inventory control and accounting, due to the versatility of the invention. Processing of bank checks is described to illustrate the versatility of the invention because, although certain restrictions must necessarily be imposed on all banks using the common machine language as shown in FIG. 18 for mechanized processing of checks, each bank may wish to exploit for its own advantage all of the variations possible in format within a set of general rules which must be followed by all banks in order that each may utilize its mechanized system to process the checks of others. However, from such a specific illustration, the advantages of the present invention for processing other types of documents may be readily seen.

Checks are ordinarily issued without the dollar amount being printed in the amount field of the band. The first bank receiving a check for collection normally prints the dollar amount in the space provided for it. That space is long enough for only ten digits and two amount symbols 21 and 22, one preceding and one following the dollar amount. In the illustration of FIG. 18, all of the digit positions are filled in the amount field by placing insignificant zeros to the left of the most significant digit. Printing machines employed by some banks are designed to always print insignificant zeros to the left of the most significant digit of the dollar amount for error detecting purposes, such as for detecting the error of transposing digits or inserting significant zeros to the right of the correct least significant digit; but, machines employed by other banks are designed to suppress the printing of all insignificant zeros to the left of the most significant digit. Accordingly, the amount field must always consist of ten digit positions bracketed by two amount symbols which must not be used for any purpose other than to specify the amount field.

The space between the dollar amount and the transit number consists of a maximum of nineteen spaces within which "on-us" data may appear. The spaces for the "on-us" portion of the band are purposely not defined in terms of specific number of spaces in order that each bank may have the widest latitude in designing the use of that portion for its own requirements. It is within that portion of the band that the present invention has greatest utility in that it affords the user an opportunity to apply his own ingenuity.

The "on-us" field is normally used by each bank for its customer's account number and a transaction code. For example, in the check shown in FIG. 18 the transaction code follows immediately after the second amount symbol 22 followed by an "on-us" symbol 23. Immediately to the left of the "on-us" symbol 23, eight digits (separated in groups of four by a hyphen symbol 24) are printed to specify the account number. In previous control systems for document sorters, each "on-us" field format had to be coordinated with the manufacturer of the control system selected to permanently specify how the "on-us" field would be employed; however, with the present invention, the user may specify the format of the "on-us" field for each sorting run of documents by plugboard programming prior to each different sorting run.

A transit symbol 25 introduces the transit number portion of the field as the document is scanned right to left. The routing and transit number of the drawee bank always consists of two groups of four digits each separated by a hyphen symbol 26 and terminated by a second transit symbol 27.

If the document is long enough, as in the bank check illustrated in FIG. 18, the remaining portion of the band may be used by the drawee bank for any purpose, such as to specify a check serial number. That portion of the band is known as the "auxiliary on-us" field because the digits printed therein are bracketed by "on-us" symbols 28 and 29 and because, like the "on-us" field, may be used in any manner the user wishes.

It should be noted that due to the different unique configurations of each of the four distinct cue symbols, each is recognized by the character reader 2 when the check is scanned and that due to the rules which prescribed the use of portions of the band in bank checks, the distinct symbols must not be used for any other purpose than that illustrated in FIG. 18. In other words, the amount symbol is uniquely associated with the dollar-amount portion of the band and must be used only to bracket the ten spaces provided for the dollar amount. The "on-us" symbol may be used only in the "on-us" portion of the band to introduce the account number following a transaction code number, if any, and in the "auxiliary on-us" portion of the band to bracket any information encoded therein. The transit symbol must always be used only to bracket the nine spaces devoted to the routing and transit number. The hyphen symbol may be used to separate numbers in the "on-us" field and the "auxiliary on-us" field, and must be used to separate the two groups of digits in the transit number. Accordingly, only the "on-us" symbol and the hyphen symbol may be employed for different purposes at the user's discretion and then only in the "on-us" and "auxiliary on-us" fields. However, as noted hereinbefore, if the present invention is employed for other purposes so that the general rules accepted by banks for their mutual benefit do not apply, portions of the band may be redefined and utilized in an exceedingly large number of different ways subject only to the limitation that the transit, amount and "on-us" symbols be employed to define fields of a band and the hyphen symbol to separate groups of numbers within a given field. The reason, as will be described in greater detail hereinafter, is that a separate counter is provided for each of the amount, "on-us" and transit symbols to count the number of times each symbol is encountered in the information band of a given document whereas a separate counter is provided to count the number of times the hyphen symbol occurs within a given field of a band, the hyphen counter being reset automatically when the next amount, "on-us" or transit symbol is read.

The names employed to refer to the four distinct symbols herein are derived from their use on bank checks. However, since the various symbols may be used for different purposes in other applications, more generic terminology may be more convenient. Therefore, the transit number symbols 25 and 27 in FIG. 18 will be referred to hereinafter as Q1 symbols; the amount symbols 21 and 22 and the "on-us" symbols 23, 28 and 29 as Q2 and Q3 symbols, respectively; and the hyphen symbols 24 and 26 as Q4 symbols.

Since the present invention is to be described with reference to the application of processing bank checks as an illustrative example, other configurations of digits representing data in fields on checks are illustrated in FIGS. 19, 20 and 21. It should be noted that the amount and transit-number fields are the same in each instance, except for the digits printed in each. Only the "on-us" and "auxiliary on-us" fields are different in each.

Upon scanning a document, information is extracted from the field by first magnetizing the magnetizable characters thereon and then sensing the magnetized characters from right to left with the transducer 20 as the document moves to the right. In sensing the magnetized characters, the transducer senses their magnetic fields and generates electrical waveforms characteristic of each different character. The character reader 2 identifies these characteristic waveforms and provides output signals indicative of the character scanned. Thus, whenever one of the numerals 0 to 9 is scanned, a corresponding one of a plurality of output signals CD0 to CD9 is delivered at one of the character reader output terminals which may be identified by the corresponding mnemonic codes CD0 to CD9.

In addition to the numerals representing the data to be read, the symbols Q1 to Q4 are sensed to distinguish the various portions of the document field. As noted hereinbefore, the symbol 21 (FIG. 18) signals the start of the dollar amount on the check so that it is known that the next eight numerals read by the character reader represent the amount of the check. The second symbol 22 signals that the numerals immediately following constitute the transaction code. Since four different symbols Q1 to Q4 are present on the document, the character reader identifies the characteristic waveform obtained by sensing each of the cue symbols and delivers a corresponding one of four output signals Q1 to Q4 at terminals which may be identified by the corresponding mnemonic codes Q1 to Q4.

In addition to providing output signals representing the ten numerals and four cue symbols recognizable by the character reader, an error signal CER is provided whenever the transducer scans an improper character (one that the character reader is not designed to recognize or one that is so poorly printed that the character reader cannot distinguish it) or when the transducer scans foreign magnetic particles contiguous to a proper character.

As the automatic reading apparatus scans the document, timing signals CSY1, CSY2 and CSY3 are delivered by the sorter timing section in response to detection of the leading edge of a given document by the photocell 18. Those three signals are delivered by three tandem-connected one-shot circuits CSY1, CSY2 and CSY3, respectively, which may be of the type described hereinafter with reference to FIG. 9.

The one-shot CSY1 is triggered into its unstable state by the signal delivered when the light beam from lamp 17 to the photocell 18 is interrupted by the leading edge of the document. Thus, the signal which triggers the one-shot CSY1 denotes the arrival of a given document at the reading station. The one-shot CSY1 remains in its unstable state for approximately 10 milliseconds to allow time for the reference (leading) edge of the document to pass .125 inch past the gap of the transducer 20 after which it returns to its stable state. The trailing edge of the 10 millisecond pulse delivered by the one-shot CSY1 is differentiated to provide the CSY1 pulse which starts the timing sequence of a check period by enabling the character reader 2 through the sorter control unit 3 and presetting the sorter control unit as described hereinafter with reference to FIG. 3. The CSY1 pulse is also applied to trigger the one-shot CSY2 which similarly remains in its unstable state for about 70 milliseconds and, upon return to its stable state, produces the CSY2 signal which triggers the one-shot CSY3. The one-shot CSY3 remains in its unstable state for about 62 milliseconds. Upon returning to its stable state, it produces the CSY3 signal. In that manner, the signals CSY1, CSY2 and CSY3 are generated approximately 10, 80 and 142 milliseconds, respectively, after the reference edge of the document arrives at the photocell 18.

The output signal of the photocell 18 is also applied to the character reader 2 to allow activation of circuits therein when the amount field reaches the transducer 20.

Prior to the arrival of the document at the first of twelve sorter pockets, the sorter control unit 2 (for off-line operation) or the computer 15 (for on-line operation) determines into which pocket the document is to be deposited and transmits a control signal to the sorter. During on-line operation, the pocket decision data is transmitted from the computer 15 to the sorter control unit 2 which in turn transmits the pocket decision data to the sorter on one of eleven lines that carries the corresponding one of eleven signals PD0 to PD9 and PDSS.

Twelve pockets are provided in the sorter for accepting the documents. The first pocket, SSP, designated as the Special Sort pocket, receives documents when one of four conditions is present as follows:

(1) The numeral upon which the decision is to be made is an insignificant zero; i.e., is not followed by a numeral other than zero before the next symbol Q1, Q2, Q3 or Q4 is read;
(2) the numeral upon which the decision is to be made is non-existent, as when a significant digit has not been printed;
(3) during a Multiple Digit Select mode of operation as described hereinafter; and
(4) when no improper characters are sensed during a special sorting run to cull documents bearing improper characters, those documents bearing an improper numeral being deposited in a REJECT pocket.

Ten pockets Zero to Nine accept documents in accord with the pocket decision signals PD0 to PD9. For example, if the documents are being sorted on the least significant digit of the account number, the check in FIG. 18 will enter the SEVEN pocket. The REJECT pocket is provided only to receive those checks for which a pocket decision signal is not transmitted to the sorter because of some error detected as when culling documents bearing an improper character.

The computer is designed to provide a pocket decision signal for a document within 62 milliseconds after the data has been read from the document and transferred to it. If the document is to be entered in the Special Sort pocket, the PDSS signal is delivered to the sorter to energize a solenoid 31. When the solenoid 31 is energized, a deflector 32 is pivoted to cause the document just scanned to enter the Special Sort pocket.

Inasmuch as the computer provides a pocket decision for all documents before they reach the first deflector 32, means are provided to store the decision until immediately prior to the time when the document arrives at the deflector of the proper pocket. Hence, several documents may be traveling along the transport mechanism between the automatic reading apparatus and the REJECT pocket. Each document passes over closed deflectors until it reaches the deflector of the pocket into which it is to be deposited. However, if no pocket decision is received by the sorter for a document, no deflector is lifted and the document is deposited in the REJECT pocket. Thus, if a document is to be deposited into the NINE pocket, the corresponding deflector 44 will not be lifted until just before the document reaches the deflector 44. The storage of pocket decisions, and consequent delay in deflector actuation is provided by a memory device 33.

The memory device 33 comprises ten magnetic discs, such as a disc 34, each of which corresponds to one of the pockets ZERO to NINE. The discs are mounted on a common shaft and driven at a speed which provides one complete revolution of the discs during the time required for a document to travel the length of the pocket assembly. Each disc is provided with a magnetic recording head, such as a recording head 38, a magnetic reading head, such as reading head 39, and an erasing magnet, such as a magnet 35. The magnetic recording heads are connected to the output terminal of respective recording amplifiers 29, 30, etc., which receive the corresponding PD0 to PD9 signals. Upon the occurrence of a signal at the output terminal of any one of amplifiers 29, 30, etc., the corresponding magnetic recording head is energized, thereby recording a digital signal on the periphery of its associated disc, such as the disc 34 which stores a PD9 signal, for example.

While the disc 34 rotates, the document advances along the length of the pocket assembly. When the recorded digital signal reaches the magnetic read head 39, the document is just approaching the deflector 44 of the NINE pocket. The recorded digital signal is sensed and amplified by an amplifier 36 which energizes the relay 41, thereby causing the check to be deposited in the NINE pocket. The erasing magnet 35 erases the recorded digital signal after it passes the corresponding reading head 39.

While sorting off-line in a manner described more fully hereinafter, the numeral 9 may occur in the selected field position of one check and the numeral 0 in that field position of the immediately following check so that the first check must travel the entire length of the pocket assembly before it is deposited in the NINE pocket, whereas the immediately following check must be deposited in the ZERO pocket. Since the second check must be deposited in its pocket before the first check arrives at the deflector 44, the reading heads adjacent the discs which correspond to respective pockets ZERO to NINE are spaced at progressively greater angles about the periphery of the discs from the corresponding erasing magnets.

*General Operation*

As just noted, there are two basic modes of operation which the system of FIG. 1 is adapted to accomplish: the on-line mode for transmission of information to the computer for processing during which mode of operation the computer transmits the pocket decision for the sorter to arrange the documents being read and processed in a specified order in accord with a program stored in its memory section; and the off-line mode for the direct arrangement of documents in a specified sequence in accord with a program stored in the sorter control unit 3. While sorting documents either on-line or off-line, the system reads documents sequentially such that a succeeding document is read while the actual sorting of a given document is initiated.

The programming of the system for off-line operation is accomplished by utilizing a plugboard which, in accordance with the present invention, renders the system of FIG. 1 flexible with respect to several features. Through the use of the plugboard and control switches, any portion of the information read from a given document can be selected for sorting it into any one of the pockets 0 to 9 or the Special Sort pocket SSP. In that manner, plugboard programming enables the user of the system to process documents having a variety of different formats. If documents of a special format are to be processed, the plugboard may be readily modified by replugging it to adapt the system to the special format. Accordingly, the format of the documents which may be processed is not restricted by the configuration of the present system as in the past.

During off-line operation, a third mode of operation may be alternatively employed. That mode of operation is referred to hereinafter as the multiple-digit-select mode, or more briefly as the MDS mode, because it allows the system to be used for sorting a given document according to information contained in a plurality of digit positions, up to a maximum of ten in the present embodiment, either within a specified field or distributed throughout a number of specified fields. The fields and digit positions are selected by plugboard programming in order to enable documents to be sorted in one pass in accordance with information contained in a plurality of digit positions arbitrarily selected.

During the normal-off line mode of operation, a pocket decision is made by the sorter control unit in accord with control switch settings provided by the operator for a given plugboard program to select a specific field and a particular digit within that field. A given field may be specified by plugging the correct cue-count configuration for that field to an AND-gate. In the present embodiment of the invention, the sorter control unit is designed to be programmed for sorting documents which contain as many as twelve distinct fields.

As just noted, only one field and one digit within that field may be selected for sorting in one pass during a normal off-line operation. When a document is read from right to left, the digits (0 to 9) read thereon cause signals to enter a digit coder 300 (FIG. 2) sequentially as signals CD0 to CD9, respectively, which are encoded to their equivalent in the inverse biquinary code ($\bar{5}$ $\bar{4}$ $\bar{2}$ $\bar{1}$). For example, if a 7 is read, a CD7 signal is transmitted by the character reader (FIG. 1) to the digit coder 300 (FIG. 2) which converts it to its inverse biquinary code equivalent $\bar{5}$ 4 $\bar{2}$ 1.

If the digit 7 in the foregoing example was read from the digit position selected within a specified field for off-line sorting, the binary number 0101 which represents 7 in the biquinary code is translated to a digit decoder 301 which produces a pocket-decision signal through an emitter-follower at an output terminal PD7. The pocket decision signal PD7 is immediately stored in a memory disc (not shown in the memory section 33 of FIG. 1) for the pocket SEVEN in order that the document may be transported past the Special Sort pocket SSP and the pockets ZERO to SIX and be deposited in the pocket SEVEN.

The manner in which an inverse biquinary code is translated from the coder 300 to the decoder 301 is described hereinafter with reference to FIGS. 2 and 3 which comprise a schematic diagram of the sorter control unit 3 (FIG. 1) and in greater detail with reference to FIGS. 10 to 31.

During an on-line sorting operation, the sorter control unit receives a biquinary coded pocket decision through AND-gates 302 to 305. The pocket decision is stored in buffer flip-flops SIN1 to SIN4 which constitute an input register until time for translation to the decoder 301 after all of the fields in the document have been read and a CSY2S signal has set a flip-flop ORP, the output of which is utilized to reset an output register comprising buffer flip-flops SOU1 to SOU4 and to set a flip-flop T. The output of the flip-flop T is then utilized to enable the transfer of the inverse biquinary coded pocket decision from the input register to the output register through a group of AND-gates 306 to 309. As the inverse biquinary coded pocket decision signals are transmitted to the decoder 301, an OR-gate 310 transmits a signal to reset the flip-flop T and thereby disable the AND-gates 306 to 309. It should be noted that the input and output registers are employed for both off-line and on-line modes of operation.

Figure 2:
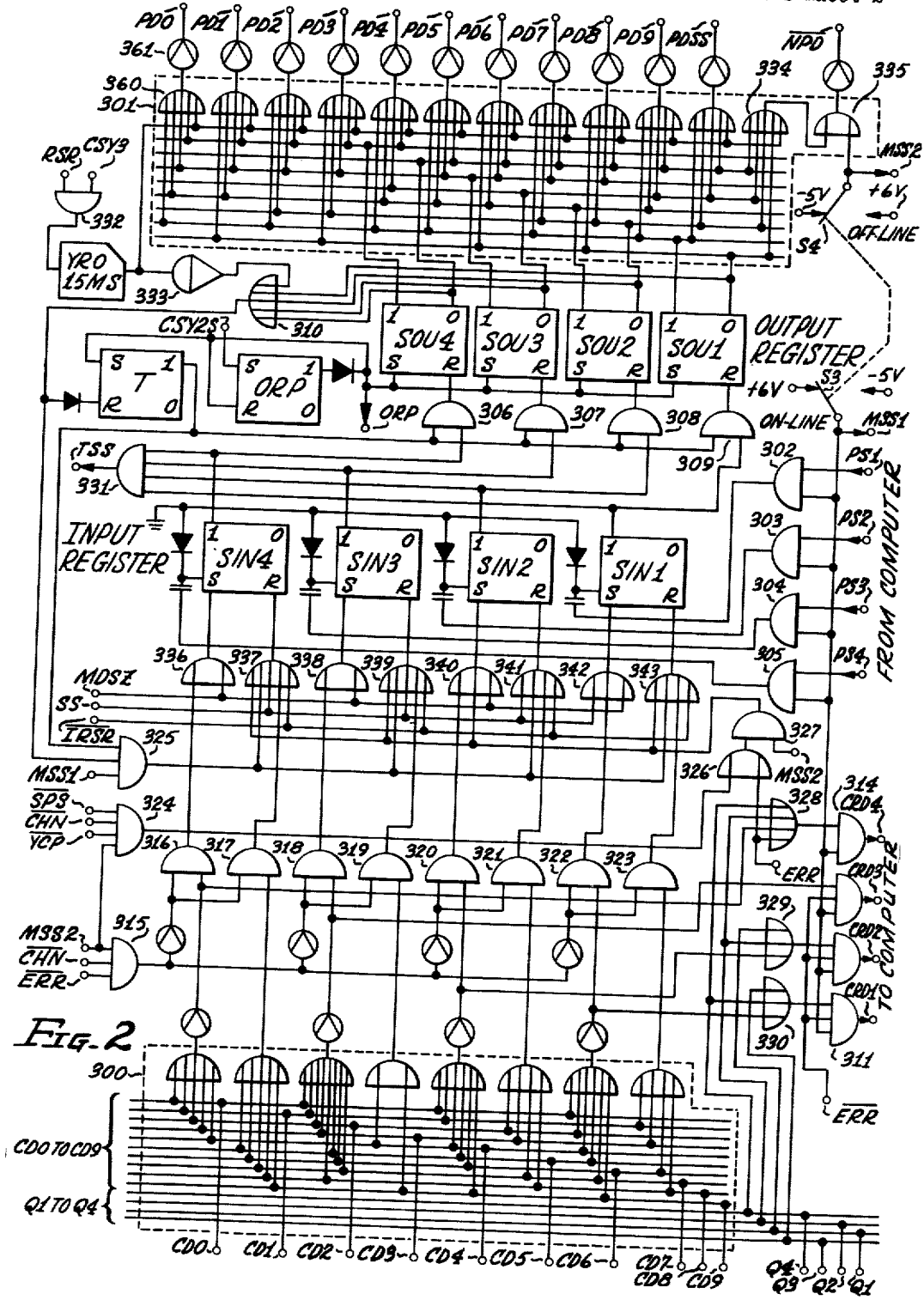
FIG. 2 is a schematic diagram of an input register and an output register and their control network.

As a given document is scanned by the reading apparatus (FIG. 1) and interpreted by the character reader 2 into corresponding CD0 to CD9 signals, the inverse biquinary coded numerical equivalents of the digits read on the documents are transmitted to the computer 15 through enabled AND-gates 311 to 314 (FIG. 2). The computer processes the information read and produces a pocket decision in accord with a computer-stored program.

During on-line sorting, a switch S3 provides an MSS1 (+6 volts) signal to enable the AND-gates 302 to 305 and 311 to 314, thereby effectively coupling the coder 300 to the computer and the computer to the input register SIN1 to SIN4. The signal-translating channels from the coder 300 to the input register are disabled during on-line operation by the absence of an MSS2 (+6 volts) signal at an AND-gate 335 from a switch S4. During off-line operation, the on-line switch S3 is actuated to provide an $\overline{\text{MSS1}}$ (−5 volts) signal to disable the AND-gates 302 to 305 and 311 to 314 while the off-line switch S4 is actuated to provide the MSS2 (+6 volts) signal. It should be noted that the switches S3 and S4 are illustrated in the proper position for an on-line operation.

The inverse biquinary code for the digits 0 to 9 as entered into the input register either from the coder 300 or the computer via AND-gates 302 to 305 is in accordance with the following table:

| Digit | SIN4 (5) | SIN3 (4) | SIN2 (2) | SIN1 (1) |
|---|---|---|---|---|
| 0 | 1 | 1 | 1 | 1 |
| 1 | 1 | 1 | 1 | 0 |
| 2 | 1 | 1 | 0 | 1 |
| 3 | 1 | 1 | 0 | 0 |
| 4 | 1 | 0 | 1 | 1 |
| 5 | 0 | 1 | 1 | 1 |
| 6 | 0 | 1 | 1 | 0 |
| 7 | 0 | 1 | 0 | 1 |
| 8 | 0 | 1 | 0 | 0 |
| 9 | 0 | 0 | 1 | 1 |

It should be noted that, although the present embodiment of the invention is for a numeric system and the characters read from the documents are the decimal digits 0 to 9, the invention may be adapted for an alphanumeric system by providing an appropriate alphanumeric coder so that documents may be sorted alphabetically as well as numerically in the event that letters of the alphabet are included in the fields printed on the documents to be read. Accordingly, the digits 0 to 9 may be referred to more generically as characters. It should be understood, however, that both the sorter and the character reader must also be modified if an alphanumeric system is to be provided.

As the pocket decision is transferred from the input register to the output register, each bit is individually complemented so that the digits 0 to 9 are represented in the output register by a true biquinary code. In addition to the binquinary coded digits which may be transferred to the output register for decoding in response to which one of the pocket signals PD0 to PD9 is generated, a special-sort 1110 may be transferred to the output register from the input register wherein it is first entered as an inverse code 0001. That inverse special-sort code is entered into the input register in response to a special-sort signal SS from the control section illustrated in FIG. 3. As noted hereinbefore, if a pocket decision signal is not delivered to deposit a given check in one of the sorter pockets ZERO to NINE or the Special Sort pocket SSP, the document will be automatically deposited in the REJECT pocket.

From the foregoing it may be seen that the transmission channel of the sorter control unit 3 (FIG. 1) which is schematically illustrated in FIG. 2 comprises: a coder for translating inverse biquinary coded digits to the computer for on-line operation and to the input register for off-line operation; an input register for receiving inverse biquinary coded digit signals from the computer during on-line operation and from the coder during off-line operation; and an output register for translating biquinary coded signals to the coder 301 for transmitting pocket decision signals to the sorter at a time when the leading edge of the document is approaching the Special Sort pocket SSP (FIG. 1). Accordingly, the transmission channel functions as a means for producing a signal in an output circuit corresponding to the character of indicia being scanned by the reading apparatus of the sorter illustrated in FIG. 1 during off-line operation and for translating a signal in respective output circuits in response to binary coded groups of digital signals from the computer during on-line operation in order to cause documents being scanned to be automatically deposited in corresponding pockets in response to signals in the respective output circuits, a signal being produced in an output circuit for each document to direct it to one of the pockets ZERO to NINE, or the Special Sort pocket SSP under certain circumstances as described hereinafter.

The cue symbols read from a document are not encoded by the digit coder 300 but simply translated as corresponding signals Q1 to Q4 to a section 350 (FIG. 3) for generating sampling pulses and to OR-gates 328, 329 and 330 (FIG. 2) which, together with AND-gates 311 to 314 function to encode cue symbols for translation to and utilization in the computer.

Figure 3:
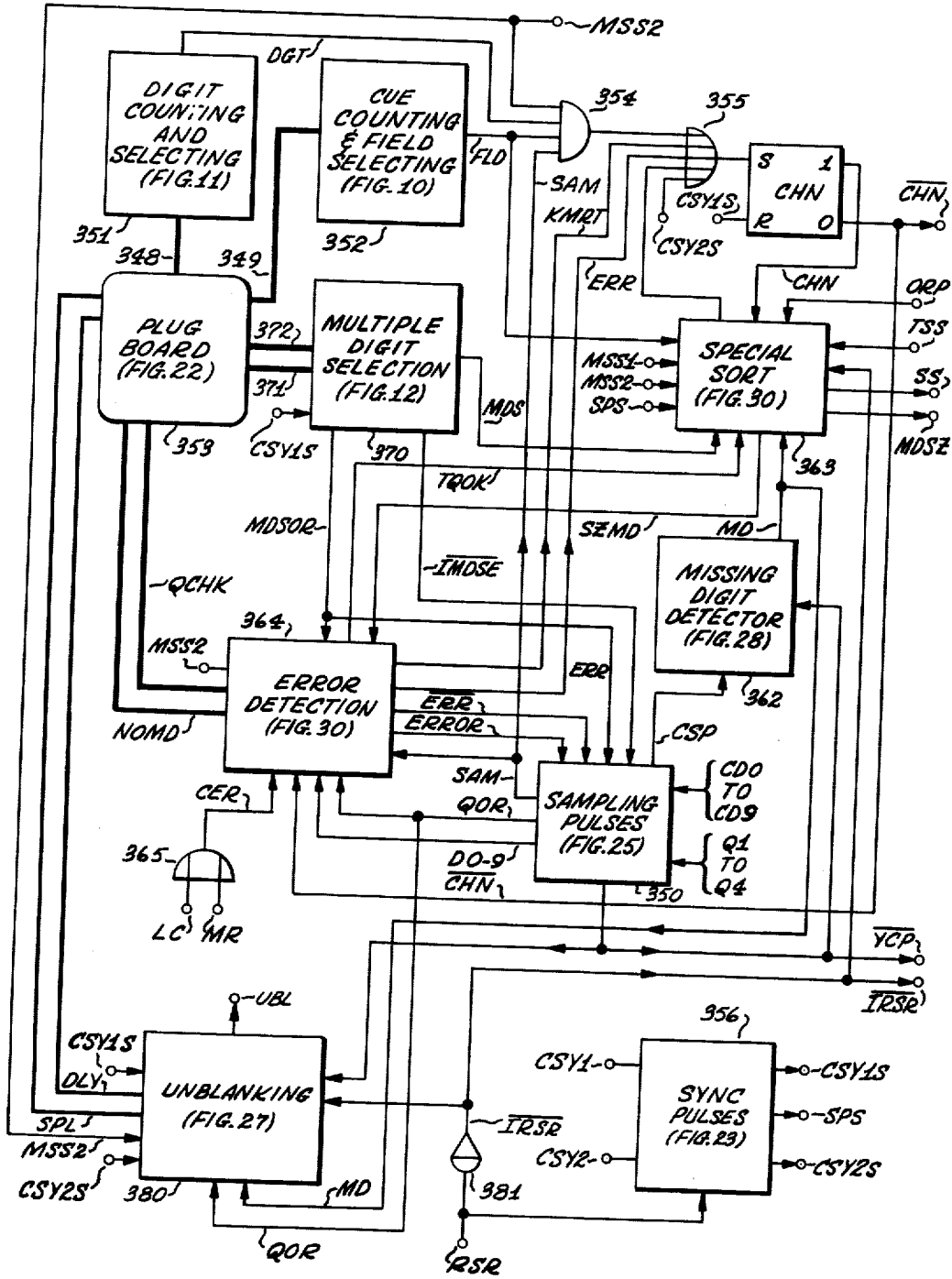
FIG. 3 is a functional block diagram of the sorter control unit in FIG. 1 employed to provide signals to the control network in FIG. 2.

Referring to FIG. 3, as the cue and digit characters are read and their corresponding signals CD0 to CD9 and Q1 to Q4 enter the sorter control, the signals are each counted by individual counters. As noted hereinbefore, during an off-line mode of operation, a pocket decision is made by the sorter control unit in accord with plugboard and control-switch programming by selecting a particular field and a digit specified within that field. Accordingly, the signals CD0 to CD9 are applied indirectly to a section 351 for counting and selecting a specified digit and the signals Q1 to Q4 are applied to a section 352 for counting the cue symbols in order to select a specified field. Through the use of a plugboard 353 and control switches in the digit and field-selecting sections 351 and 352, respectively, any portion of the document's content can be selected for sorting. The digit and field selections are programmed by connections made through the plugboard with conductors represented as cables 348 and 349 in FIG. 3. Thus, although control switches are provided to specify a particular field and a digit within that field on which to sort for normal off-line sorting, it is through the plugboard that flexibility is achieved in adapting the sorter control unit for sorting documents printed with different formats.

The cue-counting and field-selecting section 352 employs four cue counters, one counter for each of the signals Q1 to Q4. Logic diagrams for the cue counters are illustrated in FIGS. 13 to 16. When the field specified has been located, the cue-counting and field-selecting section 352 transmits a signal FLD to an AND-gate 354.

The digit signals CD0 to CD9 within a given field are counted by the digit-counting and selecting section 351. When the digit position specified has been found by counting the appropriate number of digit signals, a signal DGT is transmitted to the AND-gate 354. It may be noted that a signal DGT is transmitted once during each field as the fields are read in sequence; however, a +6-volt signal is transmitted by the AND-gate 354 only when the field specified is being scanned and a signal FLD is present. The AND-gate 354 also requires a signal MSS2 from the switch S4 (FIG. 2) actuated for an off-line operation and a sampling signal SAM from the section 350 for generating sampling pulses in order to transmit a +6-volt signal through an OR-gate 355 to the set control terminal of a character-decision flip-flop CHN. Upon the occurrence of the next clock pulse, the flip-flop CHN is set thereby disabling the AND-gates 315 to 323 in FIG. 2 and preventing further encoded digits from being translated to the input register. Thus, although all digits read sequentially are encoded and entered in the input register as they are read from a given document, when a character decision is reached, the digit read at that time is locked in the input register and later transferred to the output register upon the occurrence of a CSY2S signal from a section 356 (FIG. 3) for generating synchronizing pulses. A CSY2S pulse is generated after sufficient time has been allowed to read all of the fields in a given document.

The CSY2S signal sets the flip-flop ORP upon the occurrence of the next clock pulse which in turn enables the encoded digit to be transferred from the input register to the output register by first presetting the output register to a code configuration of 1111 and then enabling the AND-gates 306 to 309 via the flip-flop T. It should be noted that all flip-flops, such as the output register flip-flops, the flip-flop ORP, the flip-flop T and the flip-flop CHN are synchronized flip-flops which receive a clock pulse from a common source not shown. Thus, the flip-flop T is set by the same clock pulse which presets the output register to the binary configuration 1111. The next succeeding clock pulse sets the output register to the inverse or one's complement of the contents of the input register and at the same time resets the flip-flop T. Note also that the flip-flop ORP is reset by the same clock pulse which sets the flip-flop T. In that manner, the flip-flops ORP and T function as an interlock between the input register and the output register for a controlled transfer of information therebetween.

Following the transfer of information from the input register to the output register in response to a CSY2S pulse, a CSY3 pulse triggers a monostable multivibrator YR0 (FIG. 2) through an AND-gate 332 which is enabled by an RSR signal from the relay K1 (FIG.1) that is energized when the switch S1 is closed and power is applied to operate the sorter. The output signal $\overline{YR0}$ of the monostable multivibrator YR0 is a negative-going-(+6 to −5 volts) signal employed to enable a group of gates, such as a gate 360, to transmit a pocket-decision signal in accord with the contents of the output register.

The gates of the digit decoder 301, such as the gate 360, are shown schematically as logic gates which perform an OR function; but, although other types of gates, such as the AND-gate 332, are normally employed to perform an AND function so that a signal is translated only when the signals RSR and CSY3 are coincidentally present, the gate 360 schematically illustrated as an OR-gate is also employed in the decoder 301 to perform an AND function owing to the use of negative logic such that negative potentials represent the presence of desired signals. In other words, the role of the circuits represented by the symbols shown for the decoder 301, such as the gate 360, is reversed because a binary digit 1 is represented by a negative signal instead of a positive signal. However, the structure of the circuits remains the same; therefore, the OR-gate symbol is employed to represent the circuits even though their role is reversed to an AND function. For a more complete explanation, see pages 32 and 33 of Arithmetic Operations in Digital Computers by R. K. Richards, published in 1955 by D. Van Nostrand Company.

The pocket-decision signal, such as a signal PD0 for the ZERO pocket translated to an inverting amplifier 29 (FIG. 1), must be a negative signal in order to cause a signal to be recorded on a corresponding disc, such as the disc 34, and thereby cause the document to be deposited in the appropriate pocket. Accordingly, all input terminals of the OR-gate 360 must be negative in order to transmit a negative pocket-decision signal PD0 via an emitter-follower 361. As noted hereinbefore, the code for the digit 0 in the input register is 1111.

Upon being transferred from the input register to the output register, each binary digit of the inverted biquinary code for a digit 0 is complemented so that a 0 is represented by the biquinary 0000 in the output register. With all of the output register flip-flops SOU1 to SOU4 reset when a biquinary code 0 is stored therein, the true output terminals connected to input terminals of the OR-gate 360 are negative. Due to the manner in which all of the OR-gates in the digit decoder are connected to the flip-flops of the output register, only the OR-gate 360 will have all of its input terminals at a negative level while a coded digit 0 is stored in the output register. Accordingly, only a PD0 signal is transmitted to the sorter.

While locating a specified digit in a field selected for sorting, certain tests are performed in order to avoid sorting on a digit read from a digit position other than the one specified. For example, assume that a group of documents are to be sorted according to the digit in the third digit position starting from the right in the transit-number field. When the transit-number field is located in a given document by the cue-counting and field-selecting section 352, a signal FLD is transmitted to the AND-gate 354. Thereafter, when the digit-counting and selecting section 351 has counted three digits, a signal DGT enables the AND-gate 354 and the character decision flip-flop CHN is set to thereby lock the inverse biquinary code of the digit read from that digit position in the input register. Further assume that the third digit in the transit-number field of a given document is missing due to some error in printing the document. Under those circumstances, the given document will be sorted according to the digit printed in the fourth digit position of the transit-number field because the digit missing in the third digit position will not increment the digit counter to a count of three and the digit read from the fourth digit position increments the digit counter to a count of three. Accordingly, a test is made for a missing digit in any digit position prior to the selected digit position of the specified field. If a missing digit is detected, the document is deposited in the REJECT pocket.

A missing-digit detector 362 is provided to detect missing digits by detecting the presence of a blank space on a document being scanned and the presence of any character printed and read from the next higher order digit position. Thus, the missing-digit detector is actually a space detector that makes a missing-digit decision after finding a space greater that that allowed for one digit.

A missing-digit signal MD is transmitted to a special-sorting section 363 for further processing to determine that a digit was in fact missing since the missing-digit detector renders a missing-digit decision when a space greater than that allowed for a single digit is encountered irrespective of whether the space is in fact due to insignificant zeros which were not printed and which are referred to herein as suppressed zeros. If the special-sorting section 363 determines that the missing digit was not a suppressed zero as evidenced by the presence of any digit from 0 to 9 occurring after the space but before the next cue symbol is read, a signal SZMD is transmitted to an error-detection section 364. The error-detection section 364 then transmits a signal ERR to the OR-gate 355 to set the character-decision flip-flop CHN and thereby block further transfer of encoded digits from the digit coder 300 (FIG. 2) to the input register and to enable an AND-gate 327 (FIG. 2) to transmit a +6-volt signal through OR-gates 337, 339, 340 and 343, thereby inserting into the input register a reject code 0010. However, a signal ERR is not transmitted by the error-detection section 364 unless one of the digits 0 to 9 is read after a missing-digit decision is made and an SZMD signal is transmitted from the special-sort section 363 to the error-detection section 364.

In some instances it may be desirable to program the sorter control unit to ignore a missing digit, such as when a particular field selected for sorting contains a legitimate missing digit. When that is so, it is necessary to inhibit the missing-digit-detection function while reading that particular field. That may be accomplished by plugboard programming through a group of conductors schematically illustrated in FIG. 3 as a cable NOMD, a mnemonic code for "no missing digit."

In order to determine that the documents being sorted have been properly printed, a cue-count check may be performed by counting the number of cue symbols present and thereby determine whether all fields have been properly printed. It is desirable to provide flexibility in such a check since, for example, an "auxiliary on-us" field may not be printed intentionally on some documents to be sorted or documents having the dollar amount printed may be included with documents not having the dollar amount printed. Accordingly, for flexibility in using the cue-count check, two field counts may actually be performed. Provision for more could be provided as required. A field count is actually performed by counting the cue symbols and decoding the count of the cue symbols when a CSY2S signal occurs after sufficient time has been allowed to read all of the fields on a given document. An error signal is produced if the total cue count does not correspond to at least one of the formats programmed through the plugboard 353. Accordingly, a cue-count check is programmed by making proper connections between the digit counters and appropriate logic AND-gates in the error-detection section 364 through the plugboard 353 as represented schematically in FIG. 3 by conductors schematically illustrated in FIG. 3 as a cable QCHK, a mnemonic code for "cue-count check."

The character reader 2 (FIG. 1) is designed to detect certain errors which occur in reading a given character on a document. First, in the event the character reader has detected what appears to be a defective character due to magnetic particles on the document in the space between characters such that upon scanning the character an excessively long waveform is produced, a long-character error signal LC is produced. When such a condition is detected, the signal LC is transmitted by the character reader to an OR-gate 365 (FIG. 3). Second, if the character read is defective such that the character reader cannot distinguish it from some other character, the character reader will transmit a multiple-read signal MR to the OR-gate 365.

The output of the OR-gate 365 transmits a character-error signal CER to the error-detection section 364 and thereby causes the document to be deposited in the REJECT pocket, but only if the character-error signal CER occurred while the selected digit position was being read, so that only the character on which the pocket decision is to be made may initiate an error reject in that manner, or when any cue symbol is being read. A character-error signal CER is also effective to reject the document whenever the signal CER is received by the error-detection section 364 while a selected field is being scanned during a multiple-digit selecting mode of operation or at any time that data is being read for transmittal to the computer during an on-line mode of operation.

A multiple-digit-selection section 370 is provided for numerous applications with respect to depositing a particular document of a batch of documents being sorted in the Special Sort pocket SSP. For instance, if it is desired to sort all documents that contain designated digits in specified positions within particular fields, necessary connections are made between the plugboard 353 and the multiple-digit-selection section 370 through two sets of conductors illustrated in FIG. 3 as cables 371 and 372. As the document passes the photocell 18 (FIG. 1) a CSY1 pulse is transmitted to the sorter control unit and there synchronized by the synchronized pulse generator 356 to derive a CSY1S pulse which is applied to the multiple-digit-selection section 370 in order to effectively reset it. Following that, as the document is scanned, the digit positions 1 and 3 are located within respective fields 2 and 4 and effectively compared with a digit zero. If a digit zero is detected in the two specified positions, the multiple-digit-selection section remains reset and an MDS signal is transmitted to the special-sort section 363 to effectively cause the document to be deposited in the Special Sort pocket SSP. When the multiple-digit-selection section 370 is utilized in that manner, negative logic is employed because it is assumed that a document will be deposited in a Special Sort pocket unless each digit specified fails to effectively compare with the digit designated. Using that negative logic, if a specified digit in a given position fails to effectively compare with a designated digit, the multiple-digit-selection section is set and transmission of an MDS signal to the special-sort section 363 is inhibited, thereby effectively preventing the document from being deposited in the Special Sort pocket SSP.

The decision to deposit a document in the Special Sort pocket during multiple digit selection is not made until all of the fields of the document have been scanned. Accordingly, normal sorting may be employed to deposit documents in pockets ZERO to NINE while using the multiple-digit-selection section. If an MDS signal is not transmitted to the special-sort section 363 from the multiple-digit-selection section 370 at the conclusion of reading all of the fields on a given document, the document is deposited in one of the pockets ZERO to NINE in the normal sorting manner utilizing the digit-counting and selecting section 351, cue-counting and field-selecting section 352, AND-gate 354, OR-gate 355 and the character-decision flip-flop CHN. If an MDS signal is transmitted to the special-sort section 363, a decision to deposit the document in the Special Sort pocket SSP overrides any pocket decision made in the normal sorting manner.

A switch is provided in the multiple-digit-selection section 370 to reverse the negative logic utilized for multiple digit selection such that all documents are deposited in the Special Sort pocket SSP unless all of the digits selected compare with corresponding digits designated, in which case an MDS signal is inhibited from being transmitted to the special-sort section 363, thereby allowing the document being scanned to be sorted in a normal manner. Accordingly, by reversing the logic of the multiple-digit-selection section 370, all documents having specified digits in designated positions are not deposited in the Special Sort pocket; instead, they are sorted in a normal manner. In that manner a group of documents may be picked out of a batch by utilizing the multiple-digit-selection section 370 while at the same time sorting the documents thus picked out in a normal manner.

At noted hereinbefore, the multiple-digit-selection section 370 may be employed for depositing documents in the Special Sort pocket only during an off-line operation while the switch S4 (FIG. 2) provides an MSS2 (+6 volts) signal to the special-sort section 363. An additional switch is provided in the special-sort section 363 to enable it to operate in a multiple-digit-selecting mode during off-line operation.

The photoelectric cell 18 and monostable multivibrators CSY1, CSY2 and CSY3 are provided in the sorter (FIG. 1) to generate CSY1, CSY2 and CSY3 timing pulses for the sorter control unit. The first pulse CSY1 effectively starts the timing sequence of a document-reading period while the second pulse CSY2 effectively terminates the document-reading period and initiates the actual sorting operation. The third pulse CSY3 effectively causes the sorting operation to be executed. If documents follow closely one behind the other, it is possible to have a second CSY1 pulse occur before the CSY3 pulse for the first document occurs, but the overlap in timing for two successive documents will not affect the operation of the sorter control unit 3. The section 356 (FIG. 3) for generating synchronizing pulses CSY1S and CSY2S is provided to aid in the synchronization of the pulses derived from the monostable multivibrators CSY1 and CSY2 of the sorter. The section 356 for generating synchronous pulses also produces a special synchronizing signal SPS which is applied to the special-sort section 363 for synchonization.

CIRCUITS

Before proceeding with a description of an illustrative embodiment of the present invention, functional circuits which may be employed to implement its logic diagrams will first be described. Symbols employed to represent the functions which the circuits provide in the logic diagrams will be illustrated and described with reference to their associated circuits. It should be understood that the specific circuits shown are only illustrative; therefore, this invention is not to be considered as limited to the employment of the specific circuits shown.

In the figures for the circuits, specific values of the circuit components are shown. These values are not to be considered as limiting since the circuits will often function satisfactorily with considerable variation from those values.

Flip-Flop

The flip-flop of FIG. 4 provides temporary storage of a binary digit or of a control signal. Generally, when a flip-flop is employed to store a binary digit, it comprises one of an array of flip-flops denoted as a register. For example, in a register adapted to provide temporary storage for a four-digit number, four flip-flops are employed, one for each binary digit of the number.

The flip-flop is a circuit adapted to operate in either one of two stable states, and to transfer from the state in which it is operating to the other stable state upon receiving a clock pulse. In one state of operation referred to as the set state the flip-flop represents the binary digit one and in the other state referred to as the reset state the binary zero. The flip-flop circuit includes a pair of cross-coupled transistor amplifiers comprising transistors 101 and 102. The cross-coupled transistor amplifiers are connected to grounded-emitter transistor output amplifiers comprising transistors 103 and 104 the respective output signals of which represent the binary digits one and zero according to the stable state in which the flip-flop is operating. The two output amplifiers are designated respectively the 1-output amplifier and the 0-output amplifier.

The flip-flop is adapted to receive five input signals as follows:

(a) A clock pulse signal at an input terminal 105 and supplied by a central clock pulse source;

(b) An input signal for triggering the flip-flop to its set state at an input terminal 106 and usually supplied by a logic gate;

(c) An input logic signal for triggering the flip-flop to its reset state at an input terminal 107 and usually supplied by a logic gate;

(d) An input signal for triggering the flip-flop to its set state at an input terminal 108 and usually supplied by a register transfer circuit; and (e) An input signal for triggering the flip-flop to its reset state at an input terminal 109 and usually supplied by a register transfer circuit.

A +6-volt output signal representing the set state of the flip-flop is delivered at an output terminal 110 and a +6-volt signal representing the reset state of the flip-flop is delivered at output terminal 111.

The operation of the flip-flop is conventional. In both of the stable states of the flip-flop one of the transistors 101 and 102 is conducting and the other is non-conducting. When the transistor 101 conducts, its collector electrode voltage is approximately at +8 volts. This voltage coupled to the base electrode of transistor 102 causes the potential thereof to be approximately +8.3 volts, thereby maintaining the transistor 102 in its non-conducting state. The flip-flop will continue in this reset state until application of a positive voltage greater than +8 volts to the base electrode of transistor 101. When transistor 101 momentarily ceases conducting, the collector electrode potential thereof becomes momentarily more negative. This negative change in potential is coupled through a capacitor 114 to the base electrode of transistor 102 to cause it to commence conducting, whereupon the collector potential of transistor 102 begins rising. This potential rise is coupled by a capacitor 115 to the base of transistor 101. The positive-going voltage signal coupled to the base of transistor 101 tends to further decrease its ability to conduct. This regenerative action continues until transistor 102 is fully conducting and transistor 101 is non-conducting, at which time the flip-flop has transferred from the reset state to the set state.

When the flip-flop is in its reset state, the +8 volts of the collector of the transistor 101 is coupled to the transistor 103 to maintain it in a state of non-conduction. The signal provided at the output terminal 110 is then —5 volts. Inasmuch as the system is designed to respond to positive signals, a —5-volt signal delivered at the output terminal 110 denotes a binary zero. Similarly, when transistor 101 is conducting, a negative voltage is coupled to the transistor 104 which conducts and delivers a +6-volt signal at the output terminal 111. The circuits of the system are adapted to respond to the +6-volt signal which is employed to represent a binary one. Therefore, when the flip-flop is in the reset state, a 0-output signal is provided by the 1-output terminal and a 1-output signal is provided by the 0-output terminal. Thus, system elements intended to respond to the reset state of the flip-flop will be enabled by the +6-volt signal delivered at terminal 111, whereas elements intended to respond to the set state of the flip-flop will be disabled by the —5-volt signal delivered at terminal 110.

Conversely, when the transistor 102 is conducting so that the flip-flop is in its set state, a +6-volt signal representing a binary one is supplied at the terminal 110 and a —5-volt signal representing a binary zero is supplied at the terminal 111. Thus, the designation of output terminal 110 as a 1-output terminal indicates that when the flip-flop is set, a binary 1-output signal is provided therefrom. The designation of terminal 111 as a 0-output terminal indicates that when the flip-flop is reset, a binary 1-output signal is provided therefrom.

Consider now the input signals which will transfer the flip-flop from a given state in which it is operating to the other state in response to complementary signals applied to terminals 106 and 107. When the complementary signals represent a binary zero, the signals applied to terminals 106 and 107 are —5 and +6 volts, respectively; when the complementary signals represent a binary one, the signals are +6 volts and —5 volts, respectively. Inasmuch as a +8-volt bias is applied to the emitters of both transistors 101 and 102, the one that is conducting is not rendered non-conductive in response to a +6-volt signal applied to its base to trigger the flip-flop to its other stable state.

The complementary input signals applied to terminals 106 and 107 are coupled to the respective capacitors 116 and 117 by diodes 119 and 120 to charge the corresponding capacitors to the respective input signal voltages. When a clock pulse is applied to terminal 105, the terminal will be driven positively by approximately +11 volts. If a +6-volt signal is present at terminal 106, the clock pulse signal is superposed thereon and momentarily drives the corresponding base electrode of the transistor 101 to +17 volts, a voltage sufficient to momentarily cause the transistor to stop conduction if it is conducting and thereby change the state of the flip-flop. However, if the terminal 106 is receiving a —5-volt signal, the clock pulse will cause a signal of only +6 volts to be applied to the base electrode of the transistor 101, a signal insufficient to change the state of the flip-flop.

That manner of triggering a flip-flop is known as clock-pulse-pedestal triggering and enables the flip-flops of the system to change their state in synchronism with the clock pulses. Between clock pulses, which occur every four microseconds, there is adequate time for the logic circuits of the system to change state and for the resulting logical combination of signals to stabilize at the logic input terminals of all flip-flops so that when clock pulses are applied to the flip-flops, the complementary input signals will determine whether a given flip-flop will change state. Since clock pulses are applied to both sides of the flip-flop simultaneously, only one of the input signals to the flip-flop is ordinarily permitted to be +6 volts at any given time. If both input signals were +6 volts, the clock pulse would attempt to turn off both transistors simultaneously and the flip-flop would probably not change its state. Similarly, if both input signals are at —5 volts, the flip-flop cannot be triggered to its other stable state.

The diodes 119 and 120 isolate the input signal sources from the flip-flop when the clock pulse is applied. The combination of the silicon and germanium diodes coupled to transistors 101, 102, 103, and 104 prevent saturation and are similar to those described for the inverter shown in FIG. 7.

In addition to the clock-pulse-pedestal manner of triggering a flip-flop, each flip-flop may be set or reset asynchronously by an input signal of proper amplitude, applied to the input terminals 108 or 109. To set a flip-flop, for example, a positive signal of about +11 volts may be applied to the input terminal 108. That may be accomplished by providing a positive-going (—5 to +6 volts) signal through a capacitor to the set input terminal 108 and clamping that set input terminal to ground by a diode as illustrated for the flip-flop SIN4 in FIG. 2 so that the positive eleven-volt swing coupled to it drives the base of the transistor 101 from ground to about +11 volts, thereby cutting off the transistor 101 and setting the flip-flop, and any negative eleven-volt swing is shunted to ground. Similarly, to reset a flip-flop, a positive signal of about eleven volts may be applied to the reset input terminal 107.

Flip-flops are identified in accordance with the function they perform. For example, a typical flip-flop employed for control is identified as the flip-flop UBL in FIG. 27. The UBL designation is a mnemonic code for "unblanking," and the flip-flop UBL, when in the set state, provides an unblanking signal to enable the system to function either on-line or off-line. A typical flip-flop employed for temporary storage of data is the SIN1 flip-flop. When the SIN1 flip-flop stores a binary one, a +6-volt output signal is produced at its 1 output terminal.

A symbol 122 employed to represent a flip-flop is illustrated in FIG. 4. Its four input terminals and two output terminals are identified by the same reference numerals as in the circuit diagram. The input terminals 106 and 107 which require a clock pulse are shown entering a rectangle on a side opposite the output terminals whereas the asynchronous set and reset input terminals are shown entering the remaining two sides. The input terminal 105 for the clock pulse is not shown in the symbol, it being understood that a clock pulse is being applied continuously to each flip-flop. The mnemonic code employed to identify a flip-flop will be shown within the rectangle. Any input terminal not employed will not be shown, such as the asynchronous input terminal 109. For example, the symbol 122 may be employed to represent the unblanking flip-flop UBL in FIG. 27. The symbol indicates that the flip-flop UBL receives the clock pulses continuously and that the set and reset input terminals to the symbol 122 (FIGURE 4) represent the respective input terminals 108 and 109 which are not used and therefore not shown in FIG. 27. The notation CSY1S opposite the set input terminal identifies the signal adapted to synchronously set the flip-flop UBL. That notation is a mnemonic code which may be identified with its source; namely, an output terminal of a circuit which is identified by the reference characters CSY1S. Since that output terminal is to be directly connected to the set input terminal of the flip-flop UBL, the input terminal of the flip-flop UBL, and any other circuit to be driven by the same signal, may be identified by the same reference characters CSY1S. That signal is referred to as the signal CSY1S. The two complementary output terminals "1" and "0" may be identified by the reference characters UBL and $\overline{UBL}$, respectively. Using the same convention as for the input terminal CSY1S, the notation UBL for the 1-output terminal has the dual function of identifying the flip-flop UBL and of identifying the 1-output terminal thereof, the signal output of which is also referred to as the UBL signal when the flip-flop UBL is set.

*AND-Gate*

The AND-gate of FIG. 5 provides the logical operation of conjunction for positive input signals applied thereto. In the system a binary one is represented by a signal of approximately +6 volts. Therefore, the AND-gate provides an output signal of approximately +6 volts representing a binary one only when each of the input signals applied thereto represents a binary one.

The AND-gate is illustrated, by way of example, as having three input terminals 126, 127, and 128, and a single output terminal 129. The AND-gates employed in the system are not limited to three input terminals, but may have from two input terminals to the ultimate number necessary for the required conjunctive operation. The symbol 135 is employed to represent an AND-gate having three input terminals.

When a −5-volt signal representing a binary zero or a "false" statement is applied to the input terminals 126 to 127, current flows from a +70-volt source through a resistor 130 and the diodes 131, 132 and 133 to respective terminals 126, 127 and 128. If any one of the input signals is at −5 volts, the corresponding diode will conduct and all other diodes of the AND-gate receiving a +6-volt signal will be reverse biased so that the output signal from the terminal 129 will be at −5 volts. Therefore, only when all input signals are at the +6 volts representing a binary one or a "true" statement will the output signal be at +6 volts.

The input signals to the particular AND-gate shown are, for illustration, denoted $Tp$, $Tq$ and $Ts$. Therefore, the output signal may be denoted $Tu\ Tq\ Ts$. The expression $Tp\ Tq\ Ts$ is the logic expression for the conjunctive combination of the individual signals $Tp$, $Tq$ and $Ts$. This form of expression is used in logical equations which may be employed to define a configuration of AND- and OR-gates coupling signal sources to load devices.

*OR-Gate*

The OR-gate of FIG. 6 provides the logical operation of inclusive-or for positive input signals applied thereto. It provides an output signal of approximately +6 volts, representing a binary one or "true" statement when any one of the input signals applied thereto represent a binary one or "true" statement.

The OR-gate of FIG. 6 is illustrated, by way of example, as having three input terminals 140, 141 and 142 and a single output terminal 143. The OR-gates employed in the system are not limited to three input terminals, but may have from two input terminals to the ultimate number necessary for the required inclusive-or operation.

When a −5-volt signal representing a binary zero or a "false" statement is applied to the input terminals 141 to 142, current flows from the input terminals through diodes 145, 146 and 147, and a resistor 148 to a −70-volt source. If any one of the input signals is at +6 volts, the corresponding diode will conduct and all other diodes of the OR-gate receiving a −5-volt signal will be reverse biased so that the output signal from the terminal 143 will be at +6 volts and will represent a binary one or "true" statement. Therefore, when any one of the input signals is +6 volts, the output signal will be +6 volts.

The symbol 149, shown in FIG. 6, is employed to represent the OR-gate which for illustration is shown as having three input terminals. The three input signals to the OR-gate may be denoted $Tp$, $Tq$ and $Ts$ and the output signal may be denoted $Tp+Tq+Ts$. The expression $Tp+Tq+Ts$ is the logic expression for the inclusive-or combination of the individual signals $Tp$, $Tq$ and $Ts$. This form of expression is used in logical equations which may be employed to define a configuration of AND- and OR-gates. The inclusive-or operation on any two signals, such as the $Tp$ and $Tq$ signals, is indicated by writing the two signal terms adjacent each other with the plus operator (+) notation therebetween as shown.

*Inverter*

The inverter circuit of FIG. 7 provides the logical operation of inverting or complementing a signal. The inverter is adapted to provide an output signal of approximately +6 volts representing a binary one, when the input signal received is a potential of −5 volts representing a binary zero. Conversely, the inverter provides an output signal representing a binary zero when the input signal represents a binary one. The inverter supplies an additional output signal which has the same logical significance as the input signal so that the "true" and "false" or complementary output signals of every input signal is always available.

The inverter circuit of FIG. 6 comprises an emitter follower driving a common-emitter amplifier. The emitter follower portion of the inverter comprises a transistor 155 having its output signal level clamped to have a total excursion between the extremes of −3.5 volts and +3.5 volts. The input signal is applied at terminal 156. The output signal of the emitter follower is provided at the emitter of the transistor 155 connected to a "true" output terminal 157 as a true logical representation of the inverter input signal. The output signal of the emitter follower is coupled to the common-emitter amplifier comprising transistor 158.

To analyze the operation of the inverter, first assume that a binary zero input signal is applied to input terminal 156. When an input signal of −5 volts is applied to the base of transistor 155, the emitter of transistor 155 provides a −5-volt signal at the "true" output terminal 157, thereby driving a junction 160 to −3.5 volts. Under those conditions current flows from the +70-volt source through a resistor 161, silicon diode 162 and resistor 163 to the junction 160. The voltage at the base of the transistor 158 is then below +6 volts so that transistor 158 conducts and supplies a +6-volt output signal at the output terminal 165. In that manner, the inverter delivers an output signal representing a binary one when the input signal represents a binary zero.

If the input signal represents a binary one, a +6-volt signal is applied to the base of the transistor 155 to cause the transistor 155 to cease conducting and thereby drive the junction 160 to +3.5 volts. The value of voltage at the base of the transistor 158 tends to go above +6 volts so that current flows through the diode 166 and drives the transistor 158 off. Under those conditions, the output signal at the terminal 165 is at −5 volts. In that manner, a binary one input signal provides a binary zero output signal from terminal 165.

A capacitor 167 functions to speed the response of the inverter when the input signal changes from −5 to +6 volts and a capacitor 168 prevents bypassing the silicon diode 162. The silicon diode 162 and a germanium diode 169 prevents saturation of the transistor 158.

A symbol 170 illustrated in FIG. 6 is employed to represent an inverter. By way of example, the input signal to the inverter is denoted as the signal Sig. The logically inverted signal provided at the "false" output terminal 165 of the inverter is designated as $\overline{\text{ISig}}$. The signal provided at the "true" output terminal 157 is not logically inverted and is represented by the legend ISig. Thus, the "true" output signal of an inverter may be identified with the prefix I to the input signal term. The inverted output signal may be similarly written and distinguished by a superscribing bar.

*Emitter Follower*

The emitter followers illustrated in FIG. 8 are employed in many parts of the logic networks of the system. The primary function of an emitter follower is to provide current gain in order to supply the input current requirements of a large chain of logic gates which a flip-flop or similar signal source would be unable to drive directly. The specific locations of the emitter followers in the system will not be referred to in the description to follow; however, they are illustrated at various locations such as following flip-flops and at other locations to satisfy large current requirements.

Two types of emitter followers are shown in FIG. 8. The first type, comprising a PNP transistor 175, is identified as a PNP emitter follower. The second type, comprising a NPN transistor 176, is identified as an NPN emitter follower. Generally, the PNP emitter follower drives an AND-gate and the NPN emitter follower drives an OR-gate. The emitter follower provides an output signal having the same logical sense as the input signal; i.e., the emitter follower delivers a binary one output signal when the input signal represents a binary one and vice versa. A symbol 178 illustrated in FIG. 8 is employed to represent an emitter follower of either type.

*Monostable Multivibrator*

The circuit diagram of a monostable multivibrator or one-shot circuit illustrated in FIG. 9 provides an output signal of a predetermined duration which is usually equal to a non-integral number of clock periods and is adapted to operate in a stable state until triggered to operate in an unstable state for the predetermined duration. In the stable state of operation, the one-shot produces a +6-volt signal at an output terminal 180 and in the unstable state, a −5-volt signal.

The circuit includes a pair of cross-coupled transistor amplifiers comprising the transistors 181 and 182. The cross-coupled pair is connected to a common-emitter transistor output amplifier the output signal of which produces a −5-volt signal when the one-shot is in the unstable state. That output amplifier comprises a transistor 183. The circuit is adapted to receive two input signals, a clock pulse signal at an input terminal 184 and a logic input signal at an input terminal 185.

In the stable state of operation, the transistor 182 is conducting and the transistor 181 is non-conducting. The current flowing through a resistor 186 provides sufficient reverse bias voltage to maintain transistor 181 non-conducting. That bias voltage is divided by resistors 189 and 190 to provide preferential conduction of the transistor 182. The base potential of the conducting transistor 182 is approximately at ground so that the emitter electrodes of transistors 181 and 182 are negative with respect to ground by only a small voltage. The collector of the transistor 182 is also close to ground so that the transistor 183 conducts. The conduction of the transistor 183 provides an output signal at the output terminal 180 of +6 volts. While the circuit is conducting in the stable state, the collector potential of the transistor 181 is approximately at +70 volts. Therefore, a capacitor 192 connected between the collector of the transistor 181 and the base of the transistor 182 is charged to +70 volts.

A transistor 193 isolates the transistor 181 from the input terminals and normally is non-conducting. The logic input signal applied to the terminal 185 is either at −5 volts or at +6 volts. Either logic input signal is insufficient to trigger the circuit to its unstable state. However, if a clock pulse is applied to the input terminal 184 when the logic input signal is at +6 volts, the superposition of the clock pulse on the logic signal is sufficient to drive the transistor 193 into conduction. The positive signal of approximately +17 volts transmitted by the transistor 193 is applied to the base of the transistor 181, thereby causing it to conduct. When transistor 181 conducts, its collector potential drops. That potential drop is coupled by the capacitor 192 to the base of the transistor 182. As the base potential of the transistor 182 swings negatively, its collector current diminishes, thereby reducing the reverse bias applied to the transistor 181 which conducts more heavily. Thus, a regenerative action ensues to turn the transistor 181 on and turn the transistor 182 off. The transistor 182 is held cut off by the high reverse bias applied to its base from the capacitor 192. When the transistor 182 is non-conducting, the transistor 183 is rendered non-conducting, and the voltage at the output terminal 180 drops to −5 volts.

The capacitor 192 slowly discharges through a circuit loop provided, the discharge time being determined by the RC-time constant of the circuit loop comprising the capacitor 192, a potentiometer 194 and a resistor 195. The discharge time is also influenced by a parallel-connected capacitor 196 and any one or more of a plurality of capacitors 197, 198 and 199 which may be connected to a "capacitor return" terminal 187. The discharge time may also be altered by providing an external capacitor between an "external time" terminal 188 and the terminal 187.

In the unstable state, the emitter potential of the transistor 182 is slightly below ground. Its base potential is held below ground in accordance with the voltage stored in the capacitor 192. Therefore, as capacitor 192 discharges, the base potential of the transistor 182 rises toward the potential of the emitter. When the base potential reaches the emitter potential, the transistor 182 conducts and the one-shot returns to its stable state.

One-shot circuits are identified by a mnemonic code in accordance with the function they perform and each code is preceded by a "Y" to distinguish it from a flip-flop. For example, the YBL notation refers to a one-shot circuit (FIG. 27) which controls the time during which the unblanking flip-flop UBL may be reset to restore blanking or disabling of the system under certain circumstances. In its stable state, the YBL one-shot circuit output signal is at +6 volts and in its unstable state at −5 volts. That −5 volt signal is the output control signal generally desired from the one-shot circuit and, for the illustrative circuit YBL, it is designated by the notation $\overline{\text{YBL}}$.

A symbol 200 is employed to represent a one-shot circuit. The notation identifying the one-shot circuit and the time duration of its −5-volt output control signal is indicated within the symbol. A clock pulse input terminal is not shown with the symbol, it being understood to be present on all one-shot circuits.

DETAILED DESCRIPTION

The system described with reference to FIG. 1, and more particularly with reference to FIGS. 2 and 3, is described hereinafter in detail with reference to FIGS. 10 to 30 which show logic diagrams of the sections illustrated in block diagram form in FIG. 3. Thus, the detailed description of the system is divided into sections conforming with the block diagram of FIG. 3 so that when the logic diagrams of the sections are interconnected as suggested by FIG. 3, and as more fully described hereinafter, the data transmission channel of FIG. 2 is controlled for the transmission of data from the character reader to the sorter during an off-line mode of operation and, during an on-line mode of operation from the character reader to the computer and from the computer to the sorter as described hereinbefore. It is emphasized that all of the bistable and monostable multivibrators are clocked so that the clock pulses not illustrated in the detail logic diagrams should nevertheless be assumed to be present.

For ease in understanding the detailed description with respect to the manner in which the sections are to be connected and the manner in which they operate, legends are employed for output terminals which generally comprise three or more letters and which form mnemonic codes that may often be associated with originating bistable or monostable multivibrators or associated with a logic signal from a switch or gate. Input terminals of a given detailed logic diagram which are connected to output terminals of other logic diagrams are identified by the same mnemonic codes. The connection itself, which may be direct or through a conductor, may also be identified by the same mnemonic code since the connection is the same as the terminals. Finally, for convenience the sigal being transmitted from an output terminal to an input terminal having the same mnemonic code over a conductor, which may be identified by the same mnemonic code, will be referred to by the mnemonic code employed for the input and output termials. For instance, the flip-flop CHN in FIG. 3 has an output terminal $\overline{CHN}$ connected to its zero or "false" output terminal. That output terminal is connected to an input terminal of AND-gates 315 and 324 in FIG. 2. The output terminal $\overline{CHN}$ is also connected to the error-detection section 364 by a conductor $\overline{CHN}$ which transmits the signal $\overline{CHN}$ from the "false" output terminal of the flip-flop CHN to input terminals in the error-detection section 364. The signal $\overline{CHN}$ is a +6 signal while the flip-flop CHN is reset and a —5-volt signal while it is set. The "true" output terminal of the flip-flop CHN is connected to input terminals of the special-sort section 363 by a conductor CHN. The output signal CHN taken from the "true" output terminal of the flip-flop CHN is a —5-volt signal while the flip-flop CHN is reset and a +6-volt signal while it is set. Thus, the mnemonic codes employed for reference to input and output terminals, and to connectors therebetween, aid in remembering the sources of the signals being transmitted.

The circuits represented by symbols in the detailed logic diagrams have been described with reference to FIGS. 4 to 9 so that the detailed logic diagrams constitute specific circuit diagrams; however, other circuits may be employed to implement the detailed logic diagrams.

Generator of Synchronized Pulses

The synchronized pulses CSY1S and CSY2S are derived from the signals CSY1 and CSY2 received from the timing section of the sorter (FIG. 1) by the section 356 of FIG. 3. The logic diagram of the CSY1S and CSY2S synchronizer is illustrated in FIG. 23. It comprises a flip-flop SPS and a one-shot YSP. When a CSY1 pulse having a duration of 10 milliseconds occurs, its trailing edge is differentiated to produce a +6-volt pulse that is transmitted through an OR-gate 393 to an AND-gate 394 which is enabled by a +6-volt signal RSR from the relay K1 (FIG. 1) when power is being applied to the sorter. The differentiated trailing edge of a CSY1 or a CSY2 pulse is illustrated in the timing diagram of FIG. 24. An inverter 395 is employed to apply a differentiated pulse CSY1 to the set control terminal of the flip-flop SPS and to apply an inverted signal CSY1 to the reset control terminal of the flip-flop SPS. Upon the occurrence of a clock pulse from a source which generates clock pulses at 250 kc., the flip-flop SPS is set as illustrated by the timing diagram in FIG. 24.

The positive-going leading edge of the output signal SPS from the flip-flop SPS triggers the monostable multivibrator YSP which produces a negative $\overline{YSP}$ signal having a duration of five milliseconds. Both the SPS and the YSP signals are connected to an AND-gate 396 to enable it to transmit a pulse CSY1S when a signal CSY1 is present and a pulse CSY2S when a signal CSY2 is present. It should be noted that since both the flip-flop SPS and the monostable multivibrator YSP are clocked, the monostable multivibrator YSP is not triggered until the clock pulse following the clock pulse which sets the flip-flop SPS. That assures that the synchronized pulse CSY1S or CSY2S is present for only one clock period of four microseconds.

Some time after the signal CSY1 or CSY2 has decayed, a +6-volt signal is transmitted from the inverter 395 to the reset control terminal of the flip-flop SPS so that the next clock pulse to occur will reset the flip-flop SPS as illustrated by the timing diagram of FIG. 24. The monostable multivibrator YSP automatically resets after five milliseconds.

Figure 30:
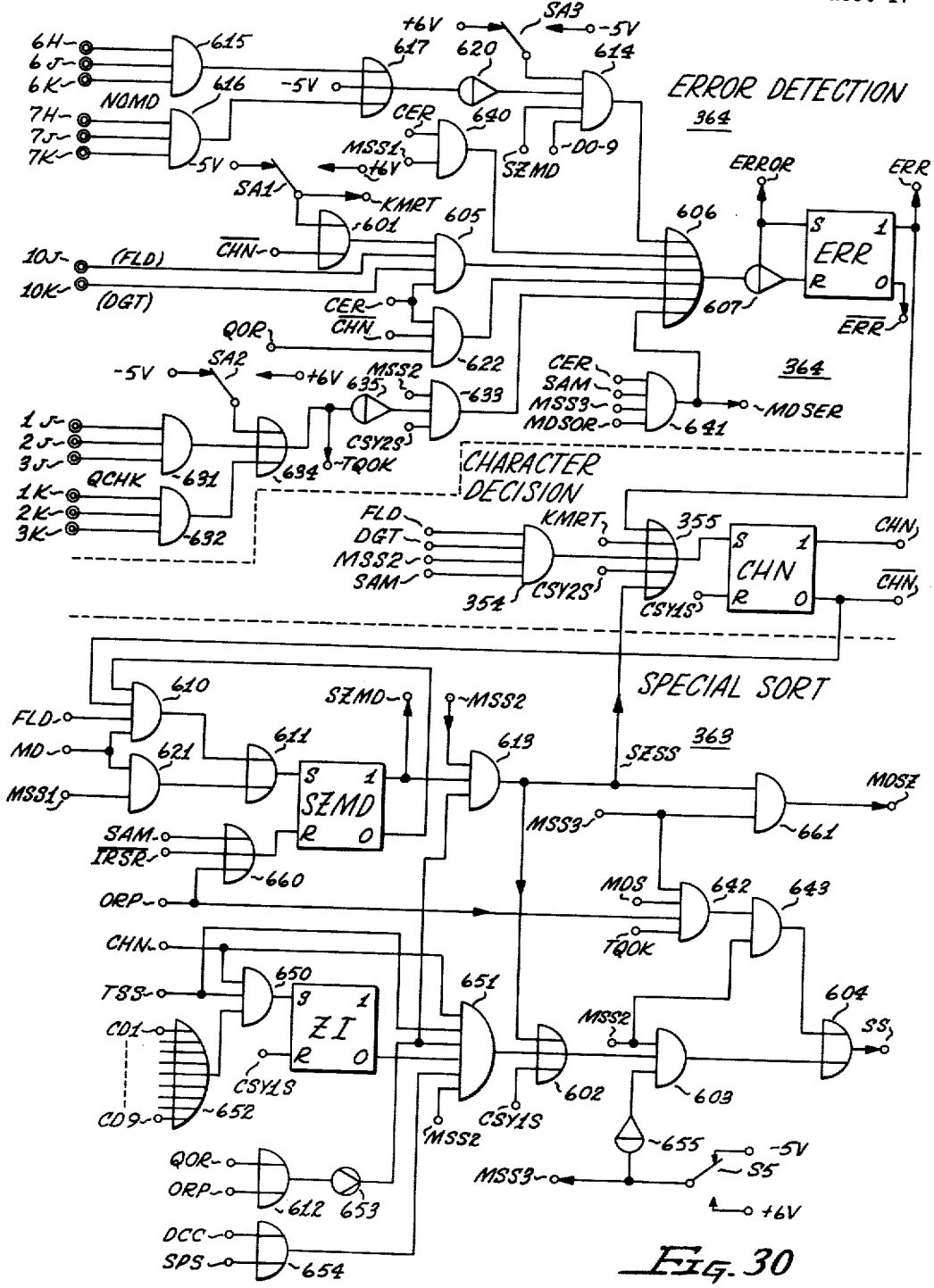
FIG. 30 is a logic diagram of the section of FIG. 3 for making a character decision to sort a given document on a specified digit, detecting the presence of an error and making a special sort decision.

The two synchronized pulses CSY1S and CSY2S are applied to input terminals of other sections, such as the unblanking section 380 in FIG. 27, as required. The signal SPS from the flip-flop SPS is also transmitted to an input terminal of the special-sort section 363 (FIG. 3) the logic diagram of which is shown in FIG. 30. As noted hereinbefore, the pulses CSY1S and CSY2S derived from the respective signals CSY1 and CSY2 are employed throughout the system for timing various functions. The pulse CSY1S is associated with the time at which reading a document begins and the pulse CSY2S is associated with the time by which reading a document is completed and transfer of pocket-decision data to the sorter must begin.

Cue Counting and Field Selecting

Figure 13:
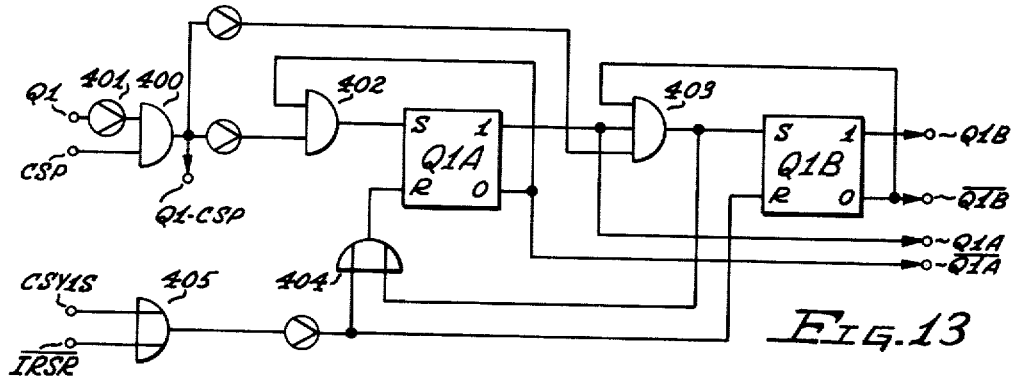
FIG. 13 is a logic diagram of a Q1 (transist) counter.
Figure 14:
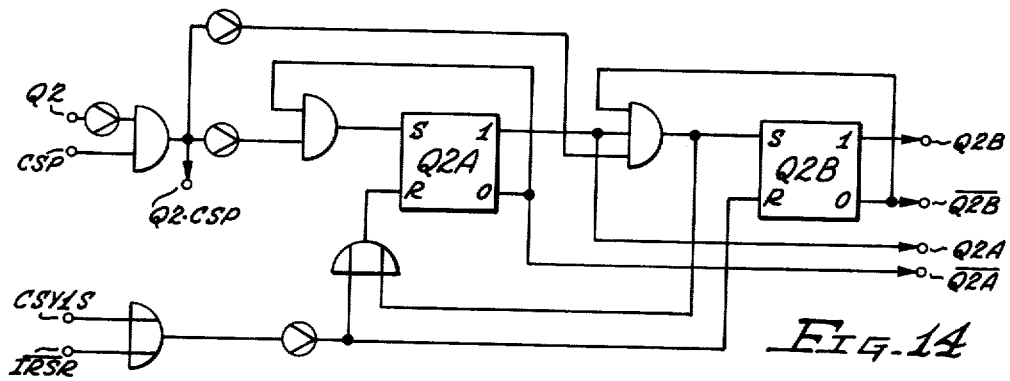
FIG. 14 is a logic diagram of a Q2 (amount) counter.
Figure 15:
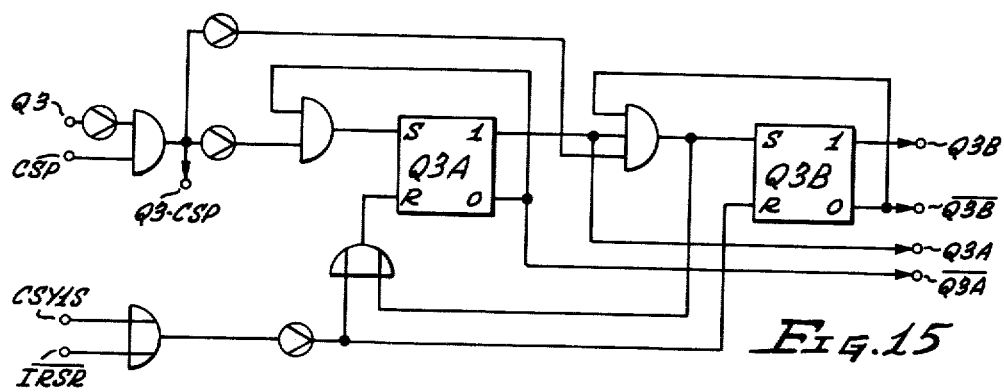
FIG. 15 is a logic diagram of a Q3 (on-us) counter.

As a given document is read, such as the document illustrated in FIG. 18, the distinct cue symbols Q1 to Q4 are counted by four counters illustrated in FIGS. 13 through 16. The cue counter for the Q1 (transit) symbol illustrated in FIG. 13 is the same as the cue counters employed for the Q2 (amount) and the Q3 (on-us) symbols illustrated in FIGS. 14 and 15, respectively, the only difference being that each counter is connected to the respective Q1, Q2 and Q3 output terminals of the character reader 2 (FIG. 1). Accordingly, only the operation of the Q1 (transit) symbol counter illustrated in FIG. 13 is described, the operation of the Q2 and Q3 counters being the same.

As the two Q1 (transit) symbols 25 and 27 on the sample document illustrated in FIG. 18 are read, two signals Q1 are applied to an input terminal of the counter through an emitter-follower 401 to enable an AND-gate 400. Four to eight microseconds later, during the continued presence of a signal Q1, a pulse CSP from the section 350 illustrated in FIG. 25 for generating sampling pulses is applied to the set control terminal of the first stage Q1A of the counter through an enabled AND-gate 402. A clock pulse which occurs in time coincidence with the pulse CSP sets the first stage Q1. The "true" output signal of the first stage Q1A enables an AND-gate 403 and the "false" output terminal disables the AND-gate 402. Thereafter, upon the occurrence of the next signal Q1 after the symbol 27 on the document illustrated in FIG. 18 is read, the AND-gate 403 transmits an enabling +6-volt signal to the set control terminal of the second stage Q1B, thereby causing it to be set. The Q1 (transit) counter remains at the count of two until a CSY1S pulse from the next document to be read occurs and is transmitted through an OR-gate 405 and the OR-gate 404 because there are no other Q1 symbols on the sample document of FIG. 18 to be read.

Figure 10:
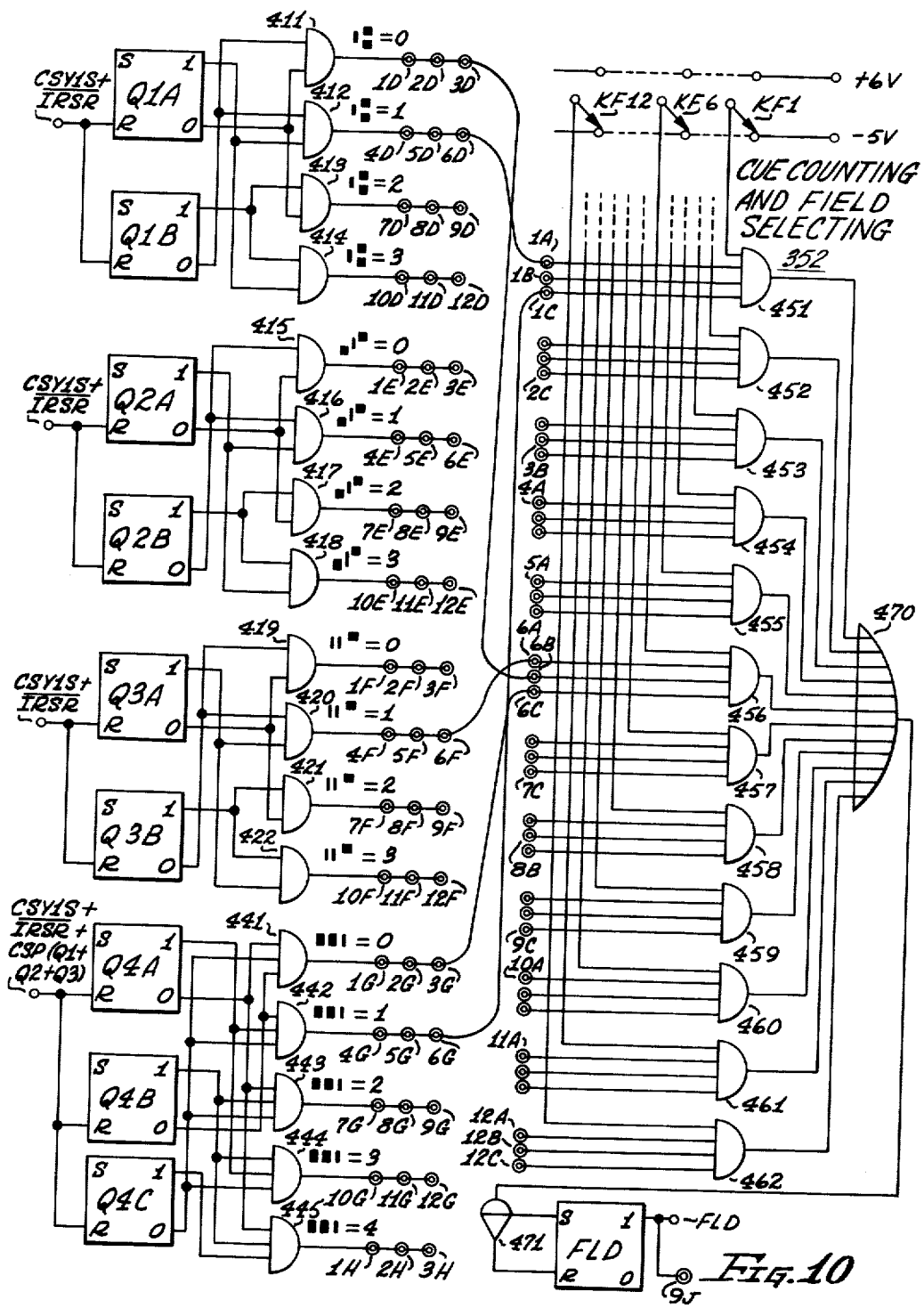
FIG. 10 illustrates a logic diagram of the cue-counting and field selecting section illustrated in FIG. 3.

The binary configuration for the counts of one and two are presented at output terminals Q1A, $\overline{Q1A}$, Q1B and $\overline{Q1B}$. Four AND-gates 411, 412, 413 and 414 are connected to the output terminals of the transit counter as illustrated in FIG. 10 to decode the respective count configurations of zero, one, two and three. Count decoding AND-gates 415 to 418 and 419 to 422 are connected to the Q2 and Q3 counters as illustrated in FIG. 10 to similarly decode the respective Q2 and Q3 count configurations of zero, one, two and three.

From the foregoing it may be seen that the Q1, Q2 and Q3 counters may each count only from 0 to 3 since only two stages are provided for each counter. Accordingly, the maximum number of Q1, Q2 and Q3 symbols which may be employed on a document without confusion is three. For the particular bank application of the illustrative embodiment of the system, a maximum count of three is sufficient for the symbols Q1, Q2 and Q3. However, if other commercial applications require more than three Q1, Q2 and Q3 symbols to be employed on a given document, additional stages may be provided for the Q1, Q2 and Q3 counters together with additional count-decoding AND-gates.

In order to assure that the Q1 counter is reset to the count configuration of zero when the sorter is initially turned on, an $\overline{IRSR}$ signal from the inverter 381 (FIG. 3) is applied to the OR-gate 405 so that before the relay K1 (FIG. 1) is closed to apply power to the sorter, a +6-volt signal is transmitted through the OR-gates 404 and 405 to continually reset the counter. When the relay K1 is energized, and an RSR signal is applied to the inverter 381, an $\overline{IRSR}$ signal is applied to the OR-gate 405. Since the $\overline{IRSR}$ signal is a −5-volt signal, the continual resetting of the counter is discontinued. The counter is thereafter reset only by a pulse CSY1S as the reading operation of each document is initiated until the switch S1 (FIG. 1) is opened and power is disconnected from the sorter.

The counting sequence of the Q1 counter is as follows:

|  | Q1A | Q1B | Count |
| --- | --- | --- | --- |
| CSY1S | 0 | 0 | zero. |
| First Q1 | 1 | 0 | one. |
| Second Q1 | 0 | 1 | two. |
| Third Q1 | 1 | 1 | three. |
| CSY1S | 0 | 0 | zero. |

The counting sequence for the Q2 and Q3 counters is the same as for the Q1 counter.

The operation of the Q4 counter is different from that of the Q1, Q2 and Q3 counters. As the first Q4 (hyphen) symbol 24 on the sample document illustrated in FIG. 18 is read, the signal Q4 derived from it is employed to gate a pulse CSP through an AND-gate 430 and an AND-gate 432 to cause the first stage Q4A of the Q4 counter (FIG. 16) to be set. When the first stage Q4A is set, AND-gates 433 and 436 are enabled so that when the second Y4 (hyphen) symbol 26 is read from the sample document illustrated in FIG. 18, the second stage Q4B is set and the first stage Q4A is reset. Only two Q4 (hyphen) symbols are illustrated on the document in FIG. 18; however, if more than two Q4 symbols are employed, the third Q4 symbol would cause the first stage Q4A to be set. When both stages Q4A and Q4B are set, an AND-gate 434 is enabled. Thereafter, when the fourth signal Q4 is received, the third stage Q4C is set and the second stage Q4B is reset through the OR-gate 438. The first stage Q4A is also reset by the fourth signal Q4 through the AND-gate 436 which is enabled by the second stage Q4B. The counting sequence of the Q4 (hyphen) counter is as follows:

|  | Q4A | Q4B | Q4C | Count |
| --- | --- | --- | --- | --- |
| CSY1S | 0 | 0 | 0 | zero. |
| First Q4 | 1 | 0 | 0 | one. |
| Second Q4 | 0 | 1 | 0 | two. |
| Third Q4 | 1 | 1 | 0 | three. |
| Fourth Q4 | 0 | 0 | 1 | four. |
| Q1, Q2, Q3, or CSY1S | 0 | 0 | 0 | zero. |

A CSY1S or an $\overline{IRSR}$ signal may reset the Q4 counter through an OR-gate 439 in a manner similar to the resetting of the Q1, Q2 and Q3 counters. In addition, signals $Q1 \cdot CSP$, $Q2 \cdot CSP$ or $Q3 \cdot CSP$ are applied to the OR-gate 439 from the Q1, Q2 and Q3 counters in order that the Q4 counter may be reset each time a Q1, Q2 or Q3 symbol is counted by the respective counters Q1, Q2 and Q3. Thus, in order for the Q4 counter to count in a sequential manner from zero to four, four Q4 symbols must follow each other on a given document; i.e., a Q1, Q2 or Q3 symbol must not appear between successive Q4 symbols. In the event that a Q1, Q2 or Q3 symbol does appear, the Q4 counter is reset to zero. Accordingly, the Q4 (hyphen) symbol may be employed on a given document only to separate data within a major field and not to introduce or close a major field. Within a major field, however, the Q4 symbol may be employed to separate data into minor fields.

It should be noted that since the Q4 counter is provided with three stages, it may count a maximum of seven Q4 symbols, but in the illustrative embodiment only five decoding AND-gates 441 to 445 are connected to it as illustrated in FIG. 10 to decode only the count configurations of zero, one, two, three and four. If a particular application requires utilization of more than four Q4 symbols within a given major field, additional decoding AND-gates may be provided to decode the additional count configurations of five, six and seven.

In the off-line mode of sorting documents, the operator selects one of twelve possible major or minor fields in which the sequencing is desired. Then the actual cue-count with relation to the selected field is determined by the decoding AND-gates 411 to 422 for the Q1 to Q3 symbols and, if necessary, the decoding AND-gates 441 to 445 for the Q4 symbol.

Twelve AND-gates 451 to 462 (FIG. 10) are provided together with corresponding switches KF1 to KF12 to select a particular one of the twelve possible fields defined for sequencing by the plugboard connections between hubs connected to the cue-count decoding AND-gates 411 to 422 and 441 to 445 and the field-selecting AND-gates 451 to 462. Thus, to select a given major or minor field for sequencing, the correct cue-count which defines that field is connected to a particular AND-gate such as the AND-gate 456 having its associated switch KF6 actuated from the position shown to a second position to provide an enabling +6-volt potential to the AND-gate 456. For example, if the third field on the sample document illustrated in FIG. 20 is the desired field, the cue-count configurations which identify the third field are connected through the plugboard to an AND-gate arbitrarily selected, such as the AND-gate 456. It will be noted that the Q3 "on-us" symbol which precedes the third field will advance the Q3 counter to a count configuration of one that is decoded by the AND-gate 420. Accordingly, the output terminal of the AND-gate 420 is connected to an input terminal of the AND-gate 456 by a connector between a hub 6F and a hub 6A. The cue symbol following the third field is a Q4 (hyphen) symbol; therefore, to isolate the third field from the other fields, both major and minor, which follow it, the Q4 count of zero decoded by the AND-gate 441 is connected to an input terminal of the AND-gate 456 by a connector between a hub 3G and a hub 6C. It should be noted that the Q1 (transit) symbol 465 preceding the fifth field will reset the Q4 counter to 0 and thereby enable the fifth field to be selected again as though it were the third field. Therefore, the Q1 (hyphen) count of zero decoded by the AND-gate 411 must also be connected to the AND-gate 456 by a connector between hubs 3D and 6B to uniquely define the third field. Having thus defined the third field, the operator may select it for sorting by actuating the switch KF6 to the position which will provide a +6-volt enabling potential to the AND-gate 456.

The fields of the sample document illustrated in FIG. 18 are separated into the following major fields: The amount field for the dollar amount ($1959.00); the "on-us" field for the branch number (1238), the account number (4657) and the transaction code (346); the transit number field for the combined routing symbol (1234) and transit number (7890) of the drawee if it is a par bank and the transit number of a nonpar bank comprising the suffix preceded by the figure 90 with nonsignificant zeroes added to make up a four digit number in lieu of the routing symbol; and an "auxiliary on-us" field permitted on documents having sufficient length for the discretionary use of the drawee bank. The corresponding major fields in the sample document illustrated in FIG. 19 have been separated into minor fields one to seven. In selecting a field for sorting by plugboard programming, minor field definitions are employed because, as is explained more fully hereinafter, a digit counter is employed to locate selected digits within the field selected for sorting and the digit counter is reset by a signal Q1, Q2, Q3 or Q4.

Assuming that the third field is selected for sorting by the plugboard connections between the cue-count decoding AND-gates 411 to 422 and 441 to 445 and the field-selecting AND-gate 456, the field selected is located when a given document is read by counting the cue symbols until the appropriate cue-count configuration is reached. At that moment, the AND-gate 456 is enabled and a +6-volt signal is translated through an OR-gate 470 and an inverter 471 to cause a flip-flop FLD to be set and a signal FLD to be transmitted indicating that the selected field has been located.

The hubs provided for the plugboard connections are arranged on the plugboard 353 (FIG. 22) in rows 1 through 24 and columns A through K. By arranging the hubs in rows and columns, a given hub may be uniquely defined by specifying its row and column. For instance, the hub 3D connected to the AND-gate 411 may be coupled to the hub 6B connected to the AND-gate 456 by connecting the hub in the third row of column D to the hub in the sixth row of column B.

It should be noted that the twelve field-selecting switches KF1 to KF12 (FIG. 10) may be employed to select fields in accordance with the cue-count decoding configuration connected to their associated AND-gates 451 to 462 so that it is possible to select any one of twelve fields in accord with a particular plugboard program in such a manner that the first switch KF1 need not necessarily be employed to select the first field. For instance, in the foregoing example as illustrated in FIG. 10, the third field was selected by actuating the sixth switch KF6 after the appropriate cue-count decoding AND-gates were connected to the AND-gate 456. Thus, a maximum of twelve field selecting configurations may be plugged to the field-selecting AND-gates 451 to 462. Whenever documents are to be sorted on a particular field, the related field-select switch is actuated.

As a further example, suppose it is desired to sort within field 6 of the document illustrated in FIG. 19. It is observed that a Q4 symbol 26' precedes the field 6 but a Q4 symbol 24' also precedes the field 4 so that a Q4 symbol can not be used alone to uniquely define the field 6. It is further observed that a Q1 symbol 25' precedes the field 6 so that when the second Q4 symbol 26' is read, the Q1 counter will be at the count of one. Since either a Q1, Q2 or Q3 symbol resets the Q4 counter, the Q4 counter will be reset to zero when the Q1 symbol 25' is read and counted by the Q1 counter. Accordingly, the cue-count configuration which uniquely defines the sixth field is a Q1 count of one and a Q4 count of one which is reached when the Q4 symbol 26' is read. Therefore, to define the sixth field for selection by plugboard connections to a field-selecting AND-gate, such as the AND-gate 451 arbitrarily selected, the cue-count configuration $Q1=1$ and $Q4=1$ is connected as shown in FIG. 10.

From the foregoing it may be readily appreciated that the cue-counting and field-selecting section illustrated in FIG. 10 enables as many as twelve cue-count configurations to be connected to AND-gates which may be selectively enabled by field-select switches KF1 to KF12 and that each cue-count configuration may be employed to uniquely define any major or minor field on a document of any format and that the fields are defined solely by the cue-count configurations of the four cue counters and are selected by the switches KF1 to KF12. It should be further noted that, with reference to the illustrated document in FIG. 19, the fields are defined as digit positions between cue symbols without regard to the information which the digits represent in order that any group of digit positions between cue symbols may be selected for sorting. That is of particular advantage when, for example, sorting is to be accomplished in accord with digit positions within the "on-us" information field.

*Digit Counting and Selecting*

During an off-line mode of sorting documents, the documents may be sequenced in a normal manner by sorting on successive digit positions starting with the lowest digit position of a field which may be selected in the manner described in the foregoing section. Each field or group of digit positions may contain as many as ten digits. After the field has been defined by the plugboard connections and selected by actuation of the appropriate field-selecting switch, it is located as described in the preceding section.

Figure 11:
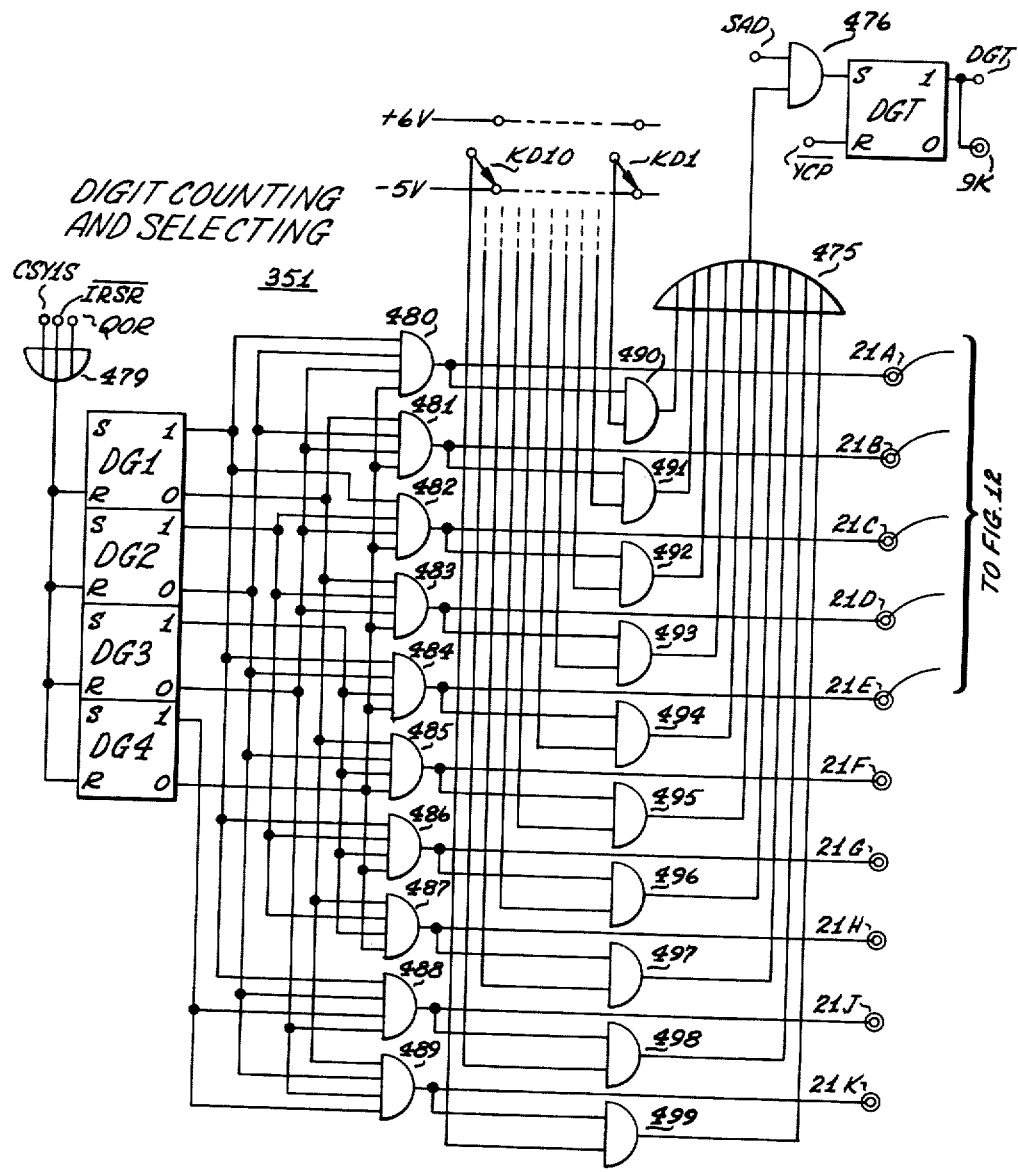
FIG. 11 illustrates a logic diagram of the digit counting and selecting section of FIG. 3.

Any digit position within the selected field may be selected for sorting by selective actuation of digit-selecting switches KD1 to KD10 illustrated in FIG. 11. For example, if the four documents illustrated in FIGS. 18, 19, 20 and 21 are to be sequenced according to their account number, the documents are first sorted according to the number in the first digit position of the third field. The first document illustrated in FIG. 18 contains the number 7 in that digit position so that it is deposited in the pocket SEVEN. The second document illustrated in FIG. 19 is similarly deposited in the pocket SEVEN. The third and fourth documents, however, are deposited in the respective pockets ONE and NINE.

During the second sorting run, the second digit position is selected. For instance, to further sort the documents deposited in the pocket SEVEN during the first run, the second digit position of the third field is examined and the first document illustrated in FIG. 18 is deposited in the pocket FIVE while the second document illustrated in FIG. 19 is deposited in the pocket ZERO. During each subsequent sorting run, digit positions in successively higher orders are examined and the documents further sorted until all of the documents having a common account number have been deposited in a single pocket defined by the most significant digit of the account number.

Figure 17:
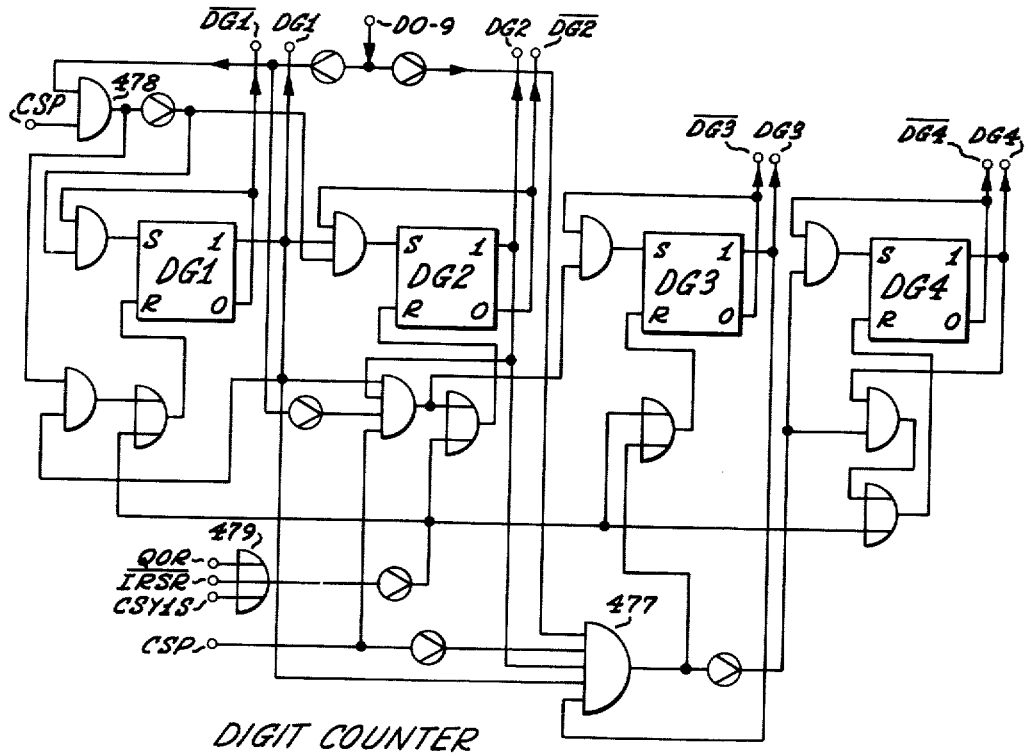
FIG. 17 is a logic diagram of a digit counter.

A digit counter illustrated in FIG. 17 and represented by flip-flops DG1 to DG4 in FIG. 11 is provided for counting all of the digits in each minor field. It should be noted that a signal QOR derived from an OR-gate 501 in FIG. 25 to which signals Q1, Q2, Q3 and Q4 are applied resets the digit counter to zero as each cue symbol on a given document is read. The digits sequentially read after a given cue symbol are counted by the digit counter and decoded by a group of count-decoding AND-gates 480 to 489 (FIG. 11) connected to the digit counter for decoding digit-count configurations of one to ten, respectively, and provide a +6-volt signal to respective digit-selecting AND-gates 490 to 499 only one of which is selected during any given sorting run.

Selection of a digit position for sorting is accomplished through digit-selection switches KD1 to KD10 connected to respective AND-gates 490 to 499. The output terminals of the digit-selecting AND-gates 490 to 499 are connected to an OR-gate 475 to set a flip-flop DGT through an AND-gate 476 when the digit position selected by one of the switches KD1 to KD10 is located, a digit read therefrom and a synchronizing signal SAD derived from the digit signal is applied to the AND-gate 475. The section 350 illustrated in FIG. 25 for generating sampling pulses is employed to derive the signal SAD.

Thus, in the normal off-line mode of operation, a digit position within a specified field is located by the cue-counting and field-selecting section 352 illustrated in FIG. 10 and the digit-counting and selecting section 351 illustrated in FIG. 11. When a field specified has been located and the count configuration of the digit counter corresponds to the digit position selected by the actuated one of the digit-selecting switches KD1 to KD10, the AND-gate 354 (FIG. 3) is enabled to transmit a +6-volt signal through the OR-gate 355 to set the character-decision flip-flop CHN upon the occurrence of a sampling pulse SAM which, as will be described hereinafter with reference to FIG. 25, occurs three clock periods (12 microseconds) after the selected digit is read and one clock period (four microseconds) after a SAD signal is transmitted through the enabled AND-gate 476 in FIG. 11 to set the flip-flop DGT.

The operation of the digit counter will now be described with reference to the logic diagram in FIG. 17. As the digits in a field are read, corresponding CD0 to CD9 signals are transmitted from the character reader 2 (FIG. 1) to an OR-gate 502 in the section 350 illustrated in FIG. 25 for generating sampling pulses. The output signal of the OR-gate 502 is denominated a signal D0–9. That signal is applied to the digit counter so that as each digit is read, the digit counter is incremented by one. The signal D0–9 is coupled to AND-gate 477 and 478 to enable them to transmit synchronizing pulses CSP derived from the section 350 (FIG. 25) for generating sampling pulses.

The digit counter operates as a conventional binary counter; accordingly, a detailed description of its operation is not provided herein. It is sufficient to understand than it will count in response to gated pulses CSP as many as ten digits according to the following table:

|  | DG4 (8) | DG3 (4) | DG2 (2) | DG1 (1) | Count |
| --- | --- | --- | --- | --- | --- |
| CSY1S or QOR | 0 | 0 | 0 | 0 | zero. |
| First Digit | 0 | 0 | 0 | 1 | one. |
| Second Digit | 0 | 0 | 1 | 0 | two. |
| Third Digit | 0 | 0 | 1 | 1 | three. |
| Fourth Digit | 0 | 1 | 0 | 0 | four. |
| Fifth Digit | 0 | 1 | 0 | 1 | five. |
| Sixth Digit | 0 | 1 | 1 | 0 | six. |
| Seventh Digit | 0 | 1 | 1 | 1 | seven. |
| Eighth Digit | 1 | 0 | 0 | 0 | eight. |
| Ninth Digit | 1 | 0 | 0 | 1 | nine. |
| Tenth Digit | 1 | 0 | 1 | 0 | ten. |
| QOR | 0 | 0 | 0 | 0 | zero. |

It should be noted that the digit counter is reset through the OR-gate 479 by each cue symbol read in response to a signal QOR derived from the OR-gate 501 illustrated in FIG. 25. The digit counter is also initially reset by a CSY1S pulse derived from the section 356 illustrated in FIG. 23 for generating synchronized pulses to assure that the digit counter is reset when the reading of a given document is initiated. An $\overline{IRSR}$ signal from the inverter 381 illustrated in FIG. 3 continually resets the digit counter through the OR-gate 479 until the relay K1 is energized to provide a +6-volt signal RSR to the inverter 381 which drives the $\overline{IRSR}$ signal to a −5-volt level.

*Multiple Digit Selection*

Figure 12:
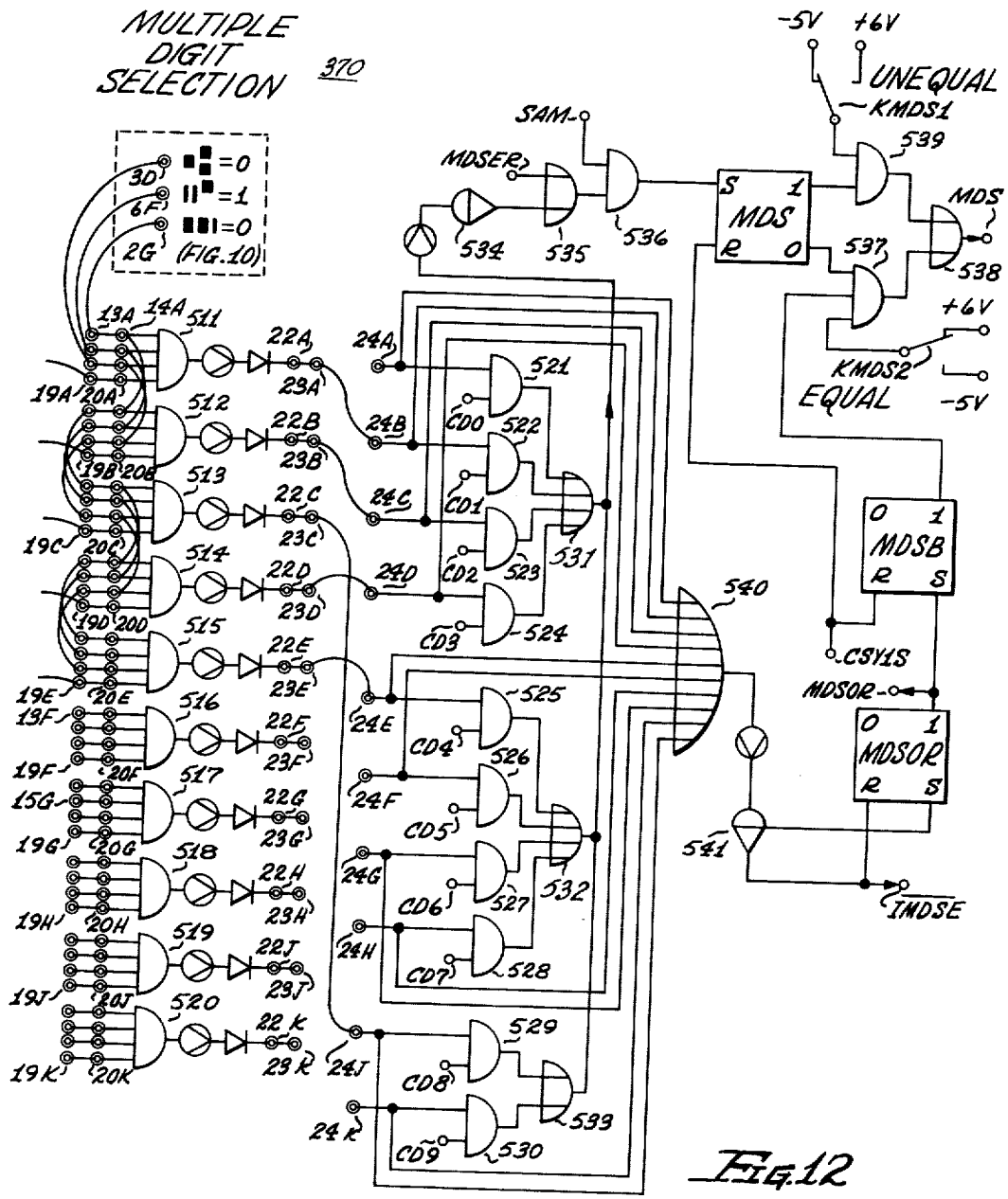
FIG. 12 is a logic diagram of the multiple digit selection of FIG. 3.

The multiple digit selecting mode of operation may be employed during off-line sorting by actuating a switch S5 in the special-sort section illustrated in FIG. 30 to provide a +6-volt signal MSS3 while the switch S4 (FIG. 2) is actuated to provide a +6-volt signal MSS2 and the switch S3 (FIG. 2) shown in the actuated position is not acuated so that it provides a −5-volt signal. As noted hereinbefore, multiple digit selection allows sorting on more than one digit at a time. As many as ten digits read from a given document may be effectively compared for sorting with digits defined by plugboard programming. Documents which contain the specified digit in each of the program-defined locations are referred to as "equal" documents, while those which do not compare are referred to as "unequal" documents. Two switches KMDS1 and KMDS2 in FIG. 12 are provided to select the "equal" or the "unequal" documents for multiple digit selection. With the two switches KMDS1 and KMDS2 in the positions illustrated in FIG. 12, the "equal" documents are selected so that all documents which contain specified digits in each of the program-defined digit positions are set to the Special Sort pocket SSP (FIG. 1) under control of the special-sort section 363 illustrated in FIG. 30.

The operation of the multiple digit selection section 370 illustrated in FIG. 12 may be understood from the description of an example problem. Assume that it is desired to sort all documents which bear the account number 43821 in the "on-us" field, such as the sample document illustrated in FIG. 20. There are ten AND-gates 511 to 520 (FIG. 12) which may be used for plugboard programming the selection of as many as ten digits. Each AND-gate has four input terminals connected to pairs of hubs, such as hubs 19A and 20A connected to an input terminal of the AND-gate 511. The hubs may be found on the plugboard 353 illustrated in FIG. 22 by the coordinate system. For instance, the AND-gate 511 has its four input terminals connected to the four pairs of hubs 13A, 14A; 15A, 16A; 17A, 18A; and 19A, 20A. The AND-gates 511 to 520 are associated with the columns A through K, respectively, and the rows 13 to 20 of the plugboard in a symmetrical manner as illustrated for the AND-gate 511. The pairs of hubs in the rows 19 and 20 of the plugboard are employed for connecting to each AND-gate a selected digit-decoding AND-gate from the group of AND-gates 480 and 489 in FIG. 11 through respective hubs 21A to 21K. In the illustrated example, the five digits selected are in consecutive digit positions so that the plugboard program required may be provided by connecting the hubs 21A to 21E to respective hubs 19A to 19E. In that manner the first five AND-gates 511 to 515 are selected arbitrarily; any other five of the AND-gates 511 to 520 may be employed.

The remaining three pairs of hubs associated with each of the AND-gates 511 to 515 are used to define the field in which the digit specified is to be selected. In the present example all of the digits 4, 3, 8, 2 and 1 are to be read from the first five digit positions of the third field. Referring to the sample document in FIG. 20, it is seen that the cue-count configuration for the third field is as follows: Q3 (on-us) counter=1; Q4 (hyphen) counter= 0; and Q1 (transit) counter=0. Accordingly, hubs 3D, 6F and 2G of the cue-counting and field-selecting section illustrated in FIG. 10 are connected to each of the AND-gates 511 to 515 as illustrated in FIG. 12. It should be noted, however, that all of the digits employed for multiple-digit-selecting need not be in the same field. If the field is different for each digit to be selected, a different cue-count configuration is connected to each gate through the plugboard.

As the selected digits in the specified field are located and read, +6-volt signals are transmitted successively by the AND-gates 511 to 515 to indicate that digits have been read from the specified positions. The digits read are effectively compared with the sequence of digits 1, 2, 8, 3 and 4 by connecting the respective output terminals of the AND-gates 511 to 515 through hubs 23A to 23E to respective hubs 24B, 24C, 24I, 24D, and 24E, each of which is connected to an input terminal of an AND-gate in a group of AND-gates 521 to 530. Each of the AND-gates 521 to 530 has a second input terminal connected to ouput terminal CD0 to CD9 of the character reader (FIG. 1) so that, for example, if a 2 is read in a particular digit position, a +6-volt signal CD2 is applied to an input terminal of only the AND-gate 523. To effectively compare the digits 1, 2, 8, 3 and 4 in the first five digit positions of the third field, the AND-gates 511 to 515 produce +6-volt signals successively as the five digit positions are read, and if the digits specified by the plugboard programming are the digits read, coincidence signals are produced successively at the output terminals of the AND-gates 522, 523, 529, 524 and 525. The output terminals of those AND-gates are coupled to an inverter 534 by OR-gates 531, 532, and 533. The +6-volt output signal of the OR-gate 531, 532 or 533 is inverted by the inverter 534 and transmitted through an OR-gate 535 to an AND-gate 536 to gate a pulse SAM to a set control terminal of a multiple-digit-select flip-flop MDS. The pulse SAM is generated as a synchronized pulse by the section 350 for generating sampling pulses as illustrated in FIG. 25; a synchronized pulse SAM is generated for each of the five digits read and effectively compared.

If the digits read compare with the digits specified by the plugboard program, the OR-gates 531, 532 and 533 transmit +6-volt signals to the inverter 534 which transmits —5-volt signals, thereby effectively disabling the AND-gate 536 to transmit a +6-volt pulse SAM to the flip-flop MDS. However, if any one of the digits read does not compared with the digit specified for that digit position, when that digit is read, a —5-volt signal is inverted by the inverter 534 to a +6-volt signal which enables the AND-gate 536 to transmit a pulse SAM thereby setting the flip-flop MDS. Accordingly, if the document read is "unequal," the flip-flop MDS is set thereby disabling an AND-gate 537. With the switch KMDS2 in the position shown, all documents read are considered to be "equal" so that the AND-gate 537 transmits a +6-volt signal through an OR-gate 538 as a multiple-digit-select signal MDS to the special-sort section 363 illustrated in FIG. 30, thereby causing the "equal" document to be automatically deposited in the Special Sort pocket SSP. If a given document is "unequal," a +6-volt signal is transmitted by the AND-gate 536 to set the multiple-digit-select flip-flop MDS, thereby preventing an MDS signal from being transmitted from the OR-gate 538 to the special-sort section; the "unequal" document is then sorted in a normal manner and if a pocket decision is not reached, deposited in the REJECT pocket.

If both of the switches KMDS1 and KMDS2 are actuated such that a —5-volt potential disables the AND-gate 537 and a +6-volt signal enables the AND-gate 539, when a given document is "unequal" and the flip-flop MDS is set, a +6-volt signal is transmitted from the OR-gate 538 to the special-sort section. In that manner an "unequal" document is deposited in the Special Sort pocket and an "equal" document is not. Documents which are not deposited in the Special Sort pocket are sorted in a normal manner under the control of the cue-counting and field-selecting section (FIG. 10) and the digit-counting and selecting section (FIG. 10) and the digit-counting and selecting section (FIG. 11).

A CSY1S pulse resets the flip-flop MDS and a flip-flop MDSB as the reading of each document being sequenced is begun. The "true" output terminal of the flip-flop MDSB is connected to an input terminal of the AND-gate 537 in order to prevent a blank document from appearing as an "equal" document during an "equal" multiple-digit-select mode of operation. If a blank document is read, it should be deposited in the REJECT pocket for lack of a pocket decision; but, during a multiple-digit selection mode of operation for "equal" documents, a blank document could appear as an "equal" document if it were not for the operation of the MDSB flip-flop.

The multiple digit selection of "equal" documents may be employed, for example, to deposit in the Special Sort pocket SSP all documents which bear a specified branch number in the on-us information field and to sort on the least significant digit of the account number on those documents which do not bear the specified branch number. During such a multiple-digit-select operation for "equal" documents, it is desirable to cull all blank documents by causing them to be deposited in the REJECT pocket. That is accomplished under the control of the flip-flop MDSB. When the first digit specified for the multiple-digit-select operation is located, such as the first digit in the third field in the foregoing example, a +6-volt signal is transmitted through an OR-gate 540 to an inverter 541 which causes a flip-flop MDSOR to be set and thereby cause the flip-flop MDSB to be set four microseconds later upon the occurrence of the next clock pulse. The set flip-flop MDSB then allows the AND-gate 537 to be enabled so that all equal documents will be deposited in the Special Sort pocket SSP. If a blank document is read, a +6-volt signal is not transmitted through the OR-gate 540 to set the flip-flop MDSOR so that the flip-flop MDSB remains reset and the AND-gate 537 is not allowed to be enabled. If the AND-gate 537 is held disabled by the flip-flop MDSB, the OR-gate 538 will not transmit an MDS signal to the special-sort section so that the normal sorting logic must provide the appropriate pocket decision. But, as just noted, if the document is blank, the document is deposited in the REJECT pocket for lack of a pocket decision. The flip-flop MDSB may be employed in a similar manner to prevent blank documents from being deposited in the Special Sort pocket SSP during an "unequal" multiple-digit-select operation by connecting its "true" output terminal to an input terminal of the AND-gate 539.

If a given digit specified for multiple-digit selection produces an error signal CER, in the manner described hereinbefore with reference to an OR-gate 365 in FIG. 3, due to what is denominated a long or multiple-read character, the document should not be deposited in the Special Sort pocket SSP under the control of the multiple-digit selection section since it cannot be determined that the comparison of that digit with a specified digit is valid. Accordingly, when that digit is read and the flip-flop MDSOR is set, an MDSOR signal is transmitted through the error-detection section 364 illustrated in FIG. 30 to produce a multiple-digit-select error signal MDSER which is transmitted to the OR-gate 535 in the multiple-digit selection section (FIG. 12) to cause the flip-flop MDS to be set. The MDSOR signal also causes the error-detection section 364 in FIG. 30 to generate an ERR signal which is transferred through an OR-gate 326 and an AND-gate 327 in FIG. 2 to cause a reject code to be entered to the input register, thereby causing the document to be deposited in the REJECT pocket.

*Generating Sampling Pulses*

When a document is read, signals Q1 to Q4 and signals CD0 to CD9 transmitted by the character reader 2 (FIG. 1) are received by OR-gates 501 and 502 in the section 350 for generating sampling pulses as noted hereinbefore. The output of the OR-gate 501 is a signal QOR which is applied through an OR-gate 550 to a monostable multivibrator YCP. The output of the OR-gate 502 is a signal D0–9 which is similarly applied to the OR-gate 550 to trigger the monostable multivibrator YCP. In addition to the signal QOR or D0–9, a long character or multiple read error signal CER derived from the OR-gate 365 (FIG. 3) is applied to the OR-gate 550 to trigger the monostable multivibrator YCP.

The monostable multivibrator YCP may be referred to as the character presence monostable multivibrator because it is triggered by any character whether it be a cue symbol or digit. Its output signal $\overline{YCP}$ is a negative (—5 volts) signal having a duration of 500 milliseconds. It is used in the generation of digit and cue signal synchronizing pulses in a manner to be described presently. It is also used to reset the input register to the reject code 0010 after each character is read so that after the last character is read, the document is deposited in the REJECT pocket if a pocket decision has not been made and the flip-flop CHN (FIG. 30) set. That is accomplished by connecting the YCP output terminal to the AND-gate 324 (FIG. 2) which has an input terminal connected to the "false" output terminal of the character decision flip-flop CHN and another input terminal connected to the synchronous-pulse-synchronizer flip-flop SPS (FIG. 23). The $\overline{YCP}$ term to the AND-gate 324 returns to +6 volts after 500 microseconds so that if a character decision has not been made in response to the last digit read by that time, the $\overline{CHN}$ term will also be at +6 volts. The $\overline{SPS}$ term is at +6 volts continuously except for a short period following a CSY1 or a CSY2 pulse. If a character decision is made in response to a selected digit read, the character decision flip-flop CHN is set and the AND-gate 324 disabled so that the reject code 0010 is not entered into the input register.

The output of the monostable multivibrator YCP is applied through an OR-gate 557 to an inverter 551 which is connected to the set and reset control terminals of a flip-flop DCC, thereby causing the flip-flop DCC to be set. The "true" output terminal of the flip-flop DCC is connected to the computer for the purpose of synchronizing an input shift register utilized as a read buffer when the sorter is being employed for an on-line operation. The "false" output terminal of the flip-flop DCC is connected to an AND-gate 553 the output of which is connected to the set control terminal of a flip-flop CSP thereby causing it to be set by the same clock pulse which sets the flip-flop DCC as illustrated by a timing diagram in FIG. 26.

The output signal derived from the true output of the flip-flop CSP is denomianted a character-synchronized pulse CSP which is utilized in the missing digit detector illustrated in FIG. 28. It is also employed to cause a synchronized pulse delay flip-flop SPD connected in tandem to be set when the flip-flop CSP is reset. Four microseconds later the SPD flip-flop is reset and a sampling-pulse-delay flip-flop SAD is set as illustrated by the timing diagram in FIG. 26. Four microseconds later, the sampling flip-flop SAM is set. The sampling pulse SAM is applied to the AND-gate 354 (FIG. 30) to enable the character decision flip-flop CHN to be set if, during a normal off-line sorting operation, the specified field and digit have been located. The sampling pulse SAM is also employed in the error-detection section 364 and the special-sorting section 363 both of which are illustrated in logic diagram form in FIG. 30. In addition, it is also applied to an AND-gate 554 to enable it and thereby cause the sampling flip-flop SAM to be reset four microseconds later. The second input terminal of the AND-gate 554 is connected to an OR-gate 555 so that either an MDSOR siganl or an $\overline{IMDSE}$ from the multiple-digit-select section 370 (FIG. 12) will enable the AND-gate 554. In that manner, the SAM flip-flop is not reset until four microseconds after the MDSOR flip-flop is set during a multiple-digit-select operation when a digit selected in a specified field has been read.

The false output terminal of the flip-flop SAM is connected to an input terminal of an AND-gate 556 which has one input terminal connected to the false output terminal of an error flip-flop ERR in the error-detection section 364 illustrated in FIG. 30 and the other input terminal connected to an output terminal ERROR in the error-detection section which is normally at −5 volts and is driven to a +6-volt level only when an error has been detected. If an error has been detected upon reading a character, the AND-gate 556 translates a +6-volt signal to an input terminal of an OR-gate 557 which couples the output signal $\overline{YCP}$ of the monostable multivibrator YCP to the inverter 551 to set the flip-flop DCC. If a +6-volt signal is present at the output terminal of the AND-gate 556, the output terminal of the OR-gate 557 is driven to a +6-volt level so that the DCC flip-flop may not be set. Thus, due to negative logic, the OR-gate 557 may be considered to be functioning as an AND-gate such that the DCC flip-flop may not be set except when a $\overline{YCP}$ signal is present and an ERROR signal is not present at an input terminal of the AND-gate 556. Accordingly, if an error is detected in reading a character, sampling pulses are not generated.

Unblanking Section

The unblanking section 380 illustrated in FIG. 27 enables the computer to accept the contents of a given document being read during an on-line mode of operation and enables the character reader 2 (FIG. 1) to read the contents of the given document during either an off-line or an on-line mode of operation. It includes an unblanking flip-flop UBL which is set by a CSY1S pulse 385 to initiate a check presence signal 390 in the character reader for a period of 46 milliseconds, as illustrated in the timing diagram of FIG. 3a. A CSY2S pulse 386 illustrated in FIG. 3a resets the unblanking flip-flop UBL through an OR-gate 570. Once the unblanking flip-flop UBL is reset, the computer no longer needs to stand by to accept data from the character reader and may proceed to process the information received from the first document before the second document causes the unblanking flip-flop to be set again. From the timing diagram of the signal UBL in FIG. 3a it may be seen that there is approximately 10 milliseconds between documents during which the information received may be processed and other programmed utility routines executed as necessary.

In order to provide as much data processing time for the computer as possible, it is desirable to reset the flip-flop UBL as early as possible after the information required from the document being processed has been read and not cause the computer to stand by until a CSY2S pulse occurs at the end of the document. For instance, referring to the timing diagram of FIG. 3a, if the document illustrated in FIG. 18 is being processed for the purpose of posting the dollar amount on the account number 4657 in accordance with the transaction code 346, it may be only necessary to read the "on-us" and amount fields bracketed by the Q2 (amount) symbol 21 and the Q1 (transit) symbol 25. The unblanking flip-flop UBL would normally be reset approximately 24 microseconds after the auxiliary "on-us" field has been read by a CSY2S pulse 386 which occurs as the document just read approaches the first pocket, the Special Sort pocket SSP illustrated in FIG. 1; but, during an on-line mode of operation, the unblanking flip-flop may be reset early after reading the "on-us" field or conditionally reset early after reading the "on-us" field if an "auxiliary on-us" field is not present as described hereinafter.

During an off-line mode of operation, the pocket decision for the first document may occur at any time after the read time is begun but prior to the occurrence of a CSY2S pulse which resets the unblanking flip-flop UBL since at that time the pocket decision stored in the input register illustrated in FIG. 2 is transferred to the output register. Thereafter, the pocket decision is transmitted to the sorter by a CSY3 pulse 387 which initiates the read-out time by triggering the YR0 monostable multivibrator illustrated in FIG. 2. However, during an on-line mode of operation the pocket decision for the first document (check No. 1) could be made some time between the occurrence of the CSY1S pulse 385 and the occurrence of the CSY2S pulse 386, but as a practical matter it would never be made before the unblanking flip-flop UBL is reset since normally the computer program would be arranged such that all of the information that is to be read from the document is received by the computer before processing of the information begins and a pocket decision made. Therefore, although the sorter timing diagram illustrated in FIG. 3a indicates that the pocket-decision time for successive documents may overlap, they would as a practical matter be sequential, each pocket-decision time beginning with the time the unblanking flip-flop UBL is reset.

It should be noted that the sorter timing diagram in FIG. 3a indicates the pocket decision may be made after the CSY2S pulse 386. It will be recalled that a CSY2S pulse applied to the flip-flop ORP illustrated in FIG. 2 initiates the transfer of a pocket-decision from the input register to the output register so that upon the occurrence of the CSY3 pulse 387 the pocket decision may be read out through the decoder 301 (FIG. 2). Accordingly, it appears as though the pocket-decision must be made before a CSY2S pulse in order that it may be transferred to the output register prior to the read-out time, the period during which the YR0 monostable multivibrator produces a negative pulse 391. However, for on-line mode of operation the pocket-decision for a given document may be made after the CSY2S pulse 386 occurs, but before the CSY1S pulse 389 for check number 2 in the timing diagram of FIG. 3a. That is possible because when the pocket-decision for a preceding document is transferred to the output register, a bit 0 in any one of the flip-flops SOU1 to SOU4 produces a +6-volt signal which is transmitted by an OR-gate 310 (FIG. 2) to reset the transfer flip-flop T thereby disabling the transfer AND-gates 306 to 309 and through an enabled AND-gate 325 to reset the input register flip-flops SIN1 to SIN4 to zero via OR-gates 337, 339, 341 and 343. Thereafter, when the next document has been read a CSY2S pulse again sets the flip-flop ORP which causes the transfer flip-flop T to be set upon the occurrence of the next clock pulse four microseconds later. Once the transfer flip-flop T is set, the transfer AND-gates 306 to 309 are enabled so that upon the occurrence of the next clock pulse four microseconds later the content of the input register is transferred to the output register; however, since a bit 0 is present in each flip-flop of the input register, none of the output register flip-flops SOU1 to SOU4 are reset. Accordingly, all of the output register flip-flops remain set after the ORP flip-flop is set by a CSY2S pulse since a +6-volt signal from the true output terminal of the flip-flop ORP causes each output register flip-flop to be set upon the occurrence of the next clock pulse. Thus, the transfer flip-flop T remains set, the input register flip-flops remain reset and the AND-gates 306 to 309 remain enabled while a code 1111 present in the output register is decoded by an OR-gate 334 which transfers a no-pocket-decision signal NPD through an OR-gate 335.

It should be noted that the OR-gates 334 and 335 function as AND-gates owing to a reversal of voltage levels such that negative logic is actually being employed so that when the switch S4 is not activated for an on-line mode of operation a −5-volt potential is applied to an input terminal of the OR-gate 335 thereby enabling it to transmit a negative signal $\overline{\text{NPD}}$. The no-pocket-decision signal $\overline{\text{NPD}}$ is transmitted to the computer to indicate that a pocket decision is still required for the document being processed. When the computer makes the required pocket-decision and transmits it through the enabled AND-gates 302 to 305 to the input register in synchronism with a clock pulse, the succeeding clock pulse transfers the pocket-decision into the output register automatically. A bit 0 in any one of the flip-flops in the output register transmits a +6-volt signal through the OR-gate 310 to reset the transfer flip-flop T and enable the AND-gate 325 to again reset the input register flip-flops SIN1 to SIN4 through the OR-gates 337, 339, 341 and 343.

Early Unblanking Reset

The timing diagram illustrated in FIG. 3a shows that if the unblanking flip-flop UBL is reset early during the 58 millisecond read signal 390, more time is allowed for the computer to process the information read before it must begin devoting time to accepting information from the next document. Accordingly, for on-line operations, means is provided according to the present inevntion for resetting the unblanking flip-flop UBL early, but after a specified field has been read. That means comprises an OR-gate 571 illustrated in FIG. 27 having three input terminals connected to hubs 5H, 5J and 5K on the plugboard. The operation of resetting the unblanking flip-flop UBL after a particular field has been read may be referred to as a special turn-off. Accordingly, the three hubs connected to the OR-gate 571 may be readily identified on the plugboard 353 illustrated in FIG. 22 by the mnemonic code SPL.

Referring to the sample document illustrated in FIG. 18, it may be seen that if the unblanking flip-flop is to be reset after the "on-us" field has been read via the OR-gate 571 (FIG. 27), the decoding AND-gates connected to the cue counters in FIG. 10 for decoding the configuration of Q1=1 should be connected to the OR-gate 571 by a plugboard connection between, for example, the hub 5D (FIG. 10) connected to the output terminal of the AND-gate 412 and the hub 5H connected to an input terminal of the OR-gate 571 so that when the symbol 25 in the sample document is read, a +6-volt signal is transmitted from the AND-gate 412 through the OR-gate 571 to reset the unblanking flip-flop UBL.

It should be noted that the OR-gate 571 is coupled to the reset control terminal of the unblanking flip-flop UBL by the OR-gate 570 and an AND-gate 572 having as one of its input signals the output signal $\overline{\text{YCP}}$ derived from the monostable multivibrator YCP in the section for generating sampling pulses illustrated in FIG. 25. Accordingly, when the Q1 (transit) counter indicates the count of 1 and the OR-gate 571 transmits a +6-volt signal, the AND-gate 572 is enabled only after the character presence monostable multivibrator YCP (FIG. 25) recovers from its unstable period of 500 microseconds.

The OR-gate 571 has three input terminals connected to hubs on the plugboard in order that alternative cue-count configurations may be connected to it, thereby providing alternative early or special resetting of the unblanking flip-flop UBL in response to as many as three different cue-count configurations, the early resetting occurring in response to the earliest of the cut-count configurations reached.

Conditional Early Unblanking Reset

The unblanking flip-flop UBL may be conditionally reset early through a plugboard connection from a particular cue-count decoding AND-gate in FIG. 10 to an OR-gate 573. An example will best illustrate how the conditional early resetting of the unblanking flip-flop UBL is employed. Referring to the sample document illustrated in FIG. 18, assume that it is desirable to post the dollar amount in the account number 4657 and that it is necessary to record the number of the check 1101 which is printed in the "auxiliary on-us" field, but only if such a number is present in the "auxiliary on-us" field. Thus, documents bearing the same account number may require posting during an on-line mode of operation which do not have a document number in the "auxiliary on-us" field together with documents, such as the one illustrated in FIG. 18, which do. In order to reset the unblanking flip-flop early for the purpose of preserving computer programming time, it is desirable to program as early a resetting of the unblanking flip-flop UBL as possible through the plugboard. For documents which do not have an auxiliary on-us field, that would be immediately after the Q1 (transit) symbol 25 is read, but for documents having the "auxiliary on-us" field, that would be only after the third (on-us) symbol 29 is read. Therefore, in order to reset the unblanking flip-flop UBL as soon as possible, the conditional early resetting OR-gate 573 is employed to cause the unblanking flip-flop to be reset after the Q2 (transit) symbol 27 has been read if an "auxiliary on-us" field is not present and after the "auxiliary on-us" field has been read if it is present.

To accomplish a condition early resetting of the flip-flop UBL, a Q1 (transit) symbol count configuration of two from a hub 9D in FIG. 10 is connected to a hub connected to the OR-gate 573, such as the hub 4H. When the Q1 (transit) symbol 27 is read from the document, an AND-gate 574 is enabled by a signal QOR from the OR-gate 501 (FIG. 25) to trigger a monostable multivibrator YBL which has an unstable period of 2.1 milliseconds. After the blanking monostable multivibrator YBL returns to its stable condition, the positive-going trailing edge triggers a blanking-sample monostable multivibrator YBLS which has an unstable period of 20 microseconds. Its output $\overline{YBLS}$ is inverted by an inverter 575 and applied to an AND-gate 576 which has a second input terminal connected to the missing-digit-detector output terminal MD in FIG. 28. Thus, if at the time a 20 microsecond inverted $\overline{YBLS}$ signal is applied to the AND-gate 576 a missing digit signal MD is present, the unblanking flip-flop UBL is reset through the OR-gate 570. In that manner, the blanking monostable multivibrator YBL and the blanking-sample monostable multivibrator YBLS enable the AND-gate 576 to test for a missing-digit condition approximately two and one-half character spaces following the Q1 (transit) symbol 27 on the sample document in FIG. 18. If the missing-digit detector indicates a blank space, then it is known that an "auxiliary on-us" field is not present on the document and the unblanking flip-flop UBL is reset earlier than if the "auxiliary on-us" field had been present. If, on the other hand, a missing-digit signal MD is not present at the time that an inverted $\overline{YBLS}$ signal enables the AND-gate 576, the unblanking flip-flop UBL is not reset early and the computer is allowed to continue to accept data from the character reader until a CSY2S pulse resets the unblanking flip-flop UBL through the OR-gate 570. Thus, the OR-gate 573 may be employed to conditionally reset the unblanking flip-flop UBL early, the condition being that an "auxiliary on-us" field is not present on the document. Alternative conditional early turn-offs may be provided by proper connections between the cue-count decoding AND-gates 411 to 422 and 441 to 445 and the OR-gate 573 through the plugboard.

Figure 22:
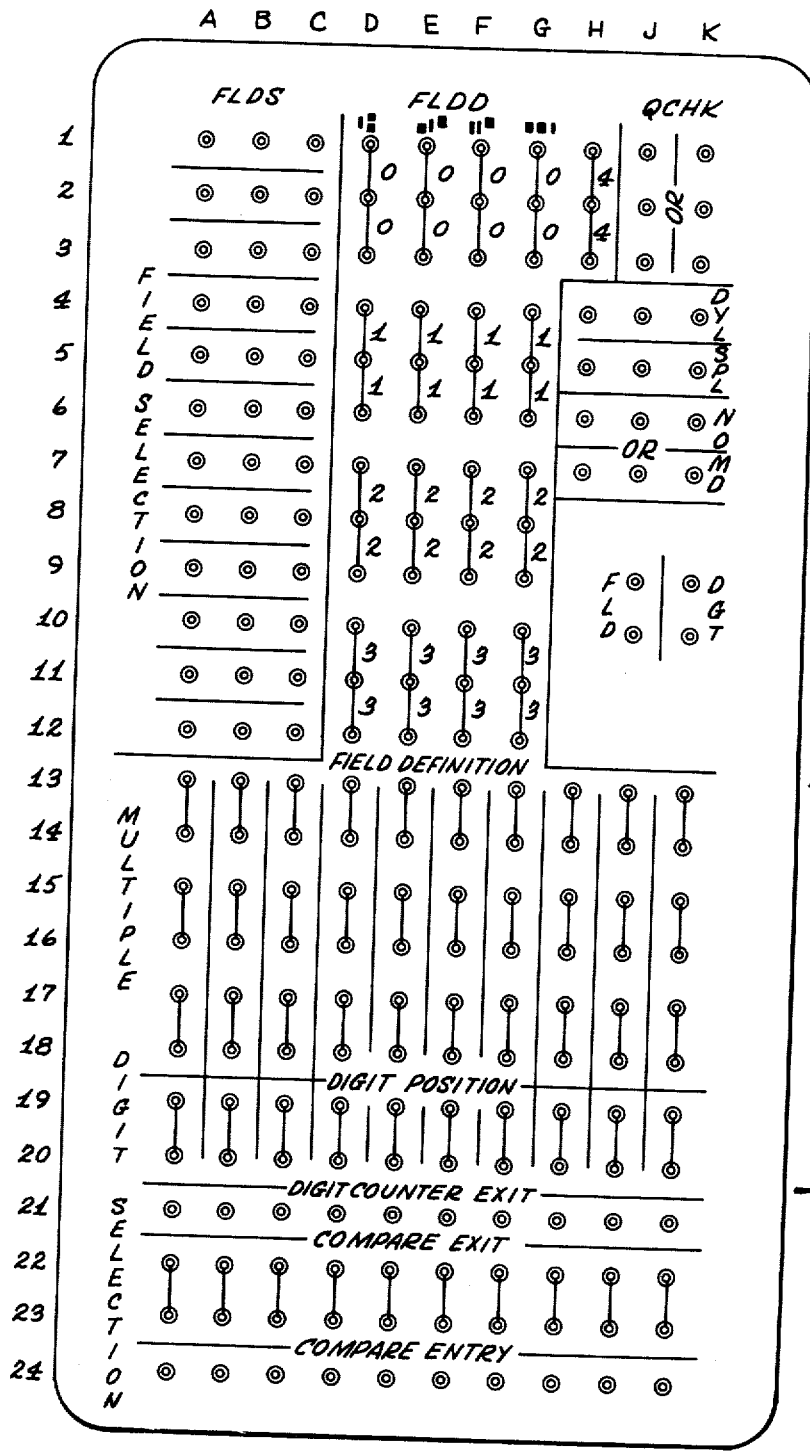
FIG. 22 illustrates a plugboard for programming the operation of the present document sorting system.

The hubs 4H, 4J and 4K on the plugboard 353 illustrated in FIG. 22 are identified by the mnemonic code DYL which may be understood to mean "delayed early resetting" because a conditional early resetting of the flip-flop UBL is not executed until a delay period long enough to scan two and one-half character spaces has elapsed, and then only if a missing-digit condition is present. In other words, conditional early resetting is not executed until a predetermined delay period in order to look ahead on the document two and one-half character spaces for the purpose of determining whether additional information is present which should be read.

It should be noted that although early resetting and conditional early resetting of the unblanking flip-flop UBL has been described with reference to specific examples, pertaining to processing of bank checks, the flexibility provided by both types of early resetting may provide even greater flexibility in processing other documents of different formats.

Missing-Digit Detector

The logic diagram of the missing-digit detector 362 which provides the signal MD for conditional early resetting of the unblanking flip-flop UBL is illustrated in FIG. 28. As noted hereinbefore, the cue and digit characters read trigger the character presence monostable multivibrator YCP (FIG. 25) which has an unstable period of about 500 microseconds. When the monostable multivibrator YCP returns to its stable state, its output signal $\overline{YCP}$ returns to +6 volts to enable an AND-gate 580 (FIG. 28) to set a missing-digit detector flip-flop MDD1. Four microseconds later, upon the occurrence of the next clock pulse, a second missing-digit detector flip-flop MDD2 is set and a monostable multivibrator YMD is triggered through an AND-gate 581. At the same time that the flip-flop MDD2 is set, the flip-flop MDD1 is reset through an OR-gate 582 so that an AND-gate 583 will not be enabled under normal conditions.

A CSP pulse occurs four microseconds after a digit or cue character is read and the YCP monostable multivibrator is triggered, as illustrated in the timing diagram of FIG. 26, to reset the missing-digit detector.

If a digit is missing, the missing-digit detector will not be reset by a CSP pulse so that although the first flip-flop MDD1 is reset at the time the flip-flop MDD2 is set, the flip-flop MDD2 is still set at the time that the monostable multivibrator YMD recovers to enable the AND-gate 580 to again set the first missing-digit detector flip-flop MDD1 as illustrated in the timing diagram of FIG. 29. For instance, assume that four digits are to be read in succession, but that the third digit is missing. When the first digit represented by a pulse 591 in the timing diagram of FIG. 29 is read, the monostable multivibrator YCP is triggered. After the monostable multivibrator YCP has recovered 500 microseconds later, the MDD1 flip-flop is set as represented by a pulse 592 in the timing diagram. Four microseconds later, the flip-flop MDD1 is reset and the flip-flop MDD2 is set as represented by the pulse 593. The second digit represented by a pulse 594 produces a CSP pulse 595 which resets the flip-flop MDD2. The same sequence of events produced by the first and second digits represented by the pulses 591 and 594 is produced by the third digit represented by the pulse 596 so that at the time that the YMD flip-flop recovers after being triggered for the third time, the flip-flop MDD2 is still set due to a missing-digit condition in the fourth digit position. At that time the $\overline{YCP}$, MDD1 and $\overline{YMD}$ signals are positive so that a +6-volt signal MD is transmitted from the AND-gate 583 until the fifth digit represented by the pulse 597 is read, the monostable multivibrator YCP is triggered and a CSP pulse is generated to reset the flip-flop MDD2.

Character Decision

The character-decision flip-flop CHN is employed during an off-line mode of operation as described hereinbefore with reference to FIG. 3 such that as a document is read, the digit signals CD0 to CD9 from the character reader are encoded by the encoder 300 into an inverse biquinary code and sequentially entered into the input register until the specified digit within the selected field has been located, at which time the AND-gate 354 is enabled to set the character-decision flip-flop CHN through the OR-gate 355. When the flip-flop CHN is set, the AND-gates 315 and 324 in FIG. 2 are disabled, and when the AND-gate 315 is disabled, the transfer AND-gates 316 to 323 are disabled thereby locking the inverse biquinary code of the last digit read in the input register.

It should be noted that the AND-gate 324 (FIG. 2) inserts a reject code 0010 through the OR-gate 326 and the AND-gate 327 immediately after the monostable multivibrator YCP (FIG. 25) character read, recovers so that although an inverse biquinary code of each digit read is sequentially entered into the input register, if a character decision is not made within the 500 microseconds that the monostable multivibrator YCP is in its unstable state, the inverse biquinary code of the last digit entered into the input register is replaced by the reject code 0010. In that manner, if a character decision is not made after the last character on the document is read, the check will automatically be deposited in the REJECT pocket. When the digit position selected for sorting is reached and a pocket decision is made, or the special-sort section 363 makes an overriding pocket decision during a multiple-digit-select mode of off-line operation, the CHN flip-flop is set and the AND-gate 324 is inhibited from inserting a reject code into the input register.

The character-decision flip-flop CHN may be set by any one of the following five methods: actuation of an SA1 switch in the error-detection section 364 illustrated in FIG. 30; normal off-line sorting on a selected digit of a specified field as just described; a suppressed zero in the selected digit position during normal off-line sorting; a missing digit in the selected digit position during normal off-line sorting; and a detected error. Each of the five methods will be described with reference to FIG. 30.

It is sometimes desirable to test the reading operation for some purpose, such as to determine the general quality of printing on documents, by inserting a special-sort code 0001 in the input register as the reading of a given document is initiated and locking the Special Sort pocket decision in the input register by setting the CHN flip-flop so that the given document being read is deposited in the Special Sort pocket unless an error signal CER is received by the error-detection section from the character reader OR-gate 365 (FIG. 3) indicating that either a multiple-read or long-character error has occurred. That is accomplished by actuating the switch SA1 to the position which provides a +6-volt signal KMRT to an OR-gate 601 and OR-gate 355 to cause the flip-flop CHN to be locked in the set state. A pulse CSY1S which occurs upon the initiation of the reading operation for a given document is transmitted through an OR-gate 602 in the special-sort section 363 (FIG. 30) to an AND-gate 603 which is enabled during a normal off-line mode of operation to transmit through an OR-gate 604 a special-sort signal SS to OR-gates 337, 339, 341 and 342 in the transmission channel (FIG. 2), thereby entering a special-sort code 0001 in the input register. Since the character-decision flip-flop CHN is locked set, the AND-gates 315 and 324 (FIG. 2) are held disabled, thereby locking special-sort code 0001 in the input register.

If an error signal CER is not received from the character reader, the given document is automatically deposited in the Special Sort pocket; however, if an error signal CER is received by the error-detection section 364 (FIG. 30), an AND-gate 605 is enabled to transmit a +6-volt signal through an OR-gate 606 to an inverter 607, thereby causing an error flip-flop ERR to be set. The true output terminal of the flip-flop ERR transmits an error signal ERR to the OR-gate 326 in FIG. 2 upon being set in order to insert a reject code 0010 in the input register, thereby causing the given document to be deposited in the REJECT pocket.

If too many documents are deposited in the REJECT pocket, the quality of printing on the documents should be examined and if the characters printed on the documents rejected are found upon examination to satisfy the minimum standards, the character reader should be checked to determine that it is functioning properly. During such a test, hubs 10J and 10K connected to input terminals of the AND-gate 605 should not be connected to respective hubs 9J (FIG. 10) and 9K (FIG. 11) so that any error signal CER will enable the AND-gate 605 to effectively set the error flip-flop ERR.

In the second method of setting the character-decision flip-flop CHN, coincidence of a signal FLD and a signal DGT at the AND-gate 354 will set the character-decision flip-flop CHN through the OR-gate 355 as described hereinbefore with reference to FIG. 3. If a character decision is not made by the time the document is read and a CSY2S pulse occurs, the flip-flop CHN is set by the CSY2S pulse, thereby locking in the input register a reject code inserted therein after the last character read under the control of the AND-gate 324 (FIG. 2) as just described hereinbefore.

A document may also be rejected during normal off-line sorting if an error signal CER is received from the character reader upon reading any digit prior to the digit in the position selected for sorting. That is accomplished through the AND-gate 605 which sets the error flip-flop ERR through the OR-gate 606 and thereby causes a character-decision flip-flop CHN to be set in order that the reject code inserted in the input register in response to a signal ERR applied to the AND-gate 327 (FIG. 2) through the OR-gate 326 be locked in. If rejection during normal off-line sorting is to be restricted to an error in reading a digit in the digit position selected for sorting, the hub 10J is connected to the hub 9J (FIG. 10) and the hub 10K is connected to the hub 9K (FIG. 11). In that manner, the AND-gate 605 may be enabled upon the occurrence of a CER signal only when the specified digit in the selected field has been located. If only the hub 9J (FIG. 10) is connected to the hub 10J, documents may be rejected in response to any signal CER received from the character reader upon reading any character in the specified field up to and including the digit position selected for sorting, at which time the flip-flop CHN is set and the AND-gate 605 is disabled via the OR-gate 601.

It may occur that the digit position selected for sorting is blank because it contains a suppressed zero; i.e., it contains an insignificant zero not printed. In that event, the missing-digit detector 362 illustrated in FIG. 28 will transmit a missing-digit signal MD to set a flip-flop SZMD in the special-sort section 363 (FIG. 30) through an enabled AND-gate 610 and an OR-gate 611. If the missing digit is a suppressed zero, no other digits are printed prior to the next cue symbol which, upon being read, will transmit a signal QOR through an OR-gate 612 and an enabled AND-gate 613 to the OR-gate 355 to set the character-decision flip-flop CHN. The +6-volt signal transmitted from the AND-gate 613 through the OR-gate 355 to set the flip-flop CHN may be referred to as the suppressed-zero special-sort signal SZSS because it is also transmitted through the OR-gate 602, the enabled AND-gate 603 and the OR-gate 604 to produce a special-sort signal SS applied to the OR-gates 337, 339, 341 and 342 in FIG. 2 thereby entering a special-sort code in the input register that is locked in upon the flip-flop CHN being set.

If the selected digit is not a suppressed zero but a missing digit, as evidenced by the presence of a digit following it before the next cue symbol, the missing digit detector 362 (FIG. 28) will initiate a missing digit signal MD, as in the case of a suppressed zero, to set the flip-flop SZMD. Upon being set, the flip-flop SZMD transmits from its true output terminal a signal SZMD to the AND-gate 613 and to an AND-gate 614 in the error-detection section 364 (FIG. 30). If a missing-digit-error-inhibit switch SA3 is in its normal position as shown in FIG. 30 and plugboard connections are not made to AND-gates 615 and 616, the AND-gate 614 transmits a +6-volt signal D0-9 through the OR-gate 606 to set the error flip-flop ERR upon the next digit being read before the next cue symbol following the missing digit. In that manner, a suppressed zero is distinguished from a missing digit after the flip-flop SZMD has been set and a reject code 0010 is entered in the input register (FIG. 2) instead of a special-sort code 0001.

The sample document shown in FIG. 21 illustrates the utility of the logic network which distinguishes between a suppressed zero and a missing digit. Assuming that a group of documents are to be sorted on the second digit position of the on-us field (the next digit to be scanned after the 9 but before the Q3 (on-us) symbol 23"), when the digit position selected for sorting is scanned, the missing-digit detector will transmit an MD signal through the AND-gate 610 and the OR-gate 611 to set the flip-flop SZMD. Upon being set, the flip-flop SZMD transmits a +6-volt signal SZMD to the AND-gate 614; however, the error flip-flop ERR is not set because another digit is not read to generate a signal D0-9 which will enable the AND-gate 614 before the Q3 (on-us) symbol 23" is read and a QOR signal is transmitted through the OR-gate 612 to enable the AND-gate 613 to transmit the +6-volt signal to the OR-gate 602. In that manner the document illustrated in FIG. 21 is deposited in a Special Sort pocket and not in the REJECT pocket because the absence of a digit in the next more significant digit position relative to the digit position selected for sorting is properly interpreted as a suppressed zero and not a missing digit.

As a further example, assume that the document illustrated in FIG. 21 is to be sorted on the fourth digit position of the account number 077 989 which follows immediately after the Q3 (on-us) symbol 23″. When the fourth digit position is scanned, the missing digit detector transmits a missing digit signal MD to set the flip-flop SZMD as before. The digit 7 following the missing digit is then read and counted by the digit counter as the fourth digit of the field selected for sorting so that, in the absence of the error detection logic network illustrated in FIG. 30, the digit 7 would be interpreted as the fourth digit even though it is actually read from the fifth digit position and the document would be erroneously deposited in the SEVEN pocket. If the missing digit was inadvertently not printed in the fourth digit position, the document should be deposited in the REJECT pocket, not in the SEVEN pocket; accordingly, the signal CD7 transmitted by the character reader 2 (FIG. 1) through the OR-gate 502 (FIG. 25) to the AND-gate 614 (FIG. 30) as a D0–9 signal would cause the flip-flop ERR to be set and the document to be deposited in the REJECT pocket.

It may occur that a particular field selected for sorting contains a legitimately missing digit; therefore, a means is provided to inhibit the missing digit from being interpreted as an error while the selected field is being read. The means provided to accomplish that comprises an AND-gate 615 or an AND-gate 616 and an OR-gate 617. An input terminal of the OR-gate 617 is connected to a source of −5 volts so that an inverter 620 will normally provide a +6-volt signal to the AND-gate 614. In order that a missing-digit error be detected only in the field selected for sorting, one of the AND-gates 615 and 616 is connected to the cue-count-decoding AND-gates which uniquely define the cue-count configuration for the selected field. In that manner a +6-volt signal is transmitted through the OR-gate 617 to the inverter 620 to provide an inhibiting −5-volt signal to the AND-gate 614.

The manner in which the AND-gate 615 is connected to the cue-count-decoding AND-gates may best be explained by referring to the sample document illustrated in FIG. 21. Assume that the sample document is to be sorted by its account number; it may be seen that the Q3 (on-us) symbol count for the account number is one and that the Q4 (hyphen) count is zero. Therefore a Q3 count of one and a Q4 count of zero uniquely specifies the account number of the "on-us" field for sorting. Accordingly, a hub 5F connected to the AND-gate 420 (FIG. 10) is connected to the hub 6H and the hub 2G connected to the AND-gate 441 (FIG. 10) is connected to the hub 6J. Another decoding AND-gate associated with the Q1 and Q2 counters may be connected to the hub 6K if necessary, to uniquely define the field.

Two AND-gates are provided for inhibiting missing-digit error-detection function in order that a second or alternate field may be defined by plugboard programming. However, it should be noted that since the missing-digit error-detection function may be accomplished only when the missing-digit occurs within the field selected for sorting during an off-line mode of operation, the alternate field defined would be effective to inhibit the missing-digit error-detection function only when the alternate field is selected for sorting.

During an on-line mode of operation, any missing-digit detected sets the flip-flop SZMD through an AND-gate 621. When the next digit following a missing-digit is read, the error flip-flop is set unless error detection has been inhibited through one of the AND-gates 615 and 616. The error flip-flop ERR then sets the character decision flip-flop CHN; but since the character decision flip-flop CHN is not employed during on-line sorting, its being set is of no consequence. However, setting the error flip-flop ERR causes an error code to be transmitted to the computer through the AND-gates 311 to 314 of FIG. 2 to enable the computer to take appropriate action and enter a REJECT code in the input register if necessary in accord with a stored computer program.

The missing-digit error-detection function may be inhibited during an on-line mode of operation through the AND-gates 615 and 616 in the same manner as just described for the off-line mode of operation except that since the particular field is not specified and the flip-flop SZMD is set whenever a missing-digit is detected, it may be necessary to use both of the AND-gates 615 and 616 to inhibit a missing-digit error-detection in two distinct fields. For instance, if a given format permits a digit to be legitimately missing in the on-us field prior to the account number (as in the sample document illustrated in FIG. 20) and in the account number (as in the sample document illustrated in FIG. 21), it may be necessary to inhibit the missing-digit error-detection function in two successive fields through both of the AND-gates 615 and 616.

Detection of Special Errors

During normal off-line sorting, the field selected for sorting must be located before a pocket decision can be made. Since the specified field is located by reading and counting the cue symbols, any cue symbol error may result in sorting on a digit in the wrong field; accordingly, any cue symbol which generates an error symbol CER prior to the character decision sets the error flip-flop ERR through an AND-gate 622. In order to assure that only an error signal CER generated when a cue character is read will set the flip-flop ERR, a signal QOR from the OR-gate 501 (FIG. 25) is applied to an input terminal of the AND-gate 622. The signal $\overline{CHN}$ is applied to a third input terminal of the AND-gate 622 to assure that a REJECT decision is made for a cue symbol error only if the signal CER is generated by a cue symbol read before the field selected for sorting has been located.

A cue-count check is conducted for each document sorted during an off-line mode of operation in order to determine that the format of each document conforms with at least one of two specified formats having one of two particular total cue-count configurations. The cue-count checking network provided comprises three AND-gates (631, 632 and 633), an OR-gate 634 and an inverter 635. Hubs 1J, 2J and 3J connected to the AND-gate 631 may be connected through the plugboard to hubs connected to output terminals of cue-count decoding AND-gates 411 to 422 and 441 to 445. Hubs 1K, 2K and 3K connected to the AND-gate 632 may be similarly connected to the hubs connected to the cue-count decoding AND-gates. The connections to be made through the plugboard to the AND-gates 631 and 632 define the total cue-count configurations of the cue counters which must be present after each of the documents being sorted is read if they conform to one of two alternate formats. If the total cue-count of a given document is incorrect, the error flip-flop ERR is set and a REJECT code is entered in the input register.

Figure 16:
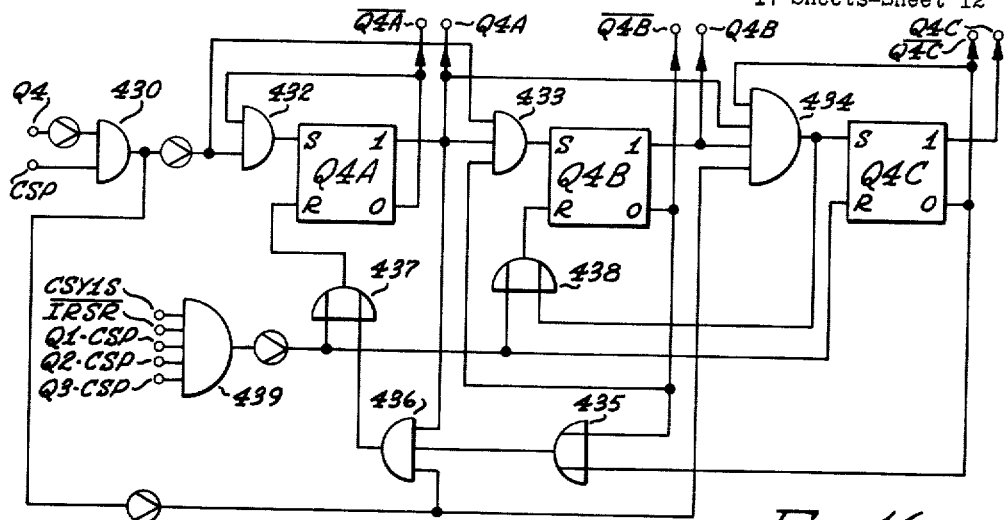
FIG. 16 is a logic diagram of a Q4 (hyphen) counter.

For a cue-count check, only the Q1 (transit), Q2 (amount), and Q3 (on-us) symbols are checked since the Q4 (hyphen) counter is reset by the other cue symbols Q1, Q2 and Q3 through the OR-gate 439 (FIG. 16). An example will clarify the manner in which the cue-count check network is employed. Referring to the sample document illustrated in FIG. 18, it may be observed that there are: two Q2 (amount) symbols 21 and 22; three Q3 (on-us) symbols 23, 28 and 29; and two Q1 (transit) symbols 25 and 27. Therefore, the following cue-count configuration must be connected to one of the AND-gates 631 and 632 through the plugboard: Q2 (amount)=2; Q3 (on-us)=3; and Q1 (transit)=2. If a document is read which does not have information printed thereon according to the format prescribed by that total cue-count configuration, the error flip-flop ERR is set by a CSY2S pulse applied to the AND-gate 633 to cause an error signal ERR to be transmitted and, a REJECT code 0010 to be entered in the input register. In that manner, a document read not having the prescribed total cue-count configuration is deposited in the REJECT pocket even though a pocket decision on a selected digit of a specified field has already been made.

The second one of the AND-gates 631 and 632 is utilized to allow the proper sorting of a document having an alternate total cue-count configuration which is acceptable for the programmed sorting operation being performed. For example, some documents may not include the "auxiliary on-us" field bracketed by the "on-us" symbols 28 and 29 in the illustrated document of FIG. 18. Therefore, while sorting such documents, documents with and without the "auxiliary on-us" field must be accepted and properly sorted. Accordingly, for the sample documents of FIG. 18 without the "auxiliary on-us" field, the alternate total cue-count configuration must be connected to the second one of the AND-gates 631 and 632 as follows: Q2 (amount)=2; Q3 (on-us)=1; and Q1 (transit)=2. The two AND-gates 631 and 632 are connected to the OR-gate 634 so that any document having either total cue-count configuration will be accepted.

It should be noted that negative logic is employed in the total-cue-count check due to the inverter 635; if one of the two alternate total cue-count configurations is not present upon the occurrence of a pulse CSY2S, a —5-volt signal is inverted by the inverter 635 to a +6-volt signal, thereby enabling the AND-gate 633 to transmit a pulse CSY2S to set the flip-flop ERR and if one of the two alternate total cue-count configurations is present, the +6-volt signal transmitted to the inverter 635 is inverted to a —5-volt signal, thereby disabling the AND-gate 633.

A switch SA2 shown in the normal position is connected to an input terminal of the OR-gate 634 in order to selectively inhibit the total-cue-count-check function by actuating it, thereby inhibiting the AND-gate from transmitting a pulse CSY2S.

In the event that a digit is specified for sorting within a field which does not exist, such as the fifth digit in a field having only four digits, the reject code 0010 is entered in the input register in order that the document may be deposited in the REJECT pocket. That is accomplished through the AND-gate 324 in FIG. 2 in the following manner. If the selected digit location is greater than the actual number of digits contained within the specified field, the character decision flip-flop CHN is not set before the next cue symbol is read because the flip-flop DGT in the digit counting and selecting section (FIG. 11) is not set before the following cue symbol resets the digit counter (FIG. 17) to a count configuration of 0000. The cue symbol which causes the digit counter to be reset triggers the monostable multivibrator YCP (FIG. 25). When the monostable multivibrator YCP recovers, the AND-gate 324 is enabled to transmit a +6-volt signal through the OR-gate 326 and the AND-gate 327 to insert reject code 0010 into the input register. Thus, in the absence of a pocket decision being made after reading a specified digit in a selected field, a reject code is inserted in the input register immediately after each digit is read and the monostable multivibrator YCP recovers.

The monostable multivibrator YCP has an unstable period of 500 microseconds which is sufficient for the character decision flip-flop CHN to be set when an appropriate pocket decision is made in order to disable the AND-gate 324 before the monostable multivibrator YCP recovers, thereby preventing a reject code 0010 from being entered into the input register at the time that a pocket decision code is transferred from the encoder 300 to the input register and effectively locked therein.

As noted hereinbefore, the switches S3 and S4 are in the positions shown in FIG. 2 for an on-line mode of operation so that a +6-volt signal MSS1 is transmitted to an AND-gate 640 while sorting on-line. Any character error signal CER received from the character reader 2 (FIG. 1) enables the AND-gate 640 to transmit a +6-volt signal through the OR-gate 606 to set the error flip-flop ERR. When the error flip-flop ERR is set during on-line sorting, a reject code 0010 is not entered into the input register, as noted hereinbefore, because the —5-volt signal MSS2 from the switch S4 disables the AND-gate 327 (FIG. 2). However, a signal ERR from the error flip-flop ERR is transmitted to the computer to enable it to take appropriate action in accord with a program stored therein.

*Multiple Digit Selection Character Error*

During an off-line mode of operation, while the switches S3 and S4 in FIG. 2 area actuated to provide a —5-volt signal MSS1 and a +6-volt signal MSS2, a switch S5 illustrated in FIG. 30 may be actuated to provide a +6-volt signal MSS3, thereby disabling the AND-gate 603 through an inverter 665; enabling an AND-gate 641 in the error-detection section; enabling AND-gates 642 and 643 in the special-sort section to allow the special-sort section to be employed for multiple digit selection; and enabling the error-detection section to enter a reject code 0010 in the input register whenever a selected digit in a specified field produces a character error signal CER. Each time that a digit position in a specified field is read for comparison by the multiple-digit-select comparing AND-gates 521 to 530 and the digit read in that position is so defective that a character error signal CER is produced, the AND-gate 641 in the error-detection section is enabled to transmit a +6-volt signal through the OR-gate 606 to set the error flip-flop ERR. In that manner, the AND-gate 641 is enabled only when a digit is being read for a multiple-digit select comparison by an MDSOR signal from the flip-flop MDSOR which is set by the field and digit selecting AND-gates 511 to 530 (FIG. 12).

The signal SAM is applied to the AND-gate 641 for synchronizing the transmission of a multiple-digit select error signal MDSER to the OR-gate 535 (FIG. 12), thereby setting the flip-flop MDS in FIG. 12 in order that, for an equal-sort mode of multiple-digit selection, an MDS signal will not be transmitted to the special-sort section in FIG. 30 to enable the AND-gate 642 to transmit a +6-volt special-sort signal SS through the AND-gate 643 and the OR-gate 604 to the OR-gates 337, 339, 341 and 342 in FIG. 2. Thus, by setting the flip-flop MDS the reject code 0010 is effectively locked in the input register (FIG. 2) when the AND-gate 641 in the error detection section transmits a +6-volt error signal MDSER.

For the unequal-sort mode of the multiple digit selection, setting the flip-flop MDS produces the opposite effect in that it enables the AND-gate 642 to transmit a +6-volt special-sort signal SS through the AND-gate 643 and the OR-gate 604 to enter a special-sort code 0001 in the input register, thereby sorting a document having a defective digit in a specified position in the same manner as a document having a digit in a specified position which does compare with a specified digit. A second sorting operation utilizing the equal mode of multiple digit selection would be required to separate documents having defective digits from the rest of the documents deposited in the Special Sort pocket SSP during an unequal-sort mode of multiple digit selection.

*Special Sorting*

The Special Sort pocket SSP may be employed during a normal off-line sorting operation to cull from a stack all documents already in proper sequence, a condition which exists when a digit position selected for sorting either contains a zero or no digit and the subsequent digit positions in higher orders of the same field prior to the next cue symbol contain either zeros or no digits. Both conditions must be considered because some documents may have insignificant zeros printed, as when a printer is employed which is so designed that a digit must be printed in each digit position, and other documents may have blank spaces to the left of the most significant digit in a field, such as the documents illustrated in FIGS. 18, 19 and 21. Documents which do not have insignificant zeros printed in a given field are said to have "suppressed zeros" in that field.

The special-sort section will first be described for sorting a given document having an insignificant zero present in a selected digit position. A flip-flop ZI is reset by a CSY1S pulse at the beginning of the time allowed for reading the given document to allow a special-sort signal SS to be transmitted through the OR-gate 604, and thereby insert a special-sort code 0001 in the input register (FIG. 2) upon the occurrence of a signal from the next cue symbol read or from the flip-flop ORP (FIG. 2) set by CSY2S signal at the end of the time alotted for reading the given document, unless an intervening digit produces any one of the digit signals CD1 to CD9 after the insignificant zero is read from the selected digit position. Thus, after the insignificant zero flip-flop ZI is reset by a CSY1S pulse and the selected digit position is read, the character decision flip-flop CHN is set, thereby locking an inverse biquinary code 1111 in the input register (FIG. 2). When the flip-flop CHN is set, a +6-volt signal CHN is transmitted to an AND-gate 650 and an AND-gate 651 in the special-sort section 363 (FIG. 30). An AND-gate 331 (FIG. 2) immediately decodes the inverse biquinary cod 1111 in the input register and transmits a +6-volt signal TSS to the AND-gate 650 (FIG. 30). If digits other than zero are not read following the zero read from the selected digit position, the insignificant zero flip-flop ZI is not set through the AND-gate 650 and the false side of the flip-flop ZI applies a +6-volt signal to the AND-gate 651, thereby causing a special-sort code 0001 to be entered into the input register via the OR-gate 604.

The first two input terminals of the AND-gate 650 are connected to the character decision flip-flop CHN and the AND-gate 331 (FIG. 2), respectively. A third input terminal is connected to the OR-gate 612 by an emitter follower 653 to receive a signal QOR when the next cue symbol is read or a signal ORP when the end of the given document is read. A fifth input terminal of the AND-gate 651 is connected to an OR-gate 654 having one input terminal connected to the "true" output terminal of the flip-flop DCC (FIG. 25) to receive a +6-volt synchronizing signal DCC in response to the next cue symbol read. The second input terminal of the OR-gate 654 is connected to the "true" output terminal of the flip-flop SPS (FIG. 23) which produces a +6-volt synchronizing signal SPS when a CSY2 signal is received from the timing section of the sorter (FIG. 1) to produce a synchronized signal CSY2S which sets the ORP flip-flop (FIG. 2). The remaining input terminal of the AND-gate 651 receives a +6-volt MSS2 signal from the switch S4 (FIG. 2) when actuated for an off-line mode of operation.

When the AND-gate 650 is enabled by a +6-volt signal at all of its input terminals, a special-sort signal is transmitted through the OR-gate 602 and the AND-gate 603. The AND-gate 603 has one input terminal connected to the switch S4 to receive a +6-volt signal MSS2 and another input terminal to a switch S5 by the inverter 655 to receive a +6-volt signal when the switch S5 is in the position shown for off-line sorting without multiple-digit selection.

If the digit position selected for sorting contains a suppressed zero, i.e., the digit position selected for sorting is blank, the flip-flop Zi is not set because a +6-volt signal TSS is not received from the zero decoding AND-gate 331 (FIG. 2); however, a document bearing a suppressed zero in the digit position selected for sorting should be deposited in the Special Sort pocket SSP as though it were a document bearing an insignificant zero in that position. Accordingly, an alternate means is provided for initiating the transmission of a special-sort signal SS through the OR-gate 604. That means comprises the flip-flop SZMD which is initially reset and not set until a missing digit is detected in the field specified for sorting. When the flip-flop SZMD is set, one of two situations may actually exist as noted hereinbefore; the digit not present may be a missing digit in the sense that a digit should have been present as evidenced by the presence of any digit from a zero to nine in the following digit position, i.e., the next higher order position in the same field; or the digit missing may be a suppressed zero, a condition which is evidenced by the absence of any digit zero to nine in any of the higher order positions of the field The error-flip-flop ERR in the error-detection section is set if the first situation exists, as explained hereinbefore with reference to the error-detection section 364, and the given document is deposited in the REJECT pocket. If the second situation exists, the error flip-flop ERR is not set because another digit is not read following the missing digit detected; instead, the next cue signal QOR or the signal ORP from the "true" output terminal of the flip-flop ORP (FIG. 2) is transmitted through the OR-gate 612, emitter follower 653 and AND-gate 613 to the character decision flip-flop CHN via the OR-gate 355 to set it and thereby disable the AND-gates 315 and 324 (FIG. 2) and to the OR-gate 604 via the OR-gate 602 and the AND-gate 603 to produce a special-sort signal SS which enters a special-sort code 0001 in the input register (FIG. 2).

After the flip-flop CHN has been set and a special-sort code 0001 has been entered in the input register, the next cue symbol read produces a sampling pulse SAM, as described hereinbefore with reference to FIG. 25, which is transmitted through an OR-gate 669 to reset the flip-flop SZMD. If another cue symbol is not read before the occurrence of a CSY2S pulse the signal ORP from the flip-flop ORP set by the CSY2S signal is transmitted through the OR-gate 660 to reset the flip-flop SZMD. The third input terminal of the OR-gate 660 is connected to the inverter 381 (FIG. 3) to receive a signal $\overline{\text{IRSR}}$ to continually reset the flip-flop SZMD until a signal RSR is provided when the switch S1 is closed to apply power to the sorter, thereby assuring that the flip-flop SZMD is reset when operation of the sorter is initiated.

When the Special Sort pocket SSP is being utilized for multiple-digit selection, a +6-volt signal MSS3 from the switch S5 disables the AND-gate 603 as noted hereinbefore, thereby disabling the logic circuits for producing a special-sort signal SS and enabling logic circuit means comprising an AND-gate 661 for entering an inverse biquinary code 1111 for the digit zero in the input register. In that manner, if the multiple digit-select mode of sorting is being employed and a sorting decision is not made on the basis of multiple digits selected because a given document being read does not contain a correct multiple-digit-select configuration, the digit position specified for normal sorting is used to determine into which pocket a given document is to be deposited, as described hereinbefore with reference to the multiple-digit selection section 370. If the digit position selected for normal sorting contains a suppressed zero, the document cannot be placed in the Special Sort pocket SSP as it would for normal off-line sorting because that pocket is being utilized for documents which bear the correct multiple-digit-select configuration; instead, the document is deposited in the ZERO pocket. To accomplish that during a multiple-digit-select mode of operation, the inverse biquinary code 1111 for a digit zero is entered into the input register when a suppressed zero is detected and the flip-flop CHN is set as just described for a normal off-line operation. The inverse biqunary code 1111 is entered into the input register by enabling the AND-gate 661 when the switch S5 is actuated to produce a multiple-digit-select signal MSS3 so that the +6-volt signal which would otherwise be transmitted by the AND-gate 603 is transmitted instead through the AND-gate 661 to the OR-gates 336, 338, 340 and 342 (FIG. 2) to enter a cod 1111 in the input register and thereby cause the document to be deposited in the ZERO pocket.

The situation may arise during a multiple-digit-select sorting operation when the digit position selected for sorting in the normal manner is an insignificant zero. During normal off-line sorting, a document bearing an insignificant zero in the selected digit position is deposited in the Special Sort pocket SSP in response to a signal SS transmitted through the OR-gate 604 which causes the zero code 1111 placed in the input register upon the insignificant zero being read to be replaced by a special-sort code 0001. In order that a given document bearing an insignificant zero in the position selected for normal sorting may be deposited in the ZERO pocket if a mutiple-digit-select sorting decision is not made, instead of in the Special Sort pocket, the AND-gate 603 is disabled by a −5-volt signal from the inverter 655 when the switch S5 is actuated to provide a +6-volt multiple-digit-select signal MSS3. In that manner, if the selected digit for normal sorting is an insignificant zero, the document is sorted into the ZERO pocket just as if the selected digit had been a suppressed zero.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the inevntion.

What is claimed is:

1. In a system for sorting documents, each document having data comprising characters recorded thereon and separated into fields, means for allowing identification and special sorting of a predetermined class of documents defined by specified characters in specified character positions of any number of said fields comprising:
    an apparatus having at least two pockets into one of which documents of said predetermined class are deposited as they are sorted in accord with said specified characters;
    a mechanism for transporting documents into said pocket as they are sorted;
    first means for reading said characters of a given document in sequence to produce electrical signals characteristic of said characters;
    second means for sequentially locating said specified character position of said given document;
    third means for effectively comparing in sequence characters read from said specified character positions of said given document with said specified characters;
    and control means responsive to said third means for sorting said documents of said predetermined class of documents and depositing them in one of said pockets in response to a comparison between characters read from said specified character positions of said given document with said specified characters.

2. In a system for sorting documents, means for allowing identifiication and special sorting of a predetermined class of documents as described in claim 1 wherein said control means for sorting said documents of said predetermined class of documents includes means for selectively causing either said predetermine class of documents to be deposited in a specified one of said pocekts reserved for special sorting and all other documents to be deposited in other pockets or all other documents to be deposited in said specified one of said pocekts reserved for special sorting and said predetermined class of documents to be deposited in other pockets.

3. In a system for sorting documents bearing indicia comprising different characters arranged into fields, wherein documents bearing specified characters in designated character positions of said certain fields are sorted by one method and other documents are simultaneously sorted by another method, the combination comprising:
    an apparatus having a plurality of pockets into which documents are deposited as they are sorted in accord with characters read from designated character positions of certain specified fields or a specified character in a specified character position of a specified field of each document;
    a mechanism for transporting documents into proper pockets as they are sorted;
    means for reading said characters and symbols on a given document in sequence thereby to produce electrical signals characteristic of said characters and symbols;
    first means responsive to electrical signals characteristic of said fields for locating said specified fields of said given document;
    second means for locating said designated character positions of said given document in said fields;
    third means responsive to said first and second means for effectively comparing characters read from said designated character positions of said specified fields of said given document with said specified characters;
    fourth means responsive to said third means for sorting said given document by said one method if the characters read from said designated character positions compare with said specified characters;
    fifth means for locating said specified character position of said given document;
    and sixth means responsive to said third and fifth means for sorting said given document in said other method if the characters read from designated character positions do not compare with said specified characters.

4. In a system for sorting documents, the combination as described in claim 3 including means for interchanging the functions of said fourth and sixth means whereby said given document is sorted by said other method if the characters read compare with said specified characters and by said one method if the characters read do not compare with said specified characters.

5. In a system for sorting documents, each document having a plurality of characters separated into fields by symbols, the combination comprising:
    a document transporting mechanism having a plurality of pockets, each pocket corresponding to a different character and a special-sort pocket;
    means for scanning said symbols and characters as said documents are transported by said mechanism, said means having respective output circuits for each symbol and each character means responsive to each symbol and each character to produce pulses in the respective output circuits;
    means responsive to said symbol pulses for selecting a specified field;
    means responsive to said character pulses produced in response to characters within said specified field for selecting a specified character position in the selected field;
    sorting means responsive to the character pulse characteristic of the character read from said selected position of the selected field of a given document to deposit said given document in the pocket corresponding to the character in the selected position after all of the characters in all of the fields on said given document have been scanned;

means for selecting a plurality of characters on a given document, each character being selected from a specified character position of a specified field;

means for effectively comparing in sequence each of said plurality of characters on a given document with a predetermined group of characters;

means responsive to said comparing means for producing a control signal when said plurality of characters in selected positions of said given document compare with said predetermined group of characters;

and means responsive to said control signal for overriding said sorting means and depositing said given document in said special-sort pocket.

6. In a system for sorting documents, the combination as described in claim 5 wherein said means for producing a control signal includes switching means for reversing its function whereby a control signal is produced when said plurality of characters in selected positions of said given document do not compare with said predetermined group of characters and said means responsive to said control signal overrides said sorting means to deposit said given document in said special-sort pocket only when said plurality of characters in selected positions of said given document do not compare with said predetermined group of characters, thereby allowing said sorting means to sort said given document when said plurality of characters in selected positions of said given document do compare with said predetermined group of characters.

7. In a system for sorting documents, each document having a plurality of fields of different characters separated by symbols, the combination comprising:

mechanism for transporting documents, said mechanism having a plurality of pockets, each pocket corresponding to a different character and a special-sort pocket;

means for sequentially reading said symbols and characters on a given document as it is transported by said mechanism, said means having corresponding output circuits for each symbol and each character;

a plurality of symbol counters, one counter for each symbol connected to the corresponding individual output circuit for each symbol and a character counter for counting the characters scanned within a given field;

a plurality of decoding means for selecting a plurality of character positions in said fields, each decoding means being selectively coupled to stages of the symbol counters and the character counter in accord with the number of fields and characters sequentially scanned before the character selected thereby is read in a specified field;

a plurality of comparing means, one comparing means for each character in a particular group of characters selected, said comparing means being coupled to said decoding means and to a selected one of said output circuits corresponding with the characters of the group selected;

means responsive to said comparing means for generating a control signal in response to a comparison of characters read from selected positions with a predetermined group of characters;

and means responsive to said control means for depositing said given document in said special-sort pocket when the plurality of characters read from selected positions compare with said predetermined group of characters.

8. In a system for sorting documents, each document having data comprising characters recorded thereon and separated into fields by arbitrarily selected ones of a plurality of distinct types of symbols, the combination comprising:

an apparatus having at least two pockets into one of which documents of a predetermined class are deposited as they are sorted, said class being selectively defined as those documents either having or not having designated characters in selected characters positions of specified fields;

a mechanism for transporting documents into said pockets as they are sorted;

means for reading said characters in sequence thereby to produce electrical signals characteristic of said characters and symbols;

a plurality of means for counting said electrical signals characteristic of symbols on a given document, one counting means for each distinct type of symbol;

a plurality of means for selectively defining the specified fields which include said selected character positions in terms of the count configuration of selected ones of said plurality of symbol counting means when the fields preceding the specified fields have been read;

means for counting characters read from a given field;

a plurality of character selecting means, one for each ordinal character position in a given field, responsive to said character counting means;

a plurality of character locating means, a given one being responsive to one of said field defining means and to one of said character selecting means for locating a given one of said character positions of a specified field;

a plurality of comparing means, a given one of which is responsive to said given character locating means and to an electrical signal characteristic of the character read therefrom by said reading means for producing a particular signal if said charatcer read does not compare with a corresponding one of said designated characters;

and means responsive to a particular signal from said comparing means indicating that a given character read from a selected character position of a specified field did not compare with a corresponding designated character for causing said transport mechanism to transport said given document to said pocket into which documents of said predetermined class are deposited and to deposit said given document therein when the class is defined as those documents having designated characters in selected character positions of specified fields, and to not transport and deposit therein the given document when the class is defined as those documents not having designated characters in selected character positions.

9. In a system for sorting documents, the combination as described in claim 8 wherein a given one of said plurality of means for selectively defining a given specified field and a given one of said plurality of character selecting means for selecting a given designated character within that given field comprises:

an AND-gate having a plurality of input terminals, at least one input terminal for each one of said plurality of counting means selected for defining said specified field;

means having $n+1$ output terminals coupled to each one said plurality of counting means for presenting an output signal at output terminals 1 to $n+1$ for respective counts of zero to $n$, where $n$ is an integer;

means for selectively coupling to an input terminal of said AND-gate one of said output terminals of each of said means coupled to each of said plurality of counting means selected for defining said specified field;

means having $m$ output terminals coupled to said character counting means for presenting an output signal at output terminals 1 to $m$ for respective counts of one to $m$, where $m$ is an integer;

and means for selectively coupling to an input terminal of said AND-gate one of said output terminals of said last mentioned means the associated cardinal number of which corresponds to the ordinal character position of said given designated character in said given specified field.

10. In a system for sorting documents, the combination as described in claim 8 wherein said given comparing means comprises:
   an AND-gate having one input terminal so connected to said reading means as to receive all electrical signals characteristic of said corresponding designated character;
   a second input terminal;
   and means for selectively connecting said second input terminal to the one of said character locating means for locating the one of said selected character positions of a specified field, whereby said AND-gate is enabled to transmit a signal only when the character read from the selected character position produces a characteristic signal of the designated character which is received by said one input terminal of said AND-gate.

11. In a system for numerically sorting documents on numerical data recorded in a particular field, each document having data comprising characters recorded thereon and separated into fields by symbols, the particular field being of a type which does not require that digit characters be recorded in each digit character position of higher numerical order than the most significant digit recorded within the particular field, and for selectively sorting documents of a certain class bearing specified characters in designated positions of said fields, the combination comprising:
   an apparatus having a plurality of pockets into which doucments are deposited as they are sorted in accord with a character read from a specified position within said particular field on a given pass as said documents are sorted numerically by sorting on successive numerical order positions in successive passes until all the documents have been sorted on the entire field and having an additional pocket into which documents are normally deposited which have no character to be read in a given position of numerical order higher than the most significant order having a character printed therein when the given position of numerical order is being sorted upon;
   apparatus for automatically sensing data recorded on documents;
   a mechanism for transporting documents past said sensing apparatus into proper pockets as they are sorted;
   means coupled to said sensing apparatus for reading said characters on a given document in sequence thereby to produce signals characteristic of said characters thereon during a given pass;
   means for locating said designated positions of said fields of said given document during said given pass;
   means for effectively comparing characters read from said designated positions of said fields with the corresponding specified characters to determine if said given document is of said given class while sorting numerically during said given pass on data recorded in said particular field and for producing a control signal if the characters read compared with the corresponding specified characters;
   and means selectively rendered operable for causing documents of said given class to be deposited in said additional pocket and documents not of said given class bearing no character in a given character position being sorted upon in a normal manner to be deposited in a pocket into which documents being normally sorted are deposited when a character representing the numerical zero is read from said given character position being sorted upon during said given pass.

12. In a system for numerically sorting documents on numerical data recorded in a particular field, each document having data comprising characters recorded thereon and separated into fields by symbols, the particular field having more character positions in which digit characters may be recorded than required for a number, each digit character position of higher numerical order than the most significant digit of a number recorded within the particular field having either an insignificant zero or no digit character recorded therein, and for selectively sorting documents of a certain class bearing specified characters in designated positions of said fields, the combination comprising:
   an apparatus having a plurality of pockets into which documents are deposited as they are sorted in accord with a digit character read from a specified position within said particular field as said documents are sorted numerically by sorting on successive numerical order positions during successive passes until all the documents have been sorted on the entire field and having an additional pocket into which documents are normally deposited which have no significant digit character to be read in a given position of numerical order higher than the most significant order having a digit character printed therein when the given position of numerical order is being sorted upon;
   apparatus for automatically sensing data recorded on documents;
   a mechanism for transporting documents past said sensing apparatus into proper pockets as they are sorted;
   means coupled to said sensing apparatus for reading said characters on a given document in sequence thereby to produce signals characteristic of said characters thereon during a given pass;
   means for locating said designated positions of said fields of said given document during said given pass;
   means for effectively comparing characters read from said designated positions of said fields with the corresponding specified characters to determine if said given document is of said given class while sorting numerically during said given pass on data recorded in said particular field and for producing a control signal if the characters read compare with the corresponding specified characters;
   and means selectively rendered operable for causing documents of said given class to be deposited in said additional pocket and documents not of said given class bearing no significant digit character in a given character position being sorted upon in a normal manner to be deposited in a pocket into which documents being normally sorted are deposited when a significant digit character is not read from said given character position being sorted upon during said given pass.

13. In an electronic data processing system for processing data recorded on documents, said data on a given document being separated into fields, the combination comprising:
   means for automatically reading data from said documents in sequence, the fields of data on a given document being read sequentially;
   means for sensing that said given document is about to be read;
   data processing means coupled to said reading means for receiving said data read from said given card;
   unblanking means coupled to said sensing means and to said data processing means, and responsive to said sensing means, for indicating to said data processing means that data is being read and transmitted thereto for a predetermined period of time, said predetermined period of time being the maximum period of time required to read all of the fields of data from said given document;

field identifying means for determining when a given specified field of data has been read from said given document;

means for selectively specifying said given specified field;

and means coupled to said field identifying means and to said unblanking means for selectively causing said unblanking means to cease indicating to said data processing means that data is being read and transmitted thereto when said given specified field of data has been read, whereby said data processing system is enabled to discontinue standing by to receive data until said sensing means causes said unblanking means to indicate that another document is being read.

14. In an electronic data processing system for processing data recorded on documents, the combination as defined in claim 13 wherein said means coupled to said field identifying means is coupled to said unblanking means by an OR-gate and said means for selectively specifying said given field includes means for specifying an alternate field, whereby said data processing system is enabled to discontinue standing by to receive data when said given specified field or said alternate field has been read, whichever is read first.

15. In an electronic data processing system for processing data recorded on documents, said data on a given document being separated into fields, the combination comprising:

means for automatically reading data from said documents in sequence, the fields of data on a given document being read sequentially;

means for sensing that said given document is about to be read;

data processing means coupled to said reading means for receiving said data read from said given card;

unblanking means coupled to said sensing means and to said data processing means, and responsive to said sensing means, for indicating to said data processing means that data is being read and transmitted thereto for a predetermined period of time, said predetermined period of time being the maximum period of time required to read all of the fields of data from said given document;

field identifying means for determining when a given specified field of data has been read from said given document;

means for selectively specifying said given specified field;

and means coupled to said field identifying means and to said unblanking means for selectively causing said unblanking means to cease indicating to said data processing means that data is being read and transmitted thereto when said given specified field of data has been read and tnere is not another field of data present on said given document to be read.

References Cited in the file of this patent
UNITED STATES PATENTS 2,994,428     Daubendick _____ Aug. 1, 1961

UNITED STATES PATENT OFFICE
CERTIFICATE OF CORRECTION

Patent No. 3,098,566                          July 23, 1963

Byron F. Burch, Jr.

It is hereby certified that error appears in the above numbered patent requiring correction and that the said Letters Patent should read as corrected below.

Column 17, line 53, for "At" read -- As --; column 21, line 52, for "Tu" read -- Tp --; column 22, line 29, after "is" insert -- at --; column 25, line 24, for "sigal" read -- signal --; line 38, for "+6 signal" read -- +6-volt signal --; column 27, line 54, for "Y4" read -- Q4 --; column 31, line 40, for "than" read -- that --; column 32, line 16, for "set" read -- sent --; line 39, for "and" read -- to --; column 33, line 28, for "compared" read -- compare --; column 38, line 45, for "cut-count" read -- cue-count --; column 39, line 4, for "condition" read -- conditional --; lines 60 and 61, after "examples" strike out the comma; column 46, line 22, for "area" read -- are --; column 47, line 37, for "cod" read -- code --; column 49, line 6, for "biqunary" read -- biquinary --; line 12, for "cod" read -- code --; line 45, for "inevntion" read -- invention --; line 58, for "pocket" read -- pockets --; line 63, for "position" read -- positions --; column 50, line 4, for "predetermine" read -- predetermined --; lines 5 and 8, for "pocekts", each occurrence, read -- pockets --; column 52, lines 7 and 8, for "characters positions" read -- character positions --; line 36, for "charatcer" read -- character --; column 53, line 36, for "doucments" read -- documents --; line 65, for "compared" read -- compare --; column 56, line 25, for "tnere" read -- there --.

Signed and sealed this 5th day of May 1964.

(SEAL)
Attest:

ERNEST W. SWIDER                                    EDWARD J. BRENNER

Attesting Officer                                    Commissioner of Patents